(12) United States Patent
Damaghi et al.

(10) Patent No.: US 10,750,254 B2
(45) Date of Patent: Aug. 18, 2020

(54) DATA IN MOTION STORAGE SYSTEM AND METHOD

(71) Applicant: LyteLoop Technologies, LLC, Great Neck, NY (US)

(72) Inventors: Daniel M. Damaghi, Great Neck, NY (US); Ohad Harlev, Closter, NJ (US); Ariel Litvin, Great Neck, NY (US); Alan Eli Willner, Los Angeles, CA (US); Naftaly Barak, Petah-Tikva (IL); Paul Francis McManamon, Dayton, OH (US); Asher McGuffin, Lexington, MA (US)

(73) Assignee: LYTELOOP TECHNOLOGIES, LLC, Great Neck, NY (US)

( * ) Notice: Subject to any disclaimer, the term of this patent is extended or adjusted under 35 U.S.C. 154(b) by 148 days.

(21) Appl. No.: 15/465,356

(22) Filed: Mar. 21, 2017

(65) Prior Publication Data

US 2017/0280211 A1    Sep. 28, 2017

Related U.S. Application Data

(60) Provisional application No. 62/311,814, filed on Mar. 22, 2016.

(51) Int. Cl.
*H04B 10/00* (2013.01)
*H04Q 11/00* (2006.01)
(Continued)

(52) U.S. Cl.
CPC ....... *H04Q 11/0003* (2013.01); *G02B 6/2938* (2013.01); *G02B 6/4457* (2013.01);
(Continued)

(58) Field of Classification Search
CPC .............. H04B 10/112; H04B 10/1123; H04B 10/1127; H04B 10/1129; H04B 10/114;
(Continued)

(56) References Cited

U.S. PATENT DOCUMENTS

| | | |
|---|---|---|
| 3,141,153 A | 7/1964 | Klein |
| 3,164,809 A | 1/1965 | Pearce et al. |

(Continued)

FOREIGN PATENT DOCUMENTS

| | | |
|---|---|---|
| CA | 2 266 132 | 9/2000 |
| EP | 0174540 A2 | 3/1986 |

(Continued)

OTHER PUBLICATIONS

Geoffrey W. Burr et al., Angle and Space Multiplexed Holographic Storage Using the 90° Geometry, Optics Communications, May 15, 1995, pp. 49-55, vol. 117, Issues 1-2, United States.

(Continued)

*Primary Examiner* — Hanh Phan
(74) *Attorney, Agent, or Firm* — Amster, Rothstein & Ebenstein LLP

(57) ABSTRACT

A data storage system is disclosed that includes a recirculating loop storing data in motion. The data may be carried by a signal via the loop including one or more satellites or other vessels that return, for example by reflection or regeneration, the signals through the loop. The loop may also include a waveguide, for example an optical fiber, or an optical cavity. Signal multiplexing may be used to increase the contained data. The signal may be amplified at each roundtrip and sometimes a portion of the signal may be regenerated.

30 Claims, 31 Drawing Sheets

(51) Int. Cl.
*H04J 14/04* (2006.01)
*G02B 6/293* (2006.01)
*G02B 6/44* (2006.01)
*H04B 7/185* (2006.01)
*H04B 10/118* (2013.01)
*H04J 14/00* (2006.01)
*H04J 14/02* (2006.01)
*H04J 14/06* (2006.01)
*H04L 7/00* (2006.01)

(52) U.S. Cl.
CPC ....... *H04B 7/18517* (2013.01); *H04B 10/118* (2013.01); *H04J 14/005* (2013.01); *H04J 14/02* (2013.01); *H04J 14/04* (2013.01); *H04J 14/06* (2013.01); *H04L 7/0075* (2013.01); *H04B 2210/003* (2013.01); *H04J 2203/0098* (2013.01); *H04Q 2011/0016* (2013.01)

(58) Field of Classification Search
CPC ............ H04B 10/1143; H04B 10/1149; H04B 10/118; H04B 10/2575; H04B 10/25752; H04J 14/02; H04L 67/06; H04L 67/1097
USPC ....... 398/118, 119, 120, 121, 122, 124, 125, 398/126, 127, 128, 129, 130, 131, 115, 398/169, 170, 135, 136, 33, 175
See application file for complete search history.

(56) References Cited

U.S. PATENT DOCUMENTS

| | | | |
|---|---|---|---|
| 3,229,258 A | 1/1966 | Heibeck et al. | |
| 3,277,450 A | 10/1966 | Edson | |
| 3,350,697 A | 10/1967 | Hirvela | |
| 3,411,142 A | 11/1968 | Lee et al. | |
| 4,014,166 A | 3/1977 | Cateora et al. | |
| 4,136,929 A | 1/1979 | Suzaki | 350/96.15 |
| 4,166,212 A | 8/1979 | Judeinstein | 250/199 |
| 4,359,733 A | 11/1982 | O'Neill | |
| 4,455,651 A | 6/1984 | Baran | |
| 4,469,397 A | 9/1984 | Shaw et al. | 350/96.15 |
| 4,473,270 A | 9/1984 | Shaw | 350/96.15 |
| 4,479,701 A | 10/1984 | Newton et al. | 350/96.16 |
| 4,586,779 A | 5/1986 | Huignard et al. | |
| 4,588,255 A | 5/1986 | Tur et al. | |
| 4,652,079 A | 3/1987 | Shaw et al. | |
| 4,653,042 A | 3/1987 | d'Auria et al. | 370/3 |
| 4,656,666 A * | 4/1987 | Piekenbrock | G11C 7/00 342/44 |
| 4,738,503 A | 4/1988 | Desurvire et al. | 350/96.15 |
| 4,744,083 A | 5/1988 | O'Neill et al. | |
| 4,815,804 A | 3/1989 | Desurvire et al. | 350/96.15 |
| 4,856,862 A | 8/1989 | Passmore et al. | 350/96.15 |
| 4,877,952 A | 10/1989 | Halemane et al. | 250/213 |
| 4,974,931 A | 12/1990 | Poole | 350/96.29 |
| 5,058,060 A | 10/1991 | Su | 365/106 |
| 5,319,482 A | 6/1994 | Tsuchiya et al. | |
| 5,335,098 A | 8/1994 | Leyva et al. | |
| 5,392,154 A | 2/1995 | Chang et al. | |
| 5,438,337 A | 8/1995 | Aguado | |
| 5,440,669 A | 8/1995 | Rakuljic et al. | |
| 5,533,154 A | 7/1996 | Smith | 385/27 |
| 5,566,261 A | 10/1996 | Hall et al. | 385/27 |
| 5,602,838 A | 2/1997 | Kartalopoulos | 370/406 |
| 5,740,117 A | 4/1998 | Bona et al. | 365/215 |
| 5,862,286 A | 1/1999 | Imanishi et al. | 385/122 |
| 5,978,130 A | 11/1999 | Fee et al. | |
| 5,991,069 A | 11/1999 | Jander | |
| 6,002,916 A | 12/1999 | Lynch | 455/13.1 |
| 6,035,081 A | 3/2000 | Poustie et al. | |
| 6,043,918 A | 3/2000 | Bozzay et al. | 359/172 |
| 6,144,486 A | 11/2000 | Bennett et al. | |
| 6,172,926 B1 | 1/2001 | Drayer | 365/215 |
| 6,301,037 B1 | 10/2001 | Fischer et al. | |
| 6,304,354 B2 | 10/2001 | Carlson | |
| 6,347,099 B1 | 2/2002 | da Silva et al. | |
| 6,366,356 B1 | 4/2002 | Brosnan et al. | |
| 6,452,719 B2 | 9/2002 | Kinoshita | |
| 6,580,552 B2 | 6/2003 | Welch | |
| 6,647,163 B2 | 11/2003 | Song | 385/15 |
| 6,819,817 B2 | 11/2004 | Kaneko | |
| 6,826,335 B1 | 11/2004 | Grudinin et al. | |
| 6,850,364 B2 | 2/2005 | Xie et al. | |
| 6,912,075 B1 * | 6/2005 | Ionov | H04B 10/118 398/121 |
| 6,917,739 B2 | 7/2005 | Chen | 385/122 |
| 6,930,825 B2 | 8/2005 | Nagel et al. | |
| 7,103,239 B2 | 9/2006 | Kish, Jr. et al. | 385/14 |
| 7,103,280 B1 | 9/2006 | Ionov et al. | 398/121 |
| 7,110,651 B2 | 9/2006 | Golowich et al. | 385/126 |
| 7,167,286 B2 | 1/2007 | Anderson et al. | |
| 7,177,510 B2 | 2/2007 | Ramachandran | 385/124 |
| 7,199,343 B2 | 4/2007 | Mosley | 250/201.5 |
| 7,235,150 B2 | 6/2007 | Bischel et al. | |
| 7,450,618 B2 | 11/2008 | Dantus et al. | |
| 7,542,679 B2 | 6/2009 | Price | |
| 7,729,398 B2 | 6/2010 | Livingston | |
| 7,733,930 B2 | 6/2010 | Livingston | |
| 7,742,210 B2 | 6/2010 | Raguin et al. | |
| 7,756,169 B2 | 7/2010 | Livingston et al. | |
| 7,796,487 B2 | 9/2010 | Chu et al. | |
| 8,232,028 B2 | 7/2012 | Askham | |
| 8,417,125 B2 * | 4/2013 | Chand | H04B 10/1123 398/119 |
| 8,532,486 B2 | 9/2013 | Stead et al. | |
| 8,582,972 B2 | 11/2013 | Small et al. | 398/101 |
| 8,699,888 B2 | 4/2014 | Scaffardi et al. | |
| 8,913,894 B2 | 12/2014 | Coleman et al. | 398/121 |
| 9,077,577 B1 | 7/2015 | Ashrafi et al. | |
| 9,176,280 B2 | 11/2015 | Li et al. | |
| 9,503,186 B2 | 11/2016 | Kawanishi et al. | |
| 9,609,402 B2 | 3/2017 | Long et al. | |
| 9,760,061 B2 | 9/2017 | Ayres et al. | |
| 9,812,845 B1 | 11/2017 | Lee et al. | |
| 2001/0012142 A1 | 8/2001 | Carlson | |
| 2002/0196488 A1 | 12/2002 | Myers | 359/109 |
| 2003/0007230 A1 | 1/2003 | Kaneko et al. | 359/237 |
| 2003/0128365 A1 | 7/2003 | Strandjord et al. | |
| 2004/0151428 A1 | 8/2004 | Nikonov | |
| 2004/0246583 A1 | 12/2004 | Mueller et al. | |
| 2005/0084801 A1 | 4/2005 | El-Hafidi et al. | |
| 2006/0173983 A1 | 8/2006 | Naito et al. | |
| 2007/0072546 A1 | 3/2007 | Jenkin et al. | |
| 2007/0081785 A1 | 4/2007 | Hays | 385/147 |
| 2007/0098052 A1 | 5/2007 | Budic | |
| 2008/0008076 A1 | 6/2008 | Raguin et al. | |
| 2008/0144164 A1 | 6/2008 | Metivier | |
| 2008/0239428 A1 | 10/2008 | Bell et al. | |
| 2009/0202191 A1 | 8/2009 | Ramachandran | 385/11 |
| 2009/0219959 A1 | 9/2009 | Munson et al. | |
| 2010/0269143 A1 | 10/2010 | Rabowsky | 725/63 |
| 2010/0279604 A1 | 11/2010 | Wood | 455/12.1 |
| 2010/0322058 A1 | 12/2010 | Hutt et al. | |
| 2012/0063752 A1 | 3/2012 | Cochran | |
| 2012/0188865 A1 | 7/2012 | Michaelis et al. | |
| 2013/0120831 A1 | 5/2013 | McClean et al. | |
| 2013/0175450 A1 | 7/2013 | Scherer et al. | |
| 2013/0216180 A1 | 8/2013 | Tan et al. | |
| 2013/0315590 A1 | 11/2013 | Zhou | |
| 2015/0104141 A1 | 4/2015 | Logunov et al. | |
| 2015/0244458 A1* | 8/2015 | Erkmen | H04B 10/1129 398/122 |
| 2015/0288542 A1 | 10/2015 | Ashrafi et al. | |
| 2016/0204866 A1* | 7/2016 | Boroson | H04B 10/1121 398/97 |
| 2016/0204896 A1* | 7/2016 | Yu | H04J 14/086 398/65 |
| 2017/0034250 A1* | 2/2017 | Sobhani | H04B 7/18504 |
| 2017/0139079 A1 | 5/2017 | Alfano et al. | |

(56) References Cited

U.S. PATENT DOCUMENTS

| | | |
|---|---|---|
| 2017/0280211 A1 | 9/2017 | Damaghi et al. |
| 2017/0302048 A1 | 10/2017 | Li et al. |
| 2018/0131447 A1 | 5/2018 | Soares et al. |

FOREIGN PATENT DOCUMENTS

| | | |
|---|---|---|
| EP | 0883322 B1 | 7/2000 |
| JP | H5-72591 A | 3/1993 |
| RU | 2155447 C1 | 8/2000 |
| WO | 9508778 A1 | 3/1995 |
| WO | WO 98/44512 | 10/1998 |

OTHER PUBLICATIONS

J. Ashley et al., Holographic Data Storage, IBM Journal of Research and Development, vol. 44, Issue 3, May 2000, pp. 341-368, United States.

Geoffrey W. Burr et al., Volume Holographic Data Storage at an Areal Density of 250 Gigapixels/In./\2, Optic Letters, vol. 26, No. 7, Apr. 1, 2001, pp. 444-446, United States.

Shankar Pidishety et al., "Investigation of scalability of all-fiber fused mode selective coupler for generating multiple OAM states", *Proceedings of International Conference on Fiber Optics and Photonics*, Jan. 2016.

G.S. McDonald et al., "Spatial solitary-wave optical memory," *Journal of the Optical Society of America B (Opted Physics) (J. Opt. Soc. Am.)*, 7(7):1328-1335, Jul. 1990.

François Leo et al., "Temporal cavity solitons in one-dimensional Kerr media as bits in an all-optical buffer," *Nature Photonics*, 4:471-476, May 23, 2010.

Robert W. Boyd et al. "Applications of Slow Light in Telecommunications,"*Optics & Photonics News*, 17(4):18-23, Apr. 2006.

Obulapathi N. Challa et al., "Distributed Data Storage on CubeSat Clusters," *Advances in Computing*, 3(3):36-49 (2013).

Bernd Friedrichs et al., "Error-Control Coding and Packet Processing for Broadband Relay Satellite Networks with Optical and Microwave Links," *2012 6th Advanced Satellite Multimedia Systems Conference (ASMS) and 12th Signal Processing for Space Communications Worksop (SPSC)*, pp. 101-110 (2012).

Stephane Gagnon et al., "Recent developments in satellite laser communications: Canadian context" *Proc. International Conference on Space Optical Systems and Applications (ICSOS)* (2012).

Paul F. McManamon et al., "Laser Radar, Progress and Opportunities in Active Electro-Optical Sensing," *National Research Council of the National Academies* (2014).

PCT; International Search Report dated Aug. 22, 2017 in corresponding International Application No. PCT/US2017/023431 (5 pages).

F. Leo, S. Coen, P. Kockaert, S.-P. Gorza, P. Emplit and M. Haelterman, "Temporal cavity solitons in one-dimensional Kerr media as bits in an all-optical buffer," Nature Photonics, vol. 4, pp. 471-476, 2010. [Leo 2010].

G.D. Bartolini, D.K. Serkland, P. Kumar, W.L. Kath. (1997). All-optical storage of a picosecond-pulse using parametric amplification. IEEE Photonics Technology Letters, 9(7), 1020-1022 [Bartolini 1997].

E.V. Carrera, R. Bianchini. Disk caching with an optical ring. Appl Opt. Dec. 10, 2000;39(35):6663-80. [Carrera 2000].

S.L. Tsao, T.Y. Chen. Comparison of Two 1550 nm Ultra Narrow-Band Optical Infinite Impulse Response Filters for High-Speed Optical Signal Processing. Optical Storage and Optical Information Processing, Proceedings of SPIE vol. 4081 (2000). [Tsao 2000].

A. Hasegawa, H. Toda, M. Shikata, Y. Ozeki, T. Suzaki, Y. Ueno, K. Tajima. (2002). Experimental demonstration of the compressed optical packet multiplexing scheme. Journal of Optical Networking. 42304250. [Hasegawa 2002].

V.W.S. Chan, K.L. Hall, E. Modiano, K.A. Rauschenbach. Architectures and Technologies for High-Speed Optical Data Networks. Journal of Lightwave Technology, vol. 16, Issue: 12, Dec. 1998. [Chan 1998].

J.H. Reif, A. Tyagi. An Optical Delay Line Memory Model with Efficient Algorithms. Optical Engineering, 36(9), (1997). [Reif 1997].

Anjali Agarwal, et al., All-Optical Loadable and Erasable Storage Buffer Based on Parametric Nonlinearity in Fiber, Journal of Lightwave Technology, Jul. 2005, pp. 2229-2238, vol. 23, Issue No. 7, United States.

F. Della Valle, et al., Extremely Long Decay Time Optical Cavity, Optics Express, May 6, 2014, pp. 11570-11577, vol. 22, Issue 10, Optical Society of America, United States.

Bo E. Miller and Yuzuru Takashima, Cavity Techniques for Holographic Data Storage Recording, Optics Express, Mar. 14, 2016, vol. 24, Issue 6, pp. 6300-6317, Optical Society of America, United States.

A. E. Willner, et al., Star Couplers With Gain Using Multiple Erbium-Doped Fibers Pumped With a Single Layer, IEEE Photonics Technology Letters, Mar. 1991, pp. 250-252, vol. 3, No. 3, IEEE Xplore Digital Library, United States.

Mansour I. Irshid and Moshen Kavehrad, Star Couplers With Gain Using Fiber Amplifiers, IEEE Photonics Technology Letters, Jan. 1992, pp. 58-60, vol. 4, No. 1, IEEE Xplore Digital Library, United States.

Keiji Kuroda and Yuzo Yoshikuni, Two-Wavelength Pump-Probe Technique Using Single Distributed Feedback Laser Array to Probe Gain Recovery of an Erbium-Doped Fiber Amplifier, Optical Fiber Technology, Mar. 2017, pp. 20-22, vol. 34, Elsevier, Inc.

The International Bureau of WIPO, International Preliminary Report on Patentability (for Intl. Appl. No. PCT/US2017/023431), dated Sep. 25, 2018, 7 pages, Geneva, Switzerland.

Singapore Search Report and Written Opinion dated Aug. 20, 2019 issued in corresponding Singapore Application No. 10201901665X.

Federal institute of industrial property Search Report dated Apr. 1, 2019.

Paul Marks, It's a Cloud, but Not as We Know It, ACM News, Communications of the ACM, Jul. 8, 2019, United States.

KIPO Notice of Preliminary Rejection (English Translation), dated Nov. 25, 2019, in S. Korean Patent Application No. 10-2018-7030269 (3 pages).

PCT International Search Report and Written Opinion in International Application No. PCT/US2019/044744 dated Oct. 29, 2019 (11 pages).

PCT International Search Report and Written Opinion in International Application No. PCT/US2019/045825 dated Nov. 1, 2019 (7 pages).

PCT International Search Report and Written Opinion in International Application No. PCT/US2019/059523 dated Jan. 22, 2020 (12 pages).

JPO Notice of Preliminary Rejection (English Translation), dated Jan. 14, 2020, in Japanese Patent Application No. 2018-550424 (4 pages).

JPO Notice of Preliminary Rejection (English Translation), dated Jan. 14, 2020, in Japanese Patent Application No. 2019-056078 (4 pages).

European Search Report and Written Opinion dated Nov. 5, 2019 issued in corresponding European Application 17 770 999.5 (Search Report 4 pgs.; Opinion 4 pgs. totaling 8 pgs.).

\* cited by examiner

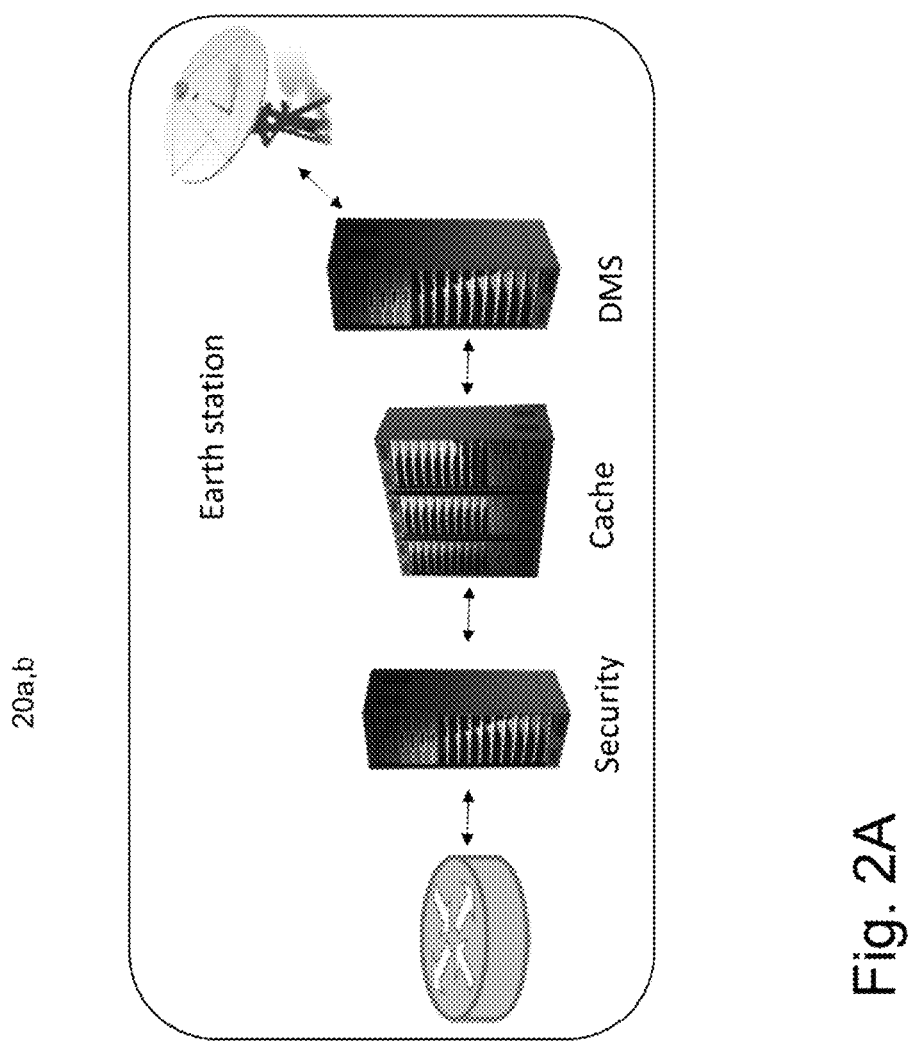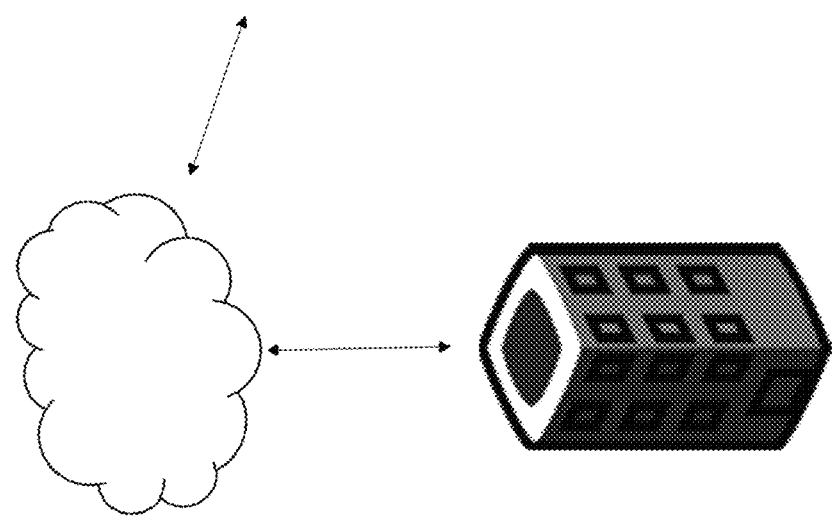
Fig. 2A

Corner cube reflector

Amplifier

Other Elements

Saturable Absorber

Non Linear Etalon

DATA IN MOTION STORAGE SYSTEM AND METHOD

CROSS-REFERENCE TO RELATED APPLICATION

The present non-provisional patent application claims the benefit of priority from U.S. Provisional Patent Application No. 62/311,814, filed Mar. 22, 2016, the entire contents of each of which are incorporated herein by reference.

FIELD OF THE DISCLOSURE

The present disclosure relates to the field of information storage technology and, in particular, to a system in which information may be stored as electromagnetic radiation in motion, for example, as lasers or other optical beams carrying data and transmitted or reflected between structures or within structures, cavities and/or with/using different transmission media, including vacuum, crystals, nonlinear media, free space, optical waveguides or optical fibers.

BACKGROUND OF THE DISCLOSURE

In an electromagnetic communication system, a maximum transmission distance of the signal, such as a beam of light, is dictated by the loss experienced by the signal in free space or in the optical fiber or other waveguide, the spreading of the signal carrying the data due to various dispersive and nonlinear effects, and the addition of noise from sources including, but not limited to, perturbations of the system, random scattering events and spontaneous emission of light. As a result, when transmitting a signal over longer distances, the signal typically has to be regenerated at various distance intervals. Full data signal regeneration is typically considered a "3R" process that includes data retiming, reshaping, and reamplification (or amplification).

Laser-based data communication in space is well known. For example, the Artemis satellite of the European Space Agency has provided an optical data transmission link with the CNES Earth observation satellite, SPOT 4. Communication range in space for optical communication is reliable at several thousand kilometers. Laser or optical communication over distances orders of magnitude greater than this may also be achievable. NASA's Optical Payload for Lasercomm Science (OPALS) project has also successfully demonstrated high data transfer rates using optical communication between Earth stations and the International Space Station. Another example, in January 2013, NASA transmitted lasers representing an image of the Mona Lisa to a lunar reconnaissance orbiter roughly 390,000 kilometers away.

Conventional datacenters have a variety of drawbacks, including that they may be expensive to maintain, may require various types of media, and are subject to being hacked into and accessed physically or remotely without authorization, such that data may can be copied, destroyed, or otherwise changed without authorization access or attacked. In addition, power outages, natural disasters and calamities, such as fire, flooding, earthquakes, and war, can impact conventional terrestrial datacenters. Also data that has been erased from one of these data centers may be recoverable by a person with the right expertise. These data centers also have the disadvantage of substantial overhead costs such as rent, cooling expenses, electricity costs, and physical security. Conventionally, data storage units can be built out of multiple racks, where each (data) rack is comprised of multiple hard drives in (which can be based on various technologies) and computers, such as routers, switches, firewalls, and other devices. This set up has numerous limitations and challenges, including but not limited to, high operating expenses, as noted above, as well as requirements for rather large physical locations, high consumption of electric power, significant maintenance as well as high cooling needs.

Orienting and pointing of an electromagnetic beam in a laser context can be done using a gimbal, or an optical phase array, as well as other well-known approaches used to point to a fine angular accuracy. Each of the signal transmitter may be selectively steered for optical communication with the targets, such as reflecting surfaces. An inertial reference system may be used in concert with adjustable elevation settings to track the neighboring satellites in the constellation. Beam steering mirrors may be used to compensate for host satellite jitter and slight orbit differences. Further examples are provided in the discussion in the National Academy of Science Study "Laser Radar: Progress and Opportunities in Active Electro-Optical Sensing" 2014 chaired by Dr. Paul McManamon, attached herewith and incorporated in full herein by reference. Incorporated in full by reference herein are the following: U.S. Pat. No. 5,602,838 to Kartaloupolos, U.S. Pat. No. 6,002,916 to Lynch, U.S. Pat. No. 6,043,918 to Bozzay et al., U.S. Pat. No. 7,103,280 to Ionov et al., U.S. Pat. No. 8,913,894 to Coleman et al., U.S. 2010/0269143 to Rabowsky, U.S. 2010/0279604 to Wood, U.S. Pat. No. 4,856,862 to Passmore et al., U.S. Pat. No. 4,815,804 to Desurview et al., U.S. Pat. No. 4,653,042 to d'Auria et al., U.S. Pat. No. 5,862,286 to Imanishi et al., Pidishety, "Investigation of scalability of all-fiber fused mode selective coupler for generating multiple OAM states," in Proceedings of International Conference on Fiber Optics and Photonics, 2016, U.S. Pat. No. 4,136,929 to Suzaki, McDonald et al., "Spatial Solitary-Wave Optical Memory," Journal of the Optical Society of America B (Optical Physics), vol. 7, no. 7, pp. 1328-1335, 1990, Leo et al., "Temporal cavity solitons in one-dimensional Kerr media as bits in an all-optical buffer," Nature Photonics, vol. 4, pp. 471-476, 2010, U.S. Pat. No. 7,199,343 to Modley, U.S. Pat. No. 5,740,117 to Bona et al., Boyd et al., "Applications of Slow Light in Telecommunications," Optics & Photonics News, vol. 17, no. 4, pp. 18-23, 2006, G.B. 1998/000821 to Poustie et al., U.S. Pat. No. 4,479,701 to Newton et al., U.S. Pat. No. 4,877,952 to Halemane et al., U.S. Pat. No. 4,469,397 to Shaw et al., U.S. 2007/0081785 to Hays, U.S. Pat. No. 4,738,503 to Desurvire et al., U.S. Pat. No. 6,917,739 to Chen, U.S. Pat. No. 6,172,926 to Drayer, U.S. Pat. No. 5,533,154 to Smith, U.S. Pat. No. 5,566,261 to Hall et al., U.S. Pat. No. 6,647,163 to Song, U.S. Pat. No. 5,058,060 to Su, U.S. 2003/0007230 to Kanko et al., U.S. 2002/0196488 to Myers, U.S. Pat. No. 4,166,212 to J. Judenstein, U.S. Pat. No. 4,473,270 to Shaw, U.S. Pat. No. 8,582,972 to Small et al, U.S. 2009/0202191 to Ramachandran, U.S. Pat. No. 7,177,510 to Ramachandran, U.S. Pat. No. 7,110,651 to Golwich et al., U.S. Pat. No. 4,974,931 to Poole, and U.S. Pat. No. 7,103,239 to Kish, Jr. et al.

SUMMARY

A data storage system and method are described. In one embodiment, a system according to an aspect of the disclosure includes a data management system configured to manage digital data in the data storage system; a terrestrial transmitter configured to transmit a radio frequency signal carrying the digital data to a communication satellite; the communication satellite configured to convert the radio frequency signal to a signal and to transmit the signal to a first laser satellite; the first laser satellite comprising a laser signal generator configured to generate a laser signal carrying the digital data, and the laser signal generator configured to transmit the digital data to a second laser satellite; the second laser satellite configured to return to the first laser satellite the digital data transmitted from the first satellite; and the first laser satellite configured to return to the second laser satellite the digital data transmitted from the second laser satellite, such that the digital data may be transmitted in a recirculating loop of storage in motion, wherein at least one of the first laser satellite and the second laser satellite may be configured to retrieve a block of data of the digital data identified by the data management system. A recirculating loop, according to an aspect of the disclosure, may include a signal loop in which the signal is maintained until the system is shut off or disassembled or until the signal is erased.

In such a system, the data management system may identify the block of data as being responsive to a request for the block of data received, the block of data being less than an entirety of the digital data.

According to another aspect of the disclosure, disclosed is a data storage system that includes a recirculating loop configured to store data in motion and comprising a first vessel and a second vessel positioned remote from the first vessel; the first vessel comprising at least one selected from the group consisting of a signal generator and a signal transmitter configured to transmit the data to the second vessel; the second vessel configured to return to the first vessel the data transmitted from the first vessel; and the first vessel configured to return to the second vessel the data transmitted from the second vessel. A signal may be returned by reflecting all or part of it, or it may be returned by regenerating the signal and transmitting it.

A data management system of such a data storage system may be configured to manage the data in the data storage system, wherein at least one of the first vessel and the second vessel may be configured to retrieve a block of data of the data identified by the data management system as being responsive to a data retrieval request for the block of data received from outside the data storage system, the block of data being less than an entirety of the data.

In such a system, for each roundtrip of the signal through the recirculating loop the signal may be kept in motion.

In such a system, at least one of the first vessel and the second vessel may be a satellite.

In such a system, at least one of the first vessel and the second vessel may be a satellite in geosynchronous orbit around the earth. In such a system, at least one of the first vessel and the second vessel may be a ship, an aircraft, such as airplane, a hot air balloon, or a drone, a submarine, or a stationary sea structure, for example, an oil rig.

In such a system, the recirculating loop may compare a third vessel, and the second vessel may be configured to return the data to the first vessel via the third vessel by transmitting the data to the third vessel.

In such a system, the recirculating loop may be configured to recirculate the data between vessels recurring in consecutive sequence.

In such a system, at least one of the first and the vessel may comprise a reflecting surface positioned and configured to return the signal.

In such a system, the second vessel may comprise a corner cube positioned and configured to return the signal. A land station signal link to such a recirculating link may use electromagnetic signaling, such as RF or optical signals, or other type signaling.

In such a system, the at least one of the signal generator and the signal transmitter may generate an electromagnetic radiation signal carrying the data and transmitted to the second vessel.

In such a system, the at least one of the signal generator and the signal transmitter may generate an optical beam signal, for example, a laser signal, carrying the data and transmitted to the second vessel.

In such a system, the at least one of the signal generator and the signal transmitter may be configured to generate a multiplexed electromagnetic signal comprising a first set of multiplexed signals, each signal of the first set of multiplexed electromagnetic signals comprising a second set of multiplexed electromagnetic signals generated using a multiplexing scheme different from the first set of multiplexed signals.

In such a system, the first vessel comprises a system asset tracker that may be configured to maintain position information regarding the second vessel.

In such a system, the system may further comprise an error checker configured to perform cyclic redundancy check to ensure data integrity.

Such a system may also include a controller configured to receive, at a first time, a first request from outside the data storage system to perform a first operation, the first operation comprising one of a read operation, a write operation, and a delete operation for a first block of data of the data, and to receive, at a second time after the first time, a second request from outside the data storage system to perform a second operation, the second operation comprising one of the read operation, the write operation, and the delete operation for a second block of data of the data, wherein the system performs the first operation after performing the second operation.

In such a system, when the first operation is the read operation, the second operation may be the read operation; when the first operation is the write operation, the second operation may be the write operation, and when the first operation is the delete operation, the second operation may be the delete operation.

In such a system, the at least one of the signal generator and the signal transmitter may be configured to generate a code division multiplexed signal as the signal, the code division multiplexed signal comprising a first set of multiplexed signals such that a first multiplexed signal of the first set carries data other than a second multiplexed signal of the first set.

In such a system, the at least one of the signal generator and the signal transmitter may be configured to generate an orbit angular momentum division multiplexed signal as the signal, the orbit angular momentum division multiplexed signal comprising a first set of multiplexed signals such that a first multiplexed signal of the first set carries data other than a second multiplexed signal of the first set.

In such a system, at least one of the signal generator and the signal transmitter may be configured to generate a space division multiplexed signal as the signal, the space division multiplexed signal comprising a first set of multiplexed signals such that a first multiplexed signal of the first set carries data other than a second multiplexed signal of the first set.

In such a system, the at least one of the signal generator and the signal transmitter may be configured to generate a polarization division multiplexed signal as the signal, the polarization division multiplexed signal comprising a first set of multiplexed signals such that a first multiplexed signal of the first set carries data other than a second multiplexed signal of the first set.

In such a system, the at least one of the signal generator and the signal transmitter may be configured to generate a frequency division multiplexed signal as the signal, the frequency division multiplexed signal comprising a first set of multiplexed signals such that a first multiplexed signal of the first set carries data other than a second multiplexed signal of the first set.

Such a system may also include a data management system configured to associate a data block carried by a portion of the signal with at least one of a physical property and a location of the portion of the signal; and a controller configured to generate a control signal controlling an operation on the data block, the control signal may be generated based on a clock signal with reference to the at least one of the physical property and the location of the portion of the signal.

Such a system may also include a data management system configured to manage data in the data storage system and configured to receive a request from outside the data storage system to at least one of delete, write and update a block of data in the data, wherein the recirculating loop comprises an eraser configured to erase, based on information received from the data management system, a first portion of the signal, the first portion carrying the data block, the data block being less than an entirely of the data.

According to another aspect of the disclosure, disclosed is a data storage system including a recirculating loop configured to maintain a laser signal carrying the digital data in motion and including an optical waveguide, an optical waveguide coupler, and a regenerator; a signal generator configured to generate a laser signal carrying the digital data and to transmit the laser signal into an input/output optical waveguide; the optical waveguide coupler coupling the laser signal between the input/output optical waveguide and the optical waveguide; and the regenerator coupled to the optical waveguide and configured to amplify and/or regenerate the laser signal through the optical waveguide.

Such a system may also include a data management system configured to manage digital data in the data storage system, wherein the recirculating loop may comprise an eraser configured to erase, according to timing based on information provided by the data management system, a portion of the laser signal carrying a block of data of the digital data, the portion of the laser signal being less than an entirety of the laser signal.

In such a system, the signal generator may be configured to generate a multiplexed signal as the laser signal, the multiplexed signal comprising a first set of multiplexed laser signals, such that a first multiplexed laser signal of the first set carries data other than a second multiplexed laser signal of the first set, each laser signal of the first set of multiplexed signals comprising a second set of multiplexed laser signals generated using a multiplexing scheme different from the multiplexing scheme used to generate the first set of multiplexed signals.

In such a system, each laser signal of the second set of multiplexed laser signals may comprise a third set of multiplexed laser signals generated using a multiplexing scheme different from the multiplexing scheme used to generate the first set of multiplexed signals and from the multiplexing scheme used to generate the second set of multiplexed signals.

According to a further aspect of the disclosure, a data storage system disclosed that includes a recirculating loop configured to maintain a signal carrying data in motion and including a waveguide and a waveguide coupler; the waveguide coupler configured to couple a signal carrying the data into the waveguide; and a signal conditioner configured to condition the signal conveyed through the waveguide by at least one of amplifying and regenerating the signal.

In such a system, the waveguide may comprise optical fiber.

Such a system may include a signal generator configured to transmit the signal to the waveguide coupler, wherein the signal generated by the signal generator may be an electromagnetic signal.

Such a system may include a signal generator configured to transmit the signal to the waveguide coupler, wherein the signal generated by the signal generator may be a laser signal.

In such a system, the recirculating loop may further comprise the signal conditioner, and the waveguide may comprise a first segment positioned to convey the signal between the waveguide coupler and the signal conditioner and a second segment connected to the signal conditioner, the first segment being free of direct physical connection with the second segment.

In such a system, the recirculating loop may comprise the signal conditioner, and the signal conditioner may comprise a signal amplifier configured to amplify at least a portion of the signal each time the signal passes through the signal conditioner.

Such a system may include a data management system configured to manage data in the data storage system and configured to receive a request from outside the data storage system to at least one of delete, write and update a block of data in the data, wherein the recirculating loop may comprise an eraser configured to erase, based on information received from the data management system, a first portion of the signal, the first portion carrying the data block, the data block being less than an entirely of the data.

In such a system, the data management system may be configured to generate timing information according to the request, and the information received by the eraser from the data management system in the timing information.

Such a system may include a signal generator configured to transmit the signal to the waveguide coupler, wherein the signal carrying the data generated by the signal generator may be a signal multiplexed by a propagation-direction multiplexer configured to transmit a first portion of the signal through the recirculating loop in a first direction and to transmit a second portion of the signal through the recirculating loop in a second direction different from the first direction.

Such a system may include a signal regenerator, wherein the signal conditioner may be a signal amplifier configured to amplify at least some of the signal, wherein, the signal regenerator may be configured to regenerate, at a first timing, only a first portion of the signal, the first portion of the signal being less than an entirety of the signal, and to regenerate, at a second timing after the first timing, only a second portion of the signal, the second portion of the signal being less than an entirety of the signal.

In such a system, the system may regenerate the signal asynchronously such that the second portion is a least recently regenerated portion of the signal.

In such a system, the system may regenerate only the first portion of the signal at a third timing, and may regenerate only the second portion of the signal at a fourth timing, an interval between the first and third timing being greater than an interval between the second and fourth timing.

In such a system, the system may regenerate only the first portion of the signal interleaved with the regenerating of only the second portion of the signal.

Such a system may also include a controller configured to receive, at a first time, a first request from outside the data storage system to perform a first operation, the first operation comprising one of a read operation, a write operation, and a delete operation for a first block of data of the data, and to receive, at a second time after the first time, a second request from outside the data storage system to perform a second operation, the second operation comprising one of the read operation, the write operation, and the delete operation for a second block of data of the data, wherein the system performs the first operation after performing the second operation.

In such a system, when the first operation is the read operation, the second operation may be the read operation; when the first operation is the write operation, the second operation may be the write operation, and when the first operation is the delete operation, the second operation may be the delete operation.

Such a system may also include a data integrity determiner configured to determine data integrity only of the first portion when the signal regenerator regenerates the first portion, and to determine data integrity only of the second portion when the signal regenerator regenerates the second portion.

In such a system, the system may further comprise an error cyclic redundancy checker configured to perform cyclic redundancy check to ensure data integrity.

In such a system, the recirculating loop may further comprise a signal filter configured to impose signal loss on the signal in dependence, in a non-linear manner, on signal intensity of the signal.

In such a system, the recirculating loop may further comprise a signal filter configured to filter out a portion of the signal with signal intensity below a first value.

In such a system, the recirculating loop further may comprise a signal filter configured to provide signal loss to a first portion of the signal, the first portion of the signal having a signal intensity greater than a second portion of the signal, wherein the signal loss provided may be mathematical function of a time varying intensity of the first portion of the signal.

In such a system, the recirculating loop may further comprise a signal filter configured to provide signal loss to a first portion of the signal and to a second portion of the signal, the first portion having a signal intensity greater than the second portion, wherein the signal loss provided to the first portion may be greater than a roundtrip gain, and the signal loss provided to the second portion may be less than the roundtrip gain.

In such a system, the recirculating loop further may comprise a signal filter comprising a material with a first index of refraction, the signal filter may be configured to provide a signal loss to a first portion of the signal with a signal intensity below a first value, and to change the index of refraction of the material so as to provide a signal loss to a second portion of the signal with a second intensity higher than the first value.

In such a system, the waveguide coupler may comprise a first coupler and a second coupler, the first coupler configured to couple only a first portion of the signal, and the second coupler configured to couple only a second portion of the signal other than the first portion, wherein the first and second portions are multiplexed in the signal as part of a first multiplexing scheme.

In such a system, the first coupler may comprise a third coupler and a fourth coupler, the third coupler configured to couple only a third portion of the signal other than the second portion, and the fourth coupler configured to couple only a fourth portion of the signal other than the second portion and other than the third portion, wherein the first portion may comprise the third and fourth portions, and the third and fourth portions are multiplexed in the signal as part of a second multiplexing scheme different from the first multiplexing scheme.

In such a system, the waveguide coupler may comprise a signal in-coupler configured to transmit the signal into the waveguide, and a signal out-coupler configured to remove signal from the waveguide, wherein the signal in-coupler may be positioned at the recirculating loop remote from the signal out-coupler.

In such a system, the waveguide may be a nanostructured optical fiber.

Such a system may also include a signal generator configured to transmit the signal to the waveguide coupler, wherein the signal generator may be configured to generate a multiplexed electromagnetic signal as the signal, the multiplexed electromagnetic signal comprising a first set of multiplexed electromagnetic signals, such that a first multiplexed signal of the first set carries data other than a second multiplexed signal of the first set, wherein each signal of the first set of multiplexed electromagnetic signals may comprise a second set of multiplexed electromagnetic signals generated using a multiplexing scheme different from the multiplexing scheme used to generate the first set of multiplexed electromagnetic signals.

In such a system, each laser signal of the second set of multiplexed electromagnetic signals may comprise a third set of multiplexed electromagnetic signals generated using a multiplexing scheme different from the multiplexing scheme used to generate the first set of multiplexed electromagnetic signals and from the multiplexing scheme used to generate the second set of multiplexed electromagnetic signals.

Such a system may also include a signal generator configured to transmit the signal to the waveguide coupler, wherein the signal generator may be configured to generate a code division multiplexed signal as the signal, the code division multiplexed signal comprising a first set of multiplexed signals such that a first multiplexed signal of the first set carries data other than a second multiplexed signal of the first set.

Such a system may also include a signal generator configured to transmit the signal to the waveguide coupler, wherein the signal generator may be configured to generate an orbit angular momentum division multiplexed signal as the signal, the orbit angular momentum division multiplexed signal comprising a first set of multiplexed signals such that a first multiplexed signal of the first set carries data other than a second multiplexed signal of the first set.

Such a system may also include a signal generator configured to transmit the signal to the waveguide coupler, wherein the signal generator may be configured to generate a space division multiplexed signal as the signal, the space division multiplexed signal comprising a first set of multiplexed signals such that a first multiplexed signal of the first set carries data other than a second multiplexed signal of the first set.

Such a system may also include a signal generator configured to transmit the signal to the waveguide coupler, wherein the signal generator may be configured to generate a polarization division multiplexed signal as the signal, the polarization division multiplexed signal comprising a first set of multiplexed signals such that a first multiplexed signal of the first set carries data other than a second multiplexed signal of the first set.

Such a system may also include a signal generator configured to transmit the signal to the waveguide coupler, wherein the signal generator may be configured to generate a frequency division multiplexed signal as the signal, the frequency division multiplexed signal comprising a first set of multiplexed signals such that a first multiplexed signal of the first set carries data other than a second multiplexed signal of the first set.

Such a system may also include a data management system configured to associate a data block carried by a portion of the signal with at least one of a physical property and a location of the portion of the signal; and a controller configured to generate a control signal controlling an operation on the data block, the control signal generated based on a clock signal with reference to the at least one of the physical property and the location of the portion of the signal.

Such a system may also include a data management system configured to manage data in the data storage system and configured to receive a request from outside the data storage system to at least one of delete, write and update a block of data in the data, wherein the recirculating loop may comprise an eraser configured to erase, based on information received from the data management system, a first portion of the signal, the first portion carrying the data block, the data block being less than an entirely of the data.

In such a system, the signal conditioner may be configured to provide a first signal gain to a first portion of the signal, wherein the first signal gain may be provided according to information regarding signal intensity obtained for a previous roundtrip of the signal through the recirculating loop.

In such a system, the signal conditioner may be configured to provide filtering of the signal by providing signal amplification to a first portion of the signal, wherein the signal amplification may be provided to the first portion when the first portion meets a phase-matching condition.

In such a system, the signal conditioner may be configured to provide a pump beam and an idler beam, the pump beam and the idler beam configured to provide the filtering.

Such a system may also include an optical cavity comprising a recirculating loop configured to maintain an optical signal carrying data in motion, and the recirculating loop including a signal coupler, a first signal returner, and a signal conditioner configured to condition the signal by at least one of amplifying and regenerating the signal; the signal coupler configured to couple at least a portion of the signal into the optical cavity by transmitting the signal to the first signal returner; the first signal returner positioned and configured to return the signal to the signal coupler; and the signal coupler configured to return the signal received from the first signal returner to the first signal returner.

In such a system, the signal coupler may comprise a signal in-coupler configured to transmit the signal into the optical cavity, and a signal out-coupler configured to remove signal from the optical cavity, wherein the signal in-coupler may be positioned at the optical cavity remote from the signal out-coupler.

In such a system, the loop comprises a second signal returner, and the first signal returner may be configured to return the signal to the signal coupler by transmitting the signal to the second signal returner.

In such a system, the optical cavity may comprise a continuous reflecting surface comprising the first signal returner and the second signal returner.

In such a system, the first signal returner may return the signal by reflecting the signal off a reflecting surface.

According to an aspect of the disclosure, also provided is a method of filtering an optical signal, the method including amplifying the optical signal by providing signal gain; and imposing signal loss on the optical signal in dependence, in a non-linear manner, on signal intensity of the optical signal, wherein the imposing the signal loss includes providing signal loss to a first portion of the optical signal, the first portion of the optical signal having a signal intensity greater than a second portion of the optical signal, the signal loss provided to the first portion being greater than the signal gain; and providing to the second portion signal loss less than the signal gain.

In such a method, the signal loss provided may be a mathematical function of a time varying intensity of the first portion of the signal.

In such a method, the signal filter may comprise a material with a first index of refraction, the signal filter configured to provide the signal loss to a third portion of the signal with a signal intensity below a first value, and the method may comprise changing the index of refraction of the material so as to provide the signal loss to the first portion of the signal with a second intensity higher than the first value.

Also described is a data storage method using a recirculating loop configured to maintain a signal carrying data in motion and including a signal introducer and a signal returner. This method may include introducing, by the signal introducer, the signal carrying the data into the recirculating loop; returning, by the signal returner, the signal to the signal introducer; and returning, by the signal introducer, the signal received from the signal returner to the signal returner.

In such a method, the signal returner may be a waveguide, and the signal introducer may be a waveguide coupler configured to couple the signal between a signal generator and the waveguide.

In such a method, the signal returner may comprise a reflecting surface.

In such a method, the signal introducer may be positioned on a vessel.

Such a method may also include recirculating a first portion of the signal through the recirculating loop in a first direction; and recirculating a second portion of the signal through the recirculating loop in a second direction different from the first direction, the first portion being other than the first portion.

In such a method, a signal generator may be configured to generate a multiplexed electromagnetic signal as the signal, the multiplexed electromagnetic signal comprising a first set of multiplexed electromagnetic signals, such that a first multiplexed signal of the first set carries data other than a second multiplexed signal of the first set, wherein each signal of the first set of multiplexed electromagnetic signals may comprise a second set of multiplexed electromagnetic signals generated using a multiplexing scheme different from the multiplexing scheme used to generate the first set of multiplexed electromagnetic signals.

In such a method, each signal of the second set of multiplexed electromagnetic signals may comprise a third set of multiplexed electromagnetic signals generated using a multiplexing scheme different from the multiplexing scheme used to generate the first set of multiplexed electromagnetic signals and from the multiplexing scheme used to generate the second set of multiplexed electromagnetic signals.

In such a method, a signal generator may be configured to generate a code division multiplexed signal as the signal, the code division multiplexed signal comprising a first set of multiplexed signals such that a first multiplexed signal of the first set carries data other than a second multiplexed signal of the first set.

In such a method, a signal generator may be configured to generate an orbit angular momentum division multiplexed signal as the signal, the orbit angular momentum division multiplexed signal comprising a first set of multiplexed signals such that a first multiplexed signal of the first set carries data other than a second multiplexed signal of the first set.

In such a method, a signal generator may be configured to generate a space division multiplexed signal as the signal, the space division multiplexed signal comprising a first set of multiplexed signals such that a first multiplexed signal of the first set carries data other than a second multiplexed signal of the first set.

In such a method, a signal generator may be configured to generate a polarization division multiplexed signal as the signal, the polarization division multiplexed signal comprising a first set of multiplexed signals such that a first multiplexed signal of the first set carries data other than a second multiplexed signal of the first set.

In such a method, a signal generator may be configured to generate a frequency division multiplexed signal as the signal, the frequency division multiplexed signal comprising a first set of multiplexed signals such that a first multiplexed signal of the first set carries data other than a second multiplexed signal of the first set.

In such a method, a data management system may be configured to associate a data block carried by a portion of the signal with at least one of a physical property and a location of the portion of the signal; and the method may further include generating a control signal controlling an operation on the data block, the control signal generated based on a clock signal with reference to the at least one of the physical property and the location of the portion of the signal.

In such a method, a data management system may be configured to manage data in the data storage system; and the method may further include receiving a request from outside the data storage system to at least one of delete, write and update a block of data in the data; and erasing, by an eraser comprised in the recirculating loop, based on information received from the data management system, a first portion of the signal, the first portion carrying the data block, the data block being less than an entirely of the data.

Such a method may also include providing, by a signal conditioner positioned in the recirculating loop, a first signal gain to a first portion of the signal, wherein the first signal gain may be provided according to information regarding signal intensity obtained for a previous roundtrip of the signal through the recirculating loop.

Such a method may also include providing, by a signal conditioner, filtering of the signal by providing signal amplification to a first portion of the signal, when the first portion meets a phase-matching condition.

Other features and advantages of the present invention will become apparent from the following description of the invention, which refers to the accompanying drawings.

BRIEF DESCRIPTION OF THE DRAWINGS

FIG. 2A illustrates components of an Earth station that communicates with the user and with the satellite-based information storage system, according to an example of the present disclosure.

Figure 1:
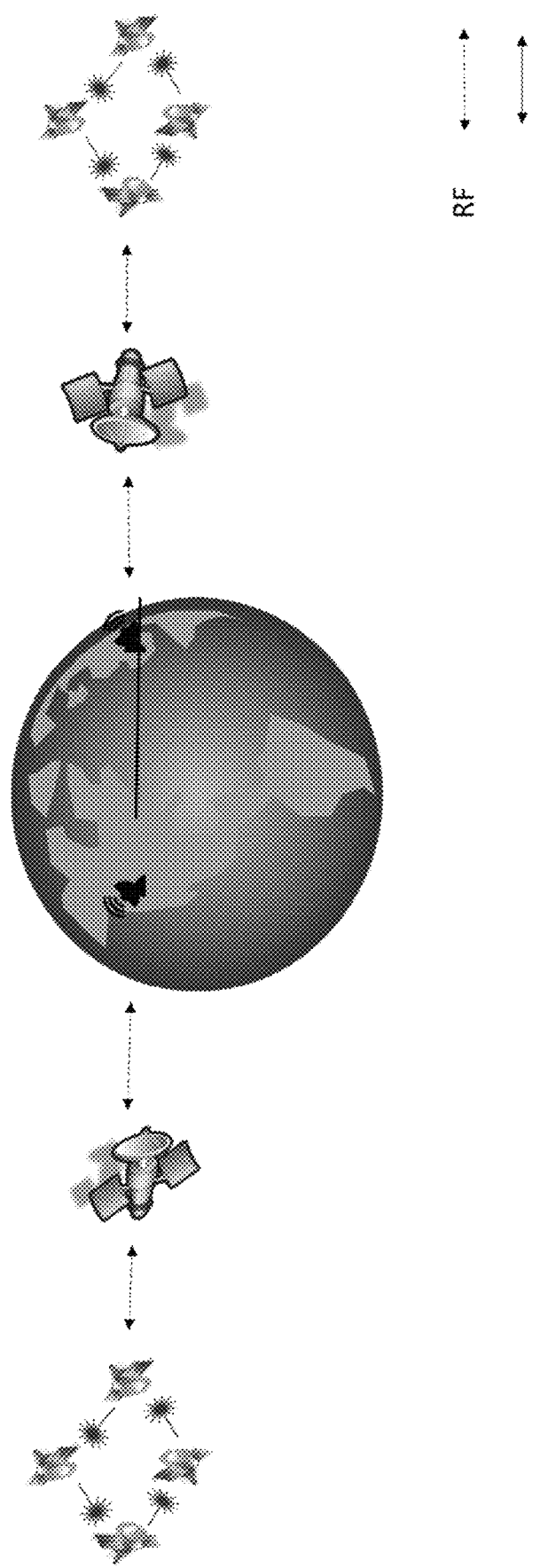
FIG. 1 illustrates major constituents of a satellite-based information storage system, according to an example of the present disclosure.

The Drawings illustrate examples of aspects of the disclosure. Other features and advantages of the disclosure will become apparent from the following description of the invention, and/or from the combination of one or more of the figures and the textual description herein, which refers to the accompanying drawings.

DETAILED DESCRIPTION OF THE EMBODIMENTS

Disclosed are a method and system for storing information or any kind of data as electromagnetic radiation or as one or more other types of signals in motion. A recirculating loop maintains the signal carrying the data in motion, for example. The recirculating loop may be formed of satellites or other vessels that reflect or otherwise retransmit the data in free space or through a waveguide, such as one or more pieces of optical fiber. The recirculating loop may also include a coupler that injects signal into the recirculating loop and removes signal therefrom, a signal conditioner, such as an amplifier, that amplifies the signal recirculating in the loop and may filter the signal. An optical cavity may also be used to maintain the signal in a recirculating loop. The nodes that reflect or otherwise return the signal may be repeated in a consecutive order or the order of the nodes may vary from roundtrip to roundtrip. The waveguide implementation and the optical cavity implementation may be provided as a terrestrial or other data center or as a stand-alone device and the signal may be a laser.

In one, example, a satellite-based laser, a land or on/under-water based laser or optical beam, or any as other electromagnetic radiation may be used to transmit and store data. Electromagnetic radiation or electromagnetic beam as used herein may include any kind of electromagnetic signal, including a laser beam or signal, a maser beam or signal, an optical beam or signal, or any type of wired or wireless signal, including acoustic waves, radio waves, IR radiation, UV radiation, microwave-band transmission, or any combination of more than one of the foregoing. While referred to herein sometimes simply as a laser beam or signal, other types of optical signals and other types of electromagnetic radiation transmissions, including radio waves, microwaves, IR, UV and combinations of bandwidths of wavelengths of electromagnetic radiation, whether guided, shaped, phased, or none of the foregoing, are also intended to be included. A satellite as used herein can include a satellite or co-orbital objects, artificial or natural, including but not limited to objects in LEO (low Earth orbit), MEO (medium Earth orbit usually understood as above LEO, approximately 2,000 km, and below GEO, approximately 35,700 km-35,800 km), GEO (geostationary or geosynchronous orbit) or more distant orbits or in any other orbits or positions including but not limited to orbiting the Moon, as well as other celestial objects, including but not limited to reflectors, mirrors, corner cubes, electromagnetic (RF, laser optic etc.) receivers and/or transmitters on the Moon, in Lagrangian (Lagrange) points, on space stations and/or in any other positions on earth, space, or in/on/under water. Further the term satellite as used herein may refer to structures, such as reflective surfaces, including, for example, corner cubes, deployed alone as satellites or on, near, or in association with more conventional satellite structures. A signal, as used herein, may mean a beam, such as a laser or optical signal or a series of signal bursts transmitted in succession. While sometimes referred to herein as "information" or "data" it will be understood that what is transmitted as part of the signal or beam may include any kind of data, including non-payload data, instructions, header and footer data, encryption data, control data and other data. In some embodiments, data may be stored in motion as electromagnetic radiation within a specific "hard drive" unit or storage device, data rack-mounted device, box computer system, fiber optics cable, free space or any other form or substance capable of transferring electromagnetic signals. According to one aspect of the disclosure, the loop may recirculate the signal without demodulating it and storing it as electrical signals. For example, the signal may be kept in continuous motion even if with reflections and/or amplifications and/or filtering. According to another aspect of the disclosure, the recirculating loop may include a temporary electronic data buffer through which some or the entire signal is made to pass on each roundtrip or pass through the loop.

As illustrated in FIG. 1, Earth station 20a transmits, for example, via radio frequency transmission, commands for storing information in, updating and retrieving information from a satellite-based storage system. Earth station 20a may communicate with communications satellite 30a, as shown in FIG. 1, by way of illustrative example. In another embodiment, the end user may communicate directly with the satellites of the data storage system using VSAT (very small aperture terminal) or any other technology or any other form of electromagnetic communication. The end user may use satellite or any other form of communication to communicate with the earth station 20a, 20b or directly with the satellites 30, 40. A data management system, which may or may not include compression and/or encryption capabilities and which may be in the Earth station 20a, 20b or on the satellites 30, 40 and/or in any other location or part of any other component. Communication may be an RF communication or any type of electromagnetic communication or any combination of multiple electromagnetic communication types. The Earth station communications satellite 30a may then relay this information to a group or constellation of satellites 40a that implement the signaling for storing the information. However, according to some embodiments, Earth station 20a in some implementation communicates directly with the group of electromagnetic signal satellites 40a.

The group of electromagnetic signal satellites 40a passes to each other optical beams or other electromagnetic signals that carry data to encode or store the data. While illustrated as a group of four, the group of electromagnetic signal satellites 40a may include two or more satellites, or one satellite and a reflector satellite (the reflector positioned on a satellite or elsewhere), or multiple reflector(s). According to some embodiments, one (or many satellites) and a reflector positioned on a Moon, Earth, or any other location may be used, or a moon, Earth or other celestial body, or atmosphere, surface or other portion thereof, may be used as a reflector. The satellites 30, 40 may be positioned in LEO, MEO, GEO, Lagrange points or in other orbits or positions. The satellites 40 may have reflective surfaces that reflect the signal back to the transmitting satellite, which then transmits it back to the same satellite, or may transmit it to a third satellite or to a fourth satellite, and so forth, creating a recirculating data loop back to the first satellite. Also, a first satellite of the group of satellites 40a may transmit the signal to a second satellite of the group, which has one or more antennas or other receptors to receive the signal and then regenerates the signal and transmits it back to the first satellite or to another satellite of the group, instead of reflecting it. Signal may be thought of as being in continuous motion or in motion even if it may be reflected by a reflecting surface, such as a corner cube, or propagated through a waveguide as reflectance, as described below. A signal may be returned by reflecting the signal and/or by some other way of turning around the signal, such as transmitting or retransmitting, or by a combination of amplifying and reflecting.

The satellite 40 may aim the beam at a corner cube, reflector, or an electromagnetic communication receiver/transmitter (which could be on another satellite, on Earth or on the moon or any other position), which can be a simple, relatively inexpensive device deployed in space. In this way, satellite 40 may be provided, the satellite transmitting data to one or more receiver satellites or corner cubes or other reflectors. A reflector, as used herein, includes not only devices that reflect radiation in the technical physical sense, such as a mirror, Bragg reflector, or similar reflective surface, but also systems or devices the perform a substantially similar function of reversing or steering propagation of a beam, including but not limited to systems of two or more mirrors or reflective surfaces, systems of one or more lenses, waveguides and fibers that steer propagation, and phase-conjugate mirrors that absorb radiation while simultaneously creating new radiation with identical or nearly identical properties and characteristics propagating in the reverse direction. A corner cube may have reflecting surfaces positioned and sized such that light hitting the corner cube may be reflected back toward the source. Any such reflecting device or system may be said to "reflect" the radiation in question without loss of the foregoing generality. For example, a satellite may transmit different signals to many receiver satellites or corner cubes to achieve a large data (storage) capability by establishing multiple loops or a transmission mesh network. The satellite 40 and the device (or other reflector) on the other end forming a second node may be positioned tens of thousands of kilometers apart. For example, a distance on the order of 10,000 km or 80,000 km may be used or any other distance.

A satellite 40 at the other end from a transmitting satellite may receive the data and then transmit the data back to the originating satellite. This can be performed many different ways, as would be known to one of skill in the art. One example is to detect the light, convert into electricity, and then retransmit back to the originating satellite using electronic circuitry and another set of lasers or other optical sources. Another approach may be to recover the optical signals using apertures and spatial mode converters, amplify the data signals using an optical amplifier to compensate for transmission losses, and then convert the data signals back onto different spatial modes for retransmission back to the originating satellite. One can consider this an optical re-transmitter, for example using a 1R amplification station, as discussed below.

Alternatively, the receiving node that reflects the beam from the transmitting satellite may be, or may use, a corner cube (or other reflector) positioned alone or near the receiving satellite. Thus while sometimes described herein and illustrated in the drawings as a satellite that receives the beam the receiving node may be a reflective surface or other reflective device, such as, for example, a corner cube. Such reflective devices may also include transceivers that communicate a position and/or orientation of the reflective device to a controlling satellite, Earth Station or other node, and receive therefrom instructions for operation, including instructions to move position, change orientation, start operation, and the like.

Figure 9:
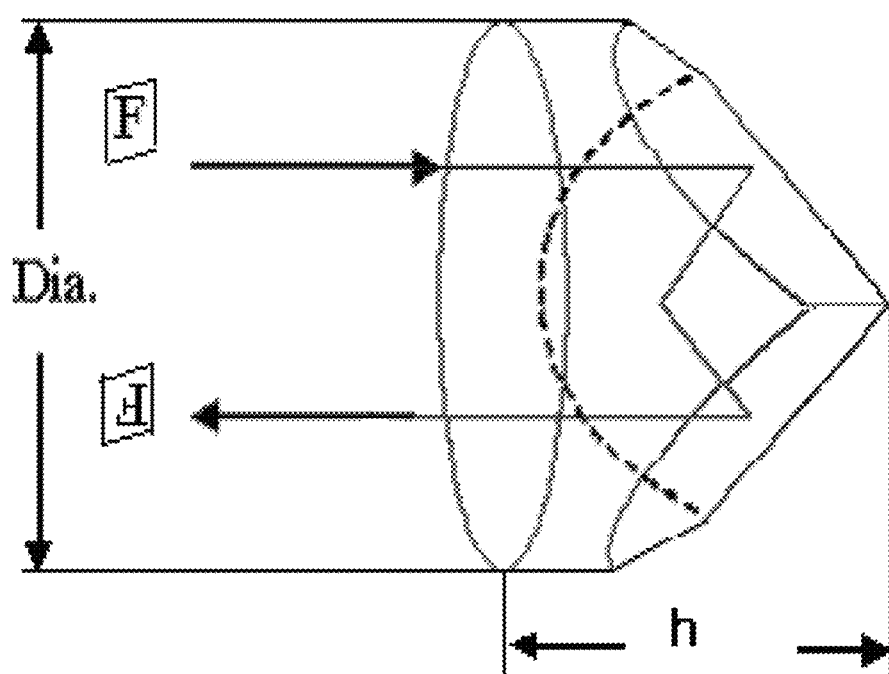
FIG. 9 is an illustration of an example of corner cube for receiving and returning a signal.
Figure 10:
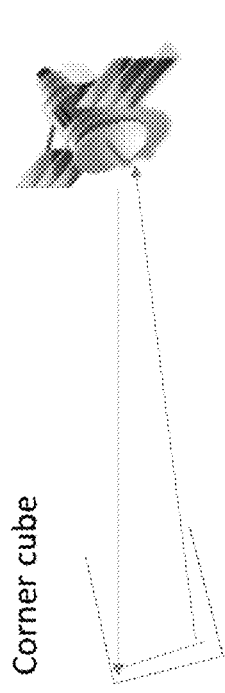
FIGS. 10 and 11 illustrate examples of an electromagnetic signal satellite transmitting an electromagnetic signal to a reflection structure, illustrated in FIG. 10 as a corner cube, and the satellite receiving the reflected signal back, according to an aspect of the present disclosure.
Figure 11:
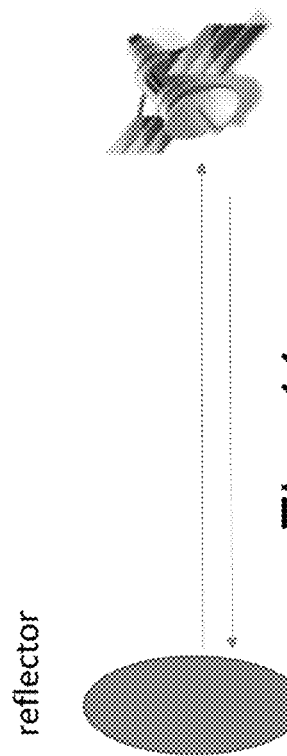
Figures 12, 13:
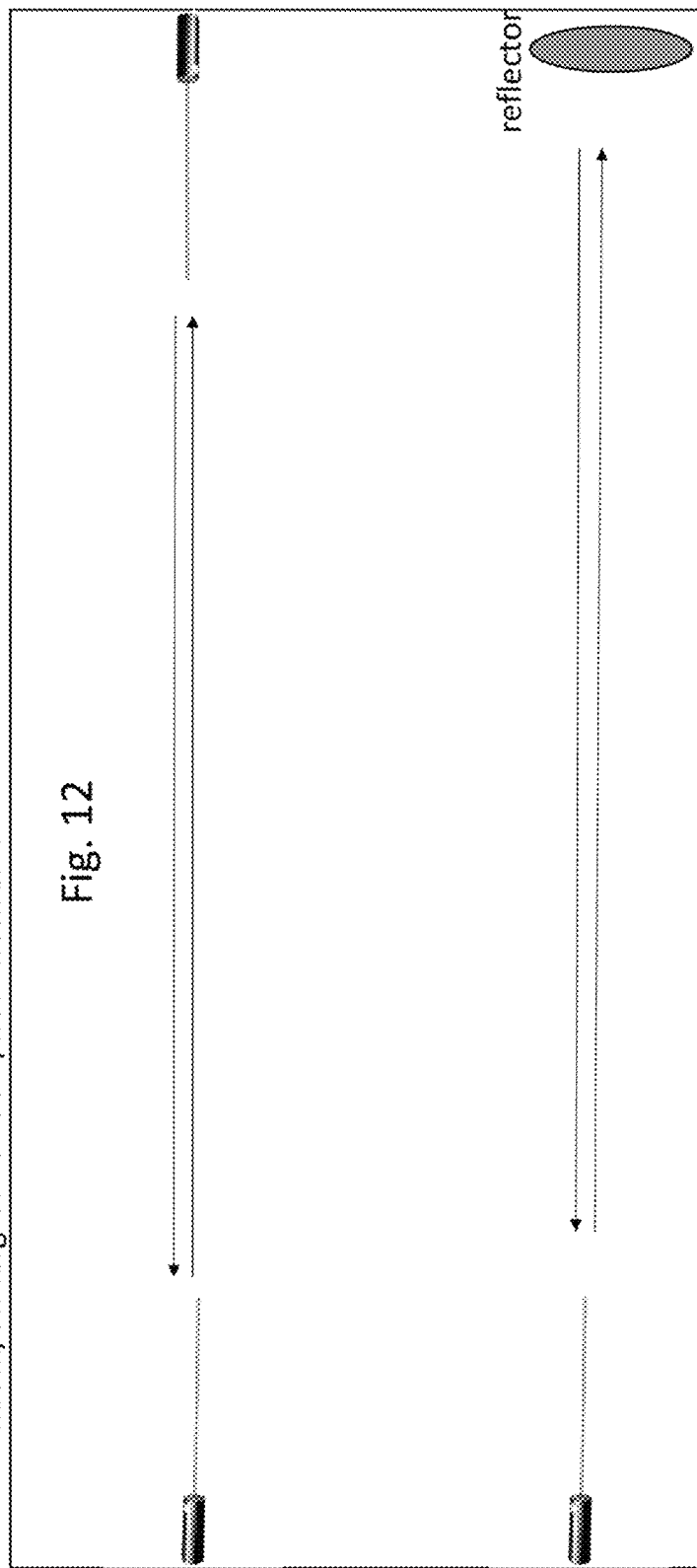
FIG. 12 illustrates an example of communication system between a first electromagnetic signal communication device transmitting an electromagnetic signal through a waveguide to a second electromagnetic communication device, and the second electromagnetic communication device transmitting the signal back to the first electromagnetic communication device, according to an aspect of the present disclosure.
FIG. 13 is an illustration of an example of a terrestrial or subterranean configuration in which a first electromagnetic communication signal device transmits the electromagnetic communication signal to a reflector surface, which may be a corner cube or another type of reflector, which is then reflected back to the electromagnetic signal communication device, according to an aspect of the present disclosure.

The cross section of a corner cube may be sized such that light hitting the corner cube is reflected back toward the source. A representation of a corner cube is shown in FIG. 9. Light hits the corner cube, bounces multiple times, then returns toward the exact place from which the light originated. The returned light may be a delta function in angle. The beam width of a beam limited by the diffraction limit is specified in equation (4) provided below. Lambertian scattering from a flat surface is reflected in a cosine pattern.

A corner cube can be a dihedral, which has two planes meeting and concentrates light in only one dimension. Alternatively, a corner cube can be a trihedral, concentrating light in two dimensions. A corner cube that is a trihedral would have a cross section $$\sigma \approx \frac{4a^4}{\lambda^2} \quad (1)$$

where a is the diameter of the corner cube, and $\lambda$ is the wavelength of the light, assuming that the corner cube comprises a perfect mirror with a reflectivity of 1 which is a reasonable approximation of a typical corner cube. This compares to a reflected area with a surface reflectivity which might be 3-20% of the illuminated area, or even more. The cross section of a flat surface is usually specified as:

$$\sigma = \rho A \quad (2)$$

where $\rho$ is the surface reflectivity and A is the illuminated area. The equivalent antenna gain can be estimated by taking the ratio of the cross section in equation (1) to the cross section in equation (2). Corner cubes can be made using, for example, highly reflective surfaces so the surface reflectivity, $\rho$, can be approximated as 1 for a corner cube.

Upon return of the signal from the corner cube or other reflective surface, the originating satellite may regenerate the beam to the same corner cube or to a different corner cube. Each satellite may have a number of electromagnetic signal generators, or potentially, hundreds of electromagnetic signal generators, each generating a data beam. Generating a data beam may include generating an electromagnetic carrier wave, modulating the signal, amplifying the signal, multiplexing the signal, transmitting the signal, or a combination of the foregoing.

Figure 2B:
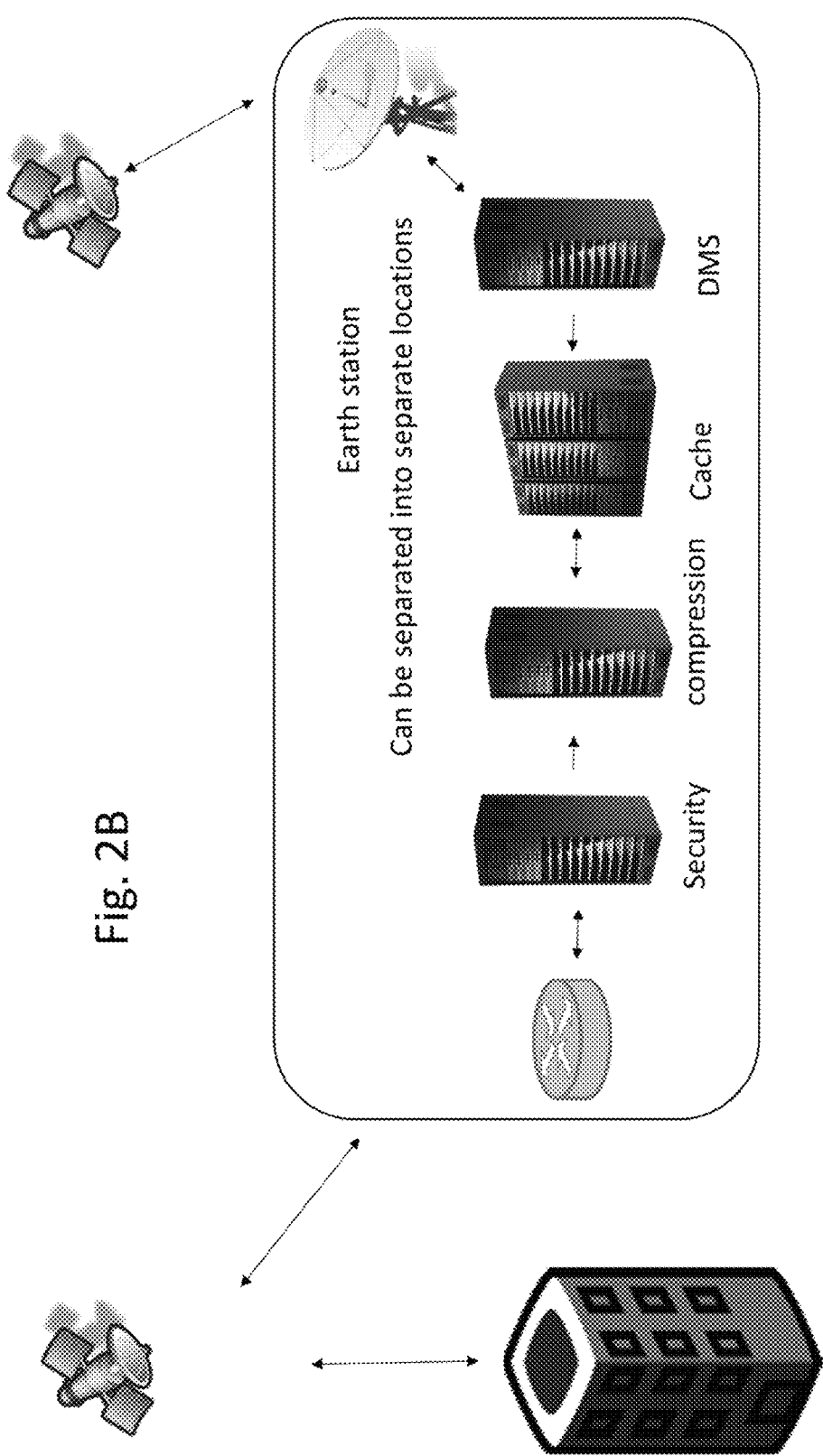
FIG. 2B illustrates a system whereby the user communicates firstly with a satellite, where the Earth Station may or may not be used to hold all or part of the DMS and other components, according to an example of the present disclosure.
Figure 3:
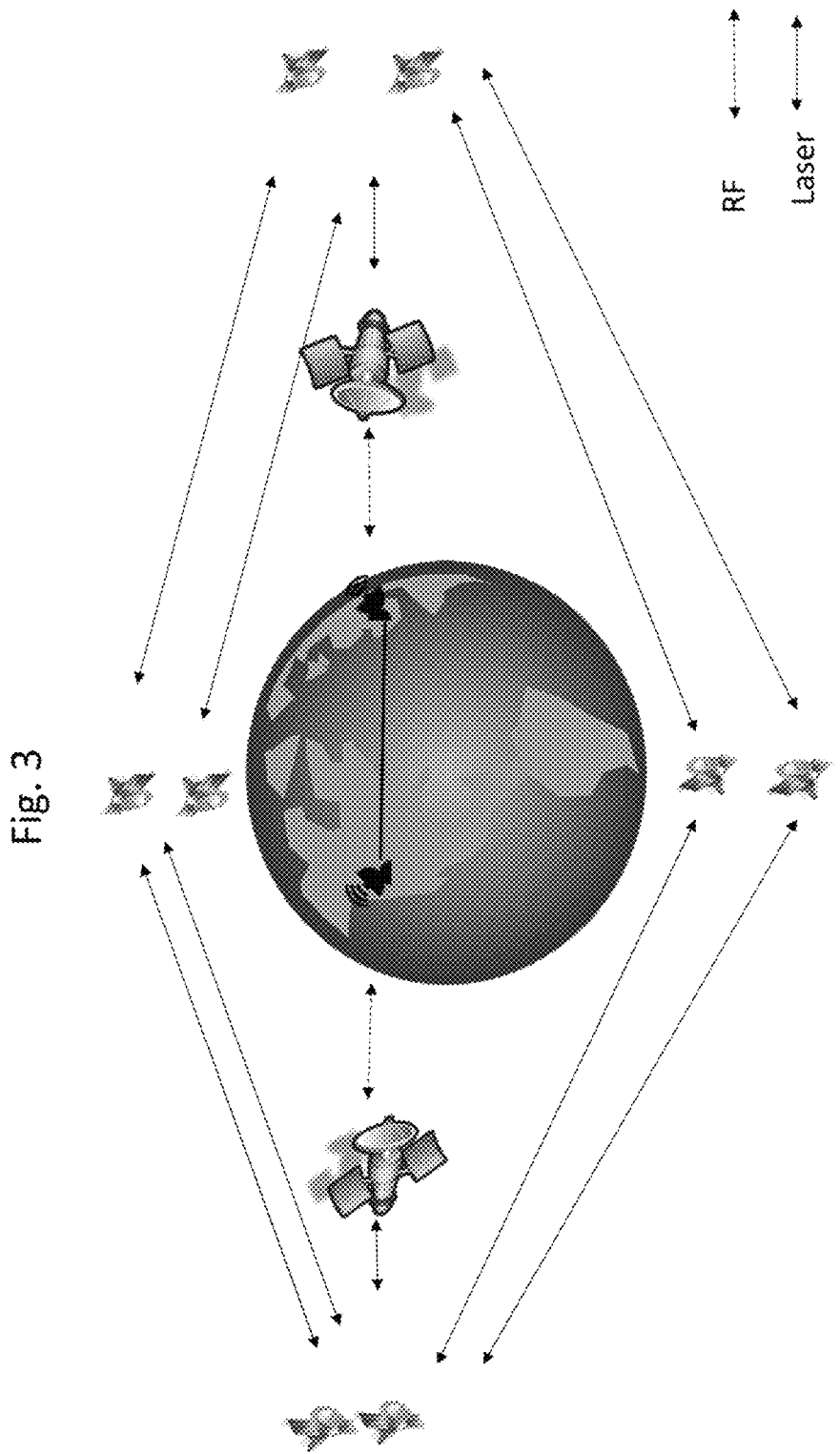
FIGS. 3-8 illustrate additional examples of positioning the satellites, according to an aspect of the present disclosure.
Figure 4:
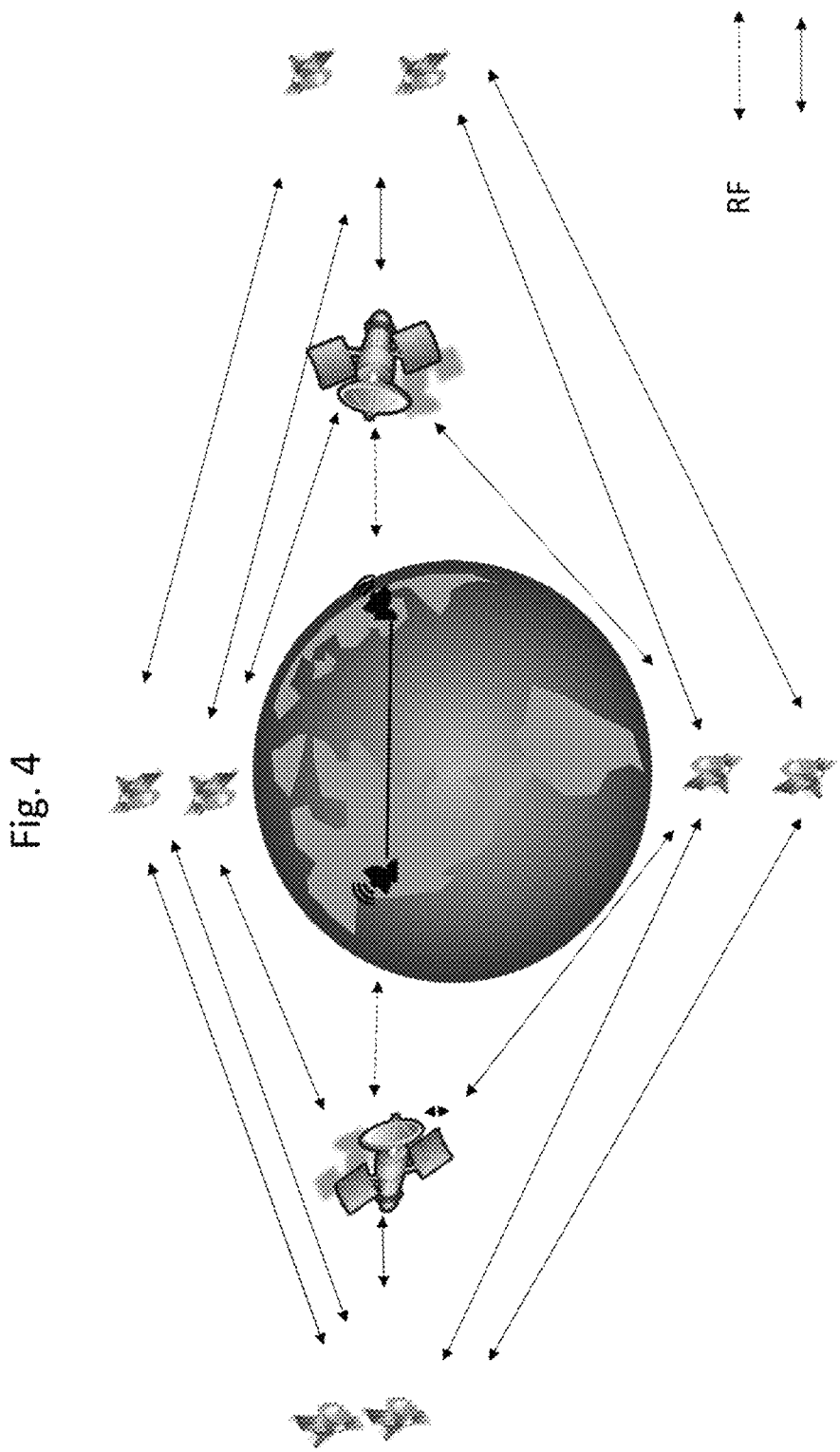
Figure 5:
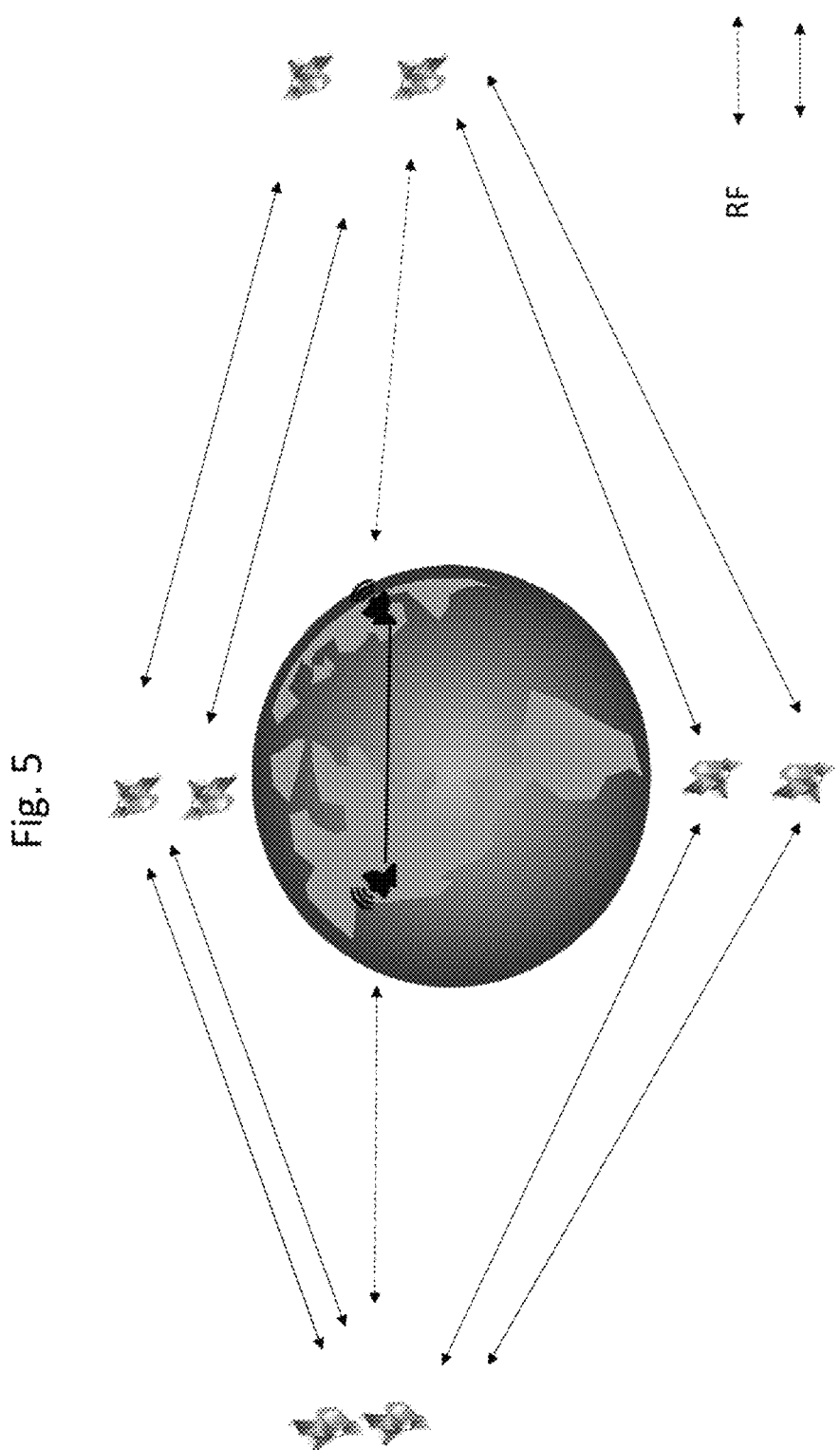
Figure 6:
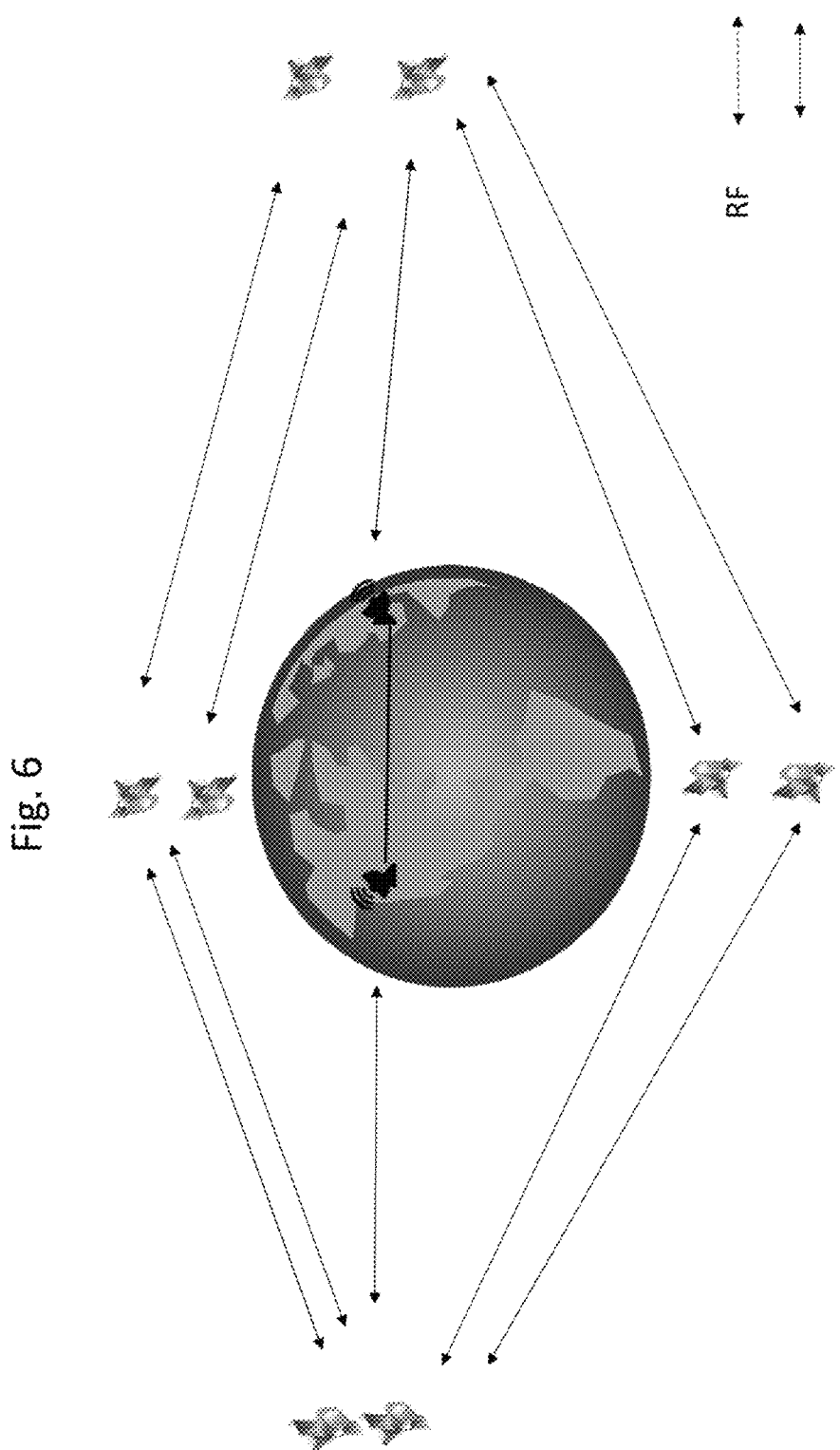
Figure 7:
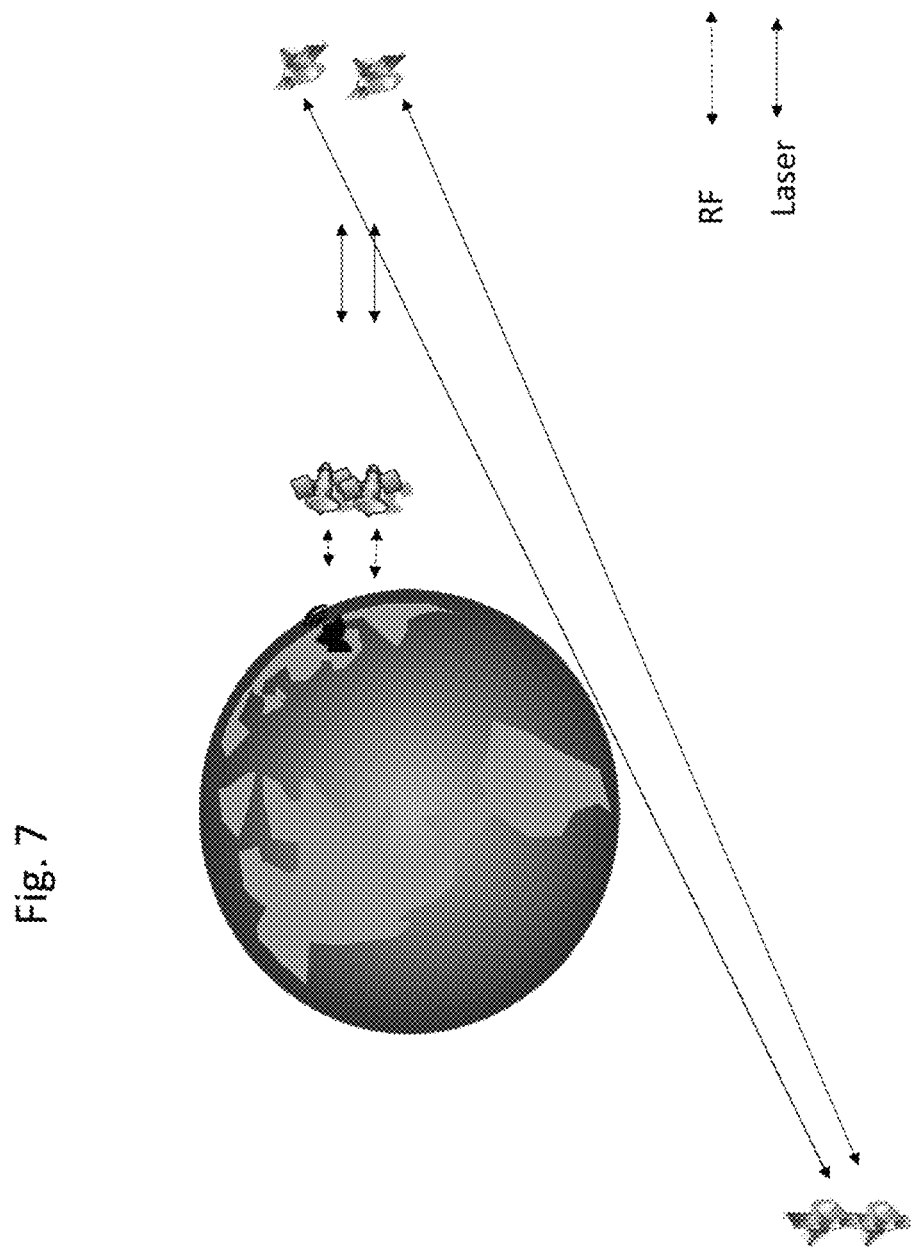
Figure 8:
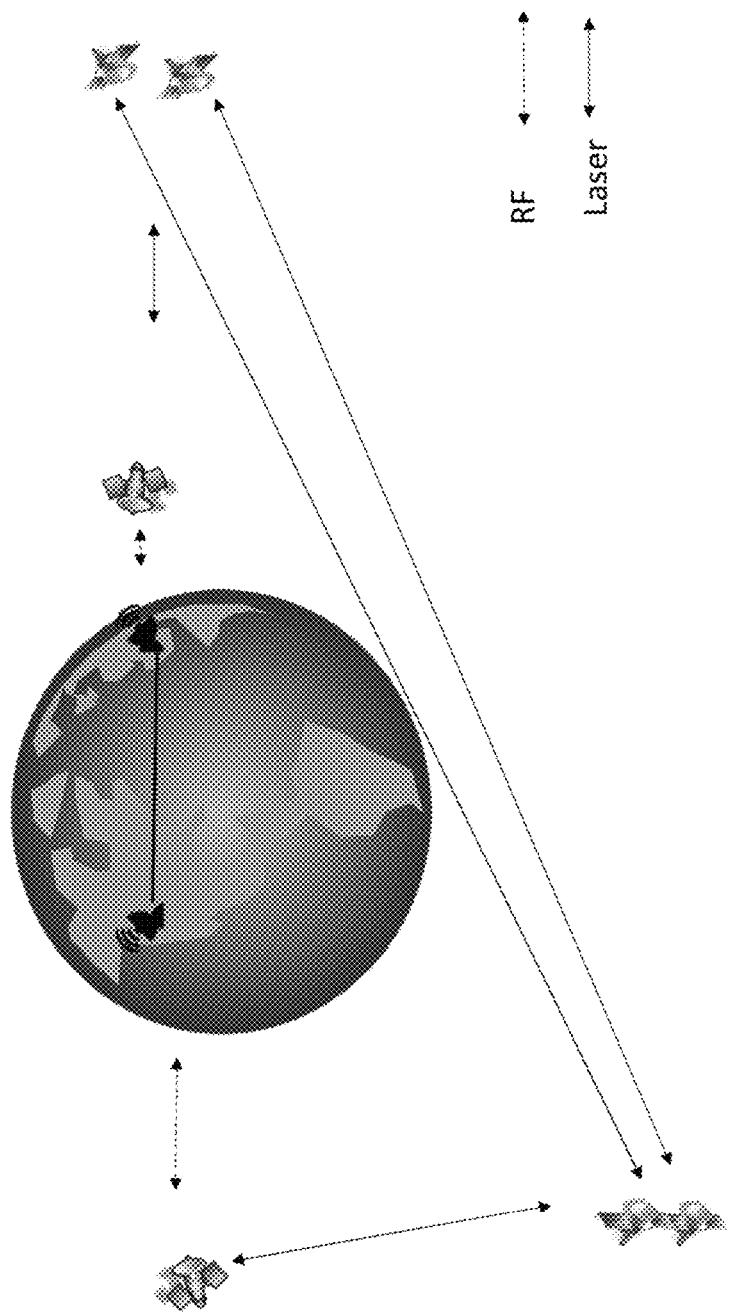

The signal transmitted to Earth Station 20 a,b and from Earth Station 20 a,b to the satellites may be encrypted to ensure security of data. Various encryption techniques may be used, including, for example, Advanced Encryption Standard (AES, sometimes known as Rijndael), or a hash function such as MD5 message-digest algorithm or the newer SHA-2 (Secure Hash Algorithm 2). Various approaches to managing the data are contemplated, including Apache Hadoop for distributed storage and distributed processing. As illustrated in FIG. 2, Earth Station 20 may communicate with remote terrestrial nodes, for example, using a various communication protocols such as TCP/IP and using any and all communication networks or means such as telephone system, including a cellular network, or using any wireless or wired communication system or protocol.

In order to maintain the same data over a long period, reamplification of the signal carrying the data may be needed to re-amplify as needed at each end of a communications loop. Over time, however, noise will build up. A received signal may be amplified, while diverting a small portion of the amplified signal to use in determining whether errors have developed.

Figure 18:
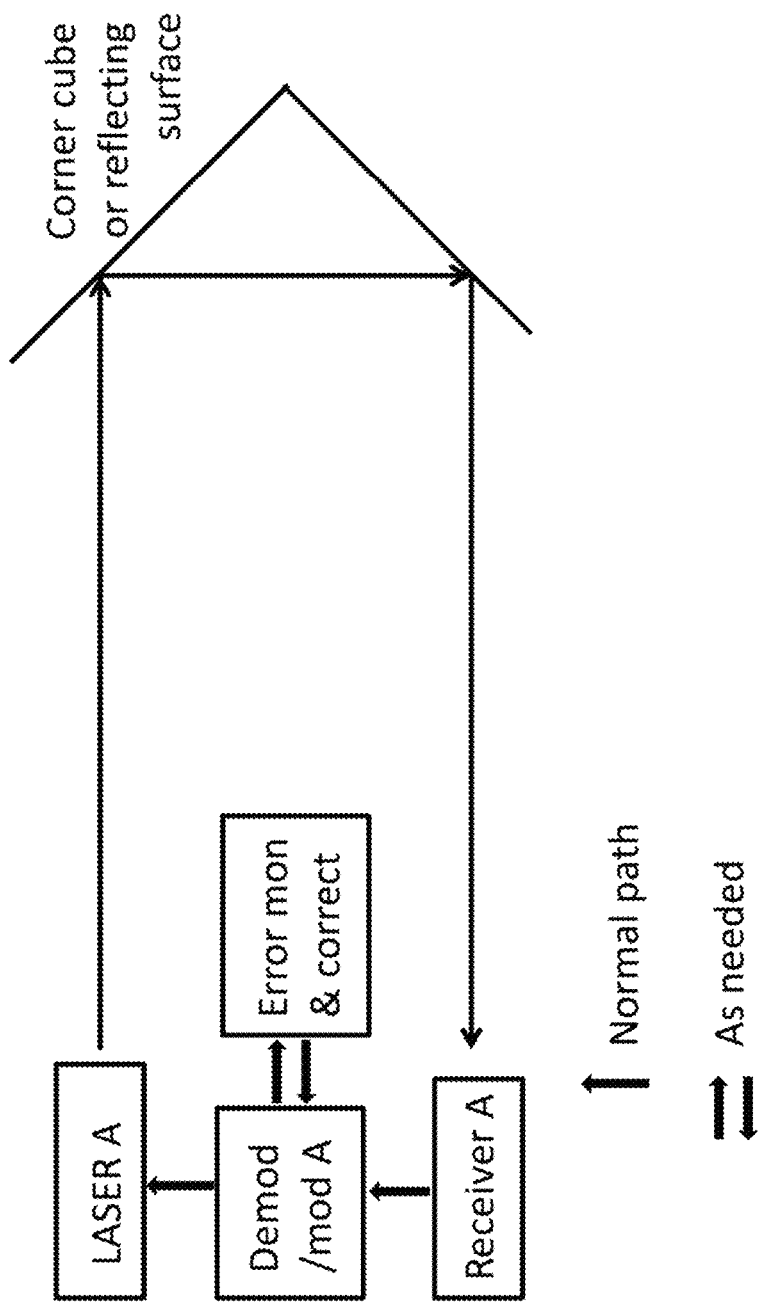
FIG. 18 is an illustration of an overview of a system for communicating between signal receivers A and B using laser communication, with the receivers forming a signal loop with a reflector, according to an aspect of the disclosure.
Figure 19:
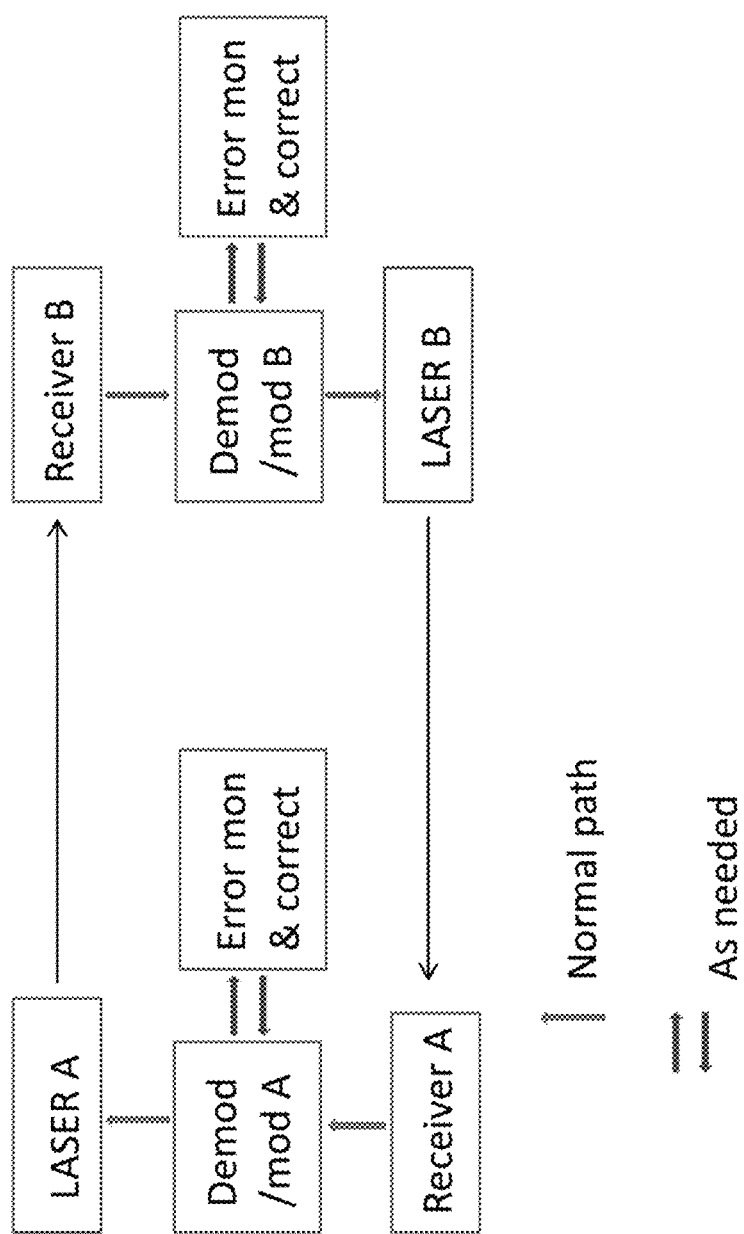
FIG. 19 is an illustration of an overview of a system for communicating between signal receivers A and B using laser communication, with the receivers forming a signal loop, according to an aspect of the disclosure.

An error detection and correction approach to replace corrupted data may be used if desired for instance by error-correcting code which may be checked periodically, to maintain uncorrupted data for long periods of time. FIGS. 18 and 19 above show a basic concept.

Light may be transmitted from one laser, say laser A, to a receiver, B. If OAM modulation/muiltplexing is employed, we may need to demodulate the light prior to amplification. Once the light is amplified a portion of the signal can be split off and examined for errors. Standard error detection and correction schemes can be used. The corrupted data then may be replaced on either this round trip, or a subsequent round trip.

Each time an update to existing data is received, an instruction may be transmitted to a satellite, and the satellite (or satellites) may use the signal receiver to search the electromagnetic signal beam for the relevant data file, for instance by monitoring the data that is automatically received for the purpose of periodic 3R regeneration or at some other point, or by some other means. Thus, each piece of information may be assigned a file number, or another designator, which may be used as a header or footer, for example, before insertion in the electromagnetic signal data stream. The electromagnetic signal data stream at time of conversion to electrical signal for regeneration is monitored for the appropriate file number or some other designator or set of information that together provides a designation for each data block. New data may also be added to the data stream at time of electromagnetic signal regeneration. Thus, Earth station 20 a,b may assign a file number or some other designator to a range of data records associated with a customer or user of the storage system. Upon receipt of a request to change or update information received from the user, Earth station 20 a,b may instruct that the data records associated with that file number be rewritten to reflect the change or update. For example, Earth station 20 a,b may instruct the communications satellite group to transmit all the data records associated with the file number, which may be all the data records for the requesting user, to Earth station 20 a,b, Earth station 20 a,b may make the change or update to the data records of the file, and then transmit the changed or updated file to the communications satellite group. In the alternative, one or more master satellites of the communications signal satellite group may receive the change or update request, together with the file number, and perform the change or update of the data records associated with the file number.

Various types of electromagnetic signal generators and various types of electromagnetic radiation may be used to carry data. The same satellite may have more than one type of electromagnetic signal generator, and many types of modulation to encode at a high data rate are used. For example, a diode electromagnetic signal generator using a semiconductor may be used as part of a laser generator.

Electricity to power the electromagnetic signal generators and other components of the system, as well as satellites 30, 40, may be obtained from solar panels positioned on or near the satellite. However, other sources of power, including nuclear power, fuel or chemical power, battery power, capacitor-based charge, other sources of solar power, and the like, or a combination of the foregoing, may be used in addition or instead of solar power.

Each beam transmitted may include a number of different channels using different colors or wavelengths of the electromagnetic signal, which may be distinguished by multiple methods including optical grating. This is known as wavelength division multiplexing ("WDM"), or frequency division multiplexing. For example, in some cases, as many as 160, or more, different such wavelength channels may be defined. For other types of electromagnetic radiation, the analogous frequency-division multiplexing may be used, for example, for a radio carrier wave.

In addition, or in the alternative, different channels of data may be created by use of electromagnetic signals of different polarizations, that is by "rotating" the light to different orientations. Other channel multiplexing schemes include space division multiplexing, of which a subset is multiplexing of multiple beams each in an orthogonal, or near orthogonal, spatial mode. An example of this is orbital angular momentum. Note that spatial modes and polarizations can be combined to increase the aggregate amount of data being transmitted. As mentioned above, methods such as space (e.g., orbital angular momentum), polarization, and wavelength multiplexing as well as high order keying such as QPSK or QAM may expand the amount of transmitted data, thus expanding available storage when storing data in transmission.

As shown in the FIGS. 1, 3-8, a redundant Earth station 20b, and a redundant Earth station communications satellite 30b and a redundant group of electromagnetic signal satellites 40b may also be provided. The redundant system can provide backup of all the data in case of catastrophic failure. Accordingly, the redundant system may store the identical or nearly identical information or data as the group of communications satellites 30a. In the alternative, Earth station 20b, Earth station communication satellite 30b and second group of electromagnetic signal satellites 40b may store different information than is stored by the group of electromagnetic signal satellites 40a. In the alternative, or in addition, redundancy data "storage" can be achieved by having the same satellite or group of satellites transmit the same beam to more than one receiving node and/or at more than one time (similar to multicasting). That is, each satellite may transmit a first electromagnetic signal embodying the information to a first target, such as a second satellite or a reflecting structure or surface, and a second electromagnetic signal embodying the same information to a second target, such as a second satellite or reflecting structure or surface, to provide redundancy and disaster recovery for the information.

The aperture for electromagnetic signal generation could be set as needed, depending on the distance between the transmitting satellite and the reflector to which the beam is transmitted, the wavelength of the beam, and other factors.

The size of the spot where the receiving terminal is located may be calculated as noted below.

The following discussion will explain aspects of the disclosure in the context of lasers, however other types of electromagnetic signals can be used as well. A laser beam will be emitted from one terminal or node and travel to a second terminal or node. There are a number of different conventions with respect to characterizing beam width. The following equation may be used for the divergence angle, $\vartheta$:

$$\vartheta \approx \frac{\lambda}{D}, \qquad (3)$$

where $\lambda$ is wavelength and $D$ is the diameter of the transmitting aperture. For this approximate formulation of the diffraction limit, $\vartheta$ may be the full width at half maximum beam width. Laser communication may allow for long range communication because of the narrow beam. For example, comparing a 10 GHz frequency beam to a 200 THz frequency beam (1.5 micron wavelength), the beam width will be 20,000 times wider for the RF beam. The variable d can be defined as the diameter of the beam spot at a given distance, R. In that case:

$$d = \frac{R\lambda}{D} + D, \qquad (4)$$

The energy in a given photon is given by:

$$E_p = h\nu \qquad (5)$$

where h is Plank's constant and $\nu$ is frequency. The energy received by a lasercom terminal is given by:

$$E_r = E_t * \frac{A_r}{A_{illum}}, \qquad (6)$$

where $A_r$ is the area of the receive aperture(s), and $A_{illum}$ is the area being illuminated. A transmit aperture of the same diameter as the receive aperture would yield previous equations to obtain:

$$N \approx \frac{E_t D^4}{hc\lambda R^2}, \qquad (7)$$

where N is the number of received photons. We can pick a number, depending on how sensitive the particular detector is. We can reverse this equation and obtain:

$$D \approx \sqrt[4]{\frac{Nhc\lambda R^2}{E_t}}, \qquad (8)$$

Turning to the issue of the required amount of power that a laser would put out, assuming transmission of B bits per second, which can be called data rate. Each bit will require $E_t$ amount of energy. The laser power is therefore the product of $E_t$ and B. We can define $$E_t = \frac{P_t}{B}, \qquad (9)$$

This would yield $$D \approx \sqrt[4]{\frac{Nhc\lambda BR^2}{P_t}}, \qquad (10)$$

Using this Equation 8 for laser aperture diameter for transmitting and receiving, other values may be chosen to determine more or less optimal diameters. Assuming a monostatic system, or at least the same aperture diameters for transmit and receive, we arrive at some values, provided by way of example, for Table 1. Table 1 is just an example for one base assumption set, the aperture size and beam spreading will differ based on multiple parameters, including but not limited, to the wavelengths used, beam and aperture sizes, modes used, and distances transmitted.

TABLE 1

Lasercom Aperture Diameter

| Lasercom Aperture Diameter (cm) | | | | | |
|---|---|---|---|---|---|
| Wavelength (microns) | Range (Km) | N | B (Gbps) | Pt (watts) | D (cm) |
| 1.5 | 80000 | 1 | 10 | 10 | 3.7 |
| 1.5 | 80000 | 10 | 10 | 10 | 6.6 |
| 1.5 | 80000 | 100 | 10 | 10 | 11.7 |
| 1.5 | 80000 | 10 | 40 | 10 | 9.3 |
| 1.5 | 80000 | 10 | 100 | 10 | 11.7 |
| 1.5 | 80000 | 10 | 1000 | 10 | 20.9 |
| 1.5 | 80000 | 10 | 10000 | 100 | 20.9 |
| 1.5 | 80000 | 10 | 100000 | 500 | 24.8 |

By way of further example, a 10,000 km distance may be used or some other distance, such as <10,000 km, 10,000-80,000 km, or >80,000 km.

For this set of assumptions, an aperture with a diameter of approximately 10 cm or with a diameter in the range of the above-named values, may be used. However, apertures with smaller and larger diameters are also contemplated. A laser on the order of 10 watt average power may be used for transmission in the context of some of the values provided above, however, these values are provided merely by way of illustration to show orders of magnitude for one particular example. This is a large trade space, so other assumptions are possible. Greater and smaller diameter apertures and greater and smaller power lasers can be used as well as different distances. Each beam or transmission may be as long as the distance between the transmitting satellite and the receiving node, or may be shorter or longer than distance.

The user may wish to store or retrieve data by accessing the Earth station 20*a,b*. For example, the user may use an internet connection or other means to access Earth station 20*a,b* or access the satellites directly which will then communicate with the data management systems which could be in the earth station in or on the satellites or in any other location or part of any other component. The Earth station 20*a,b*, may have a number of components to route the communication to an appropriate group of users or organizations, provide security that protects against attacks and hacks, a buffer that temporarily stores the user information that is being uploaded or being downloaded and the Data Management System.

Earth station 20 *a,b* communicates with the satellites using an electromagnetic signal transceiver, for example using RF signaling. When accessing the Earth station, the user would be queried for credentials by the DMS or the security system, including identification and password, or the like or otherwise verified. The DMS (Data Management System) may tag the data and its owner or the transmitting user for future access requirements, for retrieving information from the satellite-borne "storage", for billing purposes, for security reasons and the like. Then, using the Earth station communication satellite, the data is moved to the electromagnetic signal satellites for storage "in motion" between the satellites. As discussed, according to an aspect of the present disclosure, the Earth station communication satellite may be omitted, such that Earth station 20 *a,b* may communicate directly with the one or more electromagnetic signal satellites. Upon demand by the user, the previously stored information is accessed using the Earth station. The data management systems or any and all other components of the Earth Station could be in the earth station in or on the satellites or in any other location or part of any other component.

Thus, according to an aspect of the disclosure, data may be "stored" by being kept in continuous motion, transmitted and reflected, with signal amplification also sometimes being necessary. According to an aspect of the disclosure, signal regeneration of a selected portion of the signal at each roundtrip or at each pass of a node may only be needed as necessary due to the requirements of the electromagnetic beam carrying the data. Where the distance between the satellites or other transmitting nodes is equal, the beam capacity may be expressed as:

$$BC=(BBR*D*N)/C$$

BC=Beam Capacity (in bits),
BBR=Beam Bit Rate (bps-bits per second)
N=number of hops between the satellites (or nodes) in the beam path
D=distance between the satellites (or nodes) in the beam path
C=the speed of light (km/sec)
If the distance between the satellites or nodes is not equal, then:

$$BC=(BBR*\Sigma D)/C$$

where the ΣD refers to the sum of all the distances in the beam path.

For example, in an embodiment in which a satellite transmits the beam to a reflecting node, such as a corner cube, which reflects it back to the satellite, which then has to receive and to regenerate the beam, ΣD would be just twice the distance between the satellite and the corner cube, plus any distance traveled within the corner cube (which may be negligible for purposes of the above-noted equation).

For example, a public data network may be used. An authentication and approval subsystem may be provided for verification and security. The requested data is then obtained or retrieved from the group of satellites through the Earth station communications satellite 30 *a,b* to the Earth station 20 *a,b* and passed back to the DMS facility and to the customer through a public data network. A local area network (LAN) or the like may also be used to access the Earth station 20*a,b*.

Figure 14:
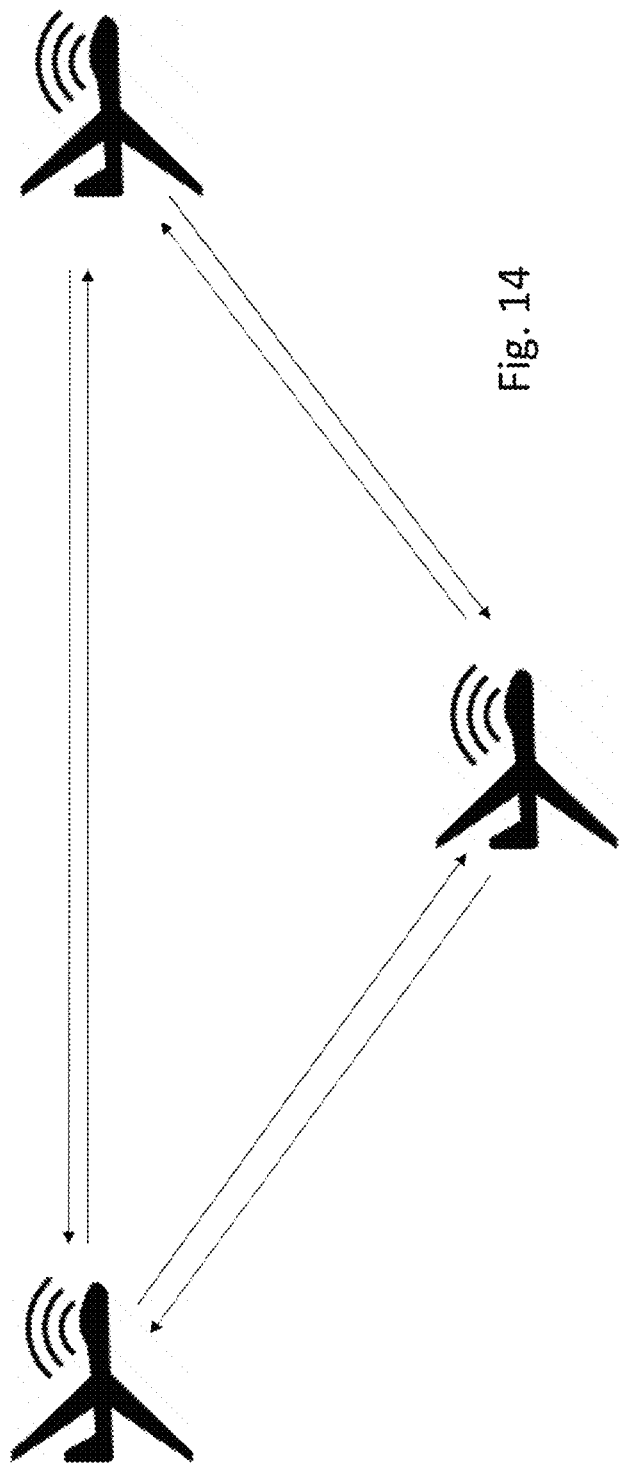
FIG. 14 is an illustration of an example of an air-based implementation of an aspect of the invention, in which aircraft or other airborne vessels or vehicles or structures have electromagnetic signal communication devices which reflect, or regenerate and retransmit, the electromagnetic signal to one another, according to an aspect of the present disclosure.
Figure 15:
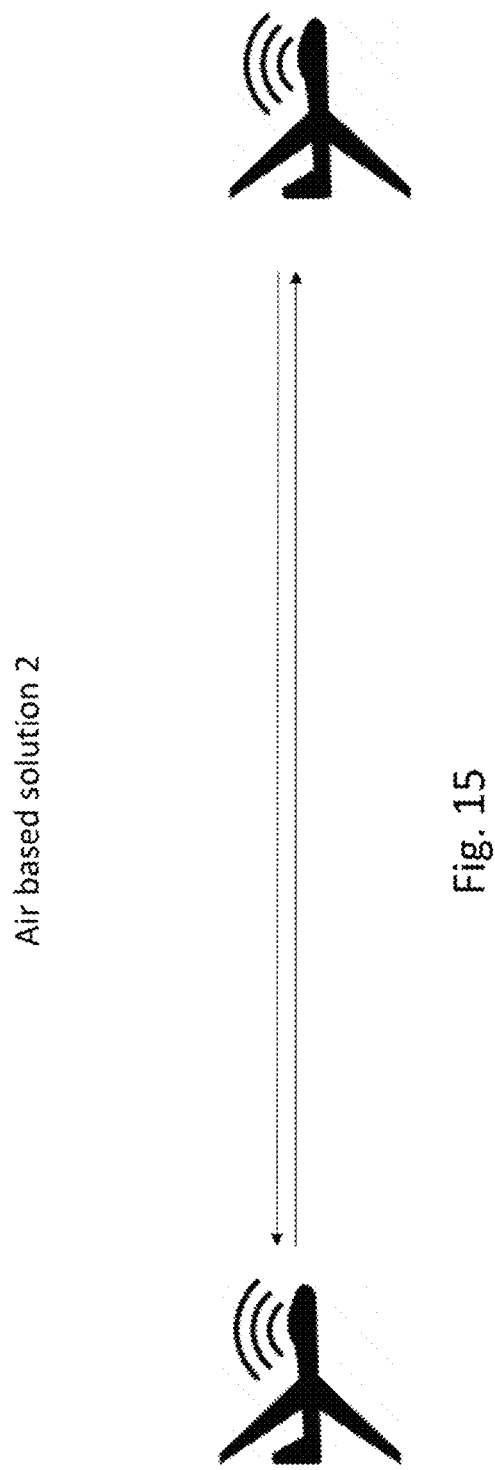
FIG. 15 is an illustration of an example of an air-based implementation in which one or more structure or an aircraft or airborne vehicle or vessel includes a first electromagnetic signal communication device which transmits the electromagnetic signal to a second electromagnetic communication device mounted on or to a second aircraft, illustrated for illustrative purposes as an airplane, which may be then reflected back to the first electromagnetic signal communication device, or has a structure such as a corner cube or other type of reflective surface that reflects it back the electromagnetic signal to the first electromagnetic signal communication device, according to an aspect of the present disclosure.
Figure 16:
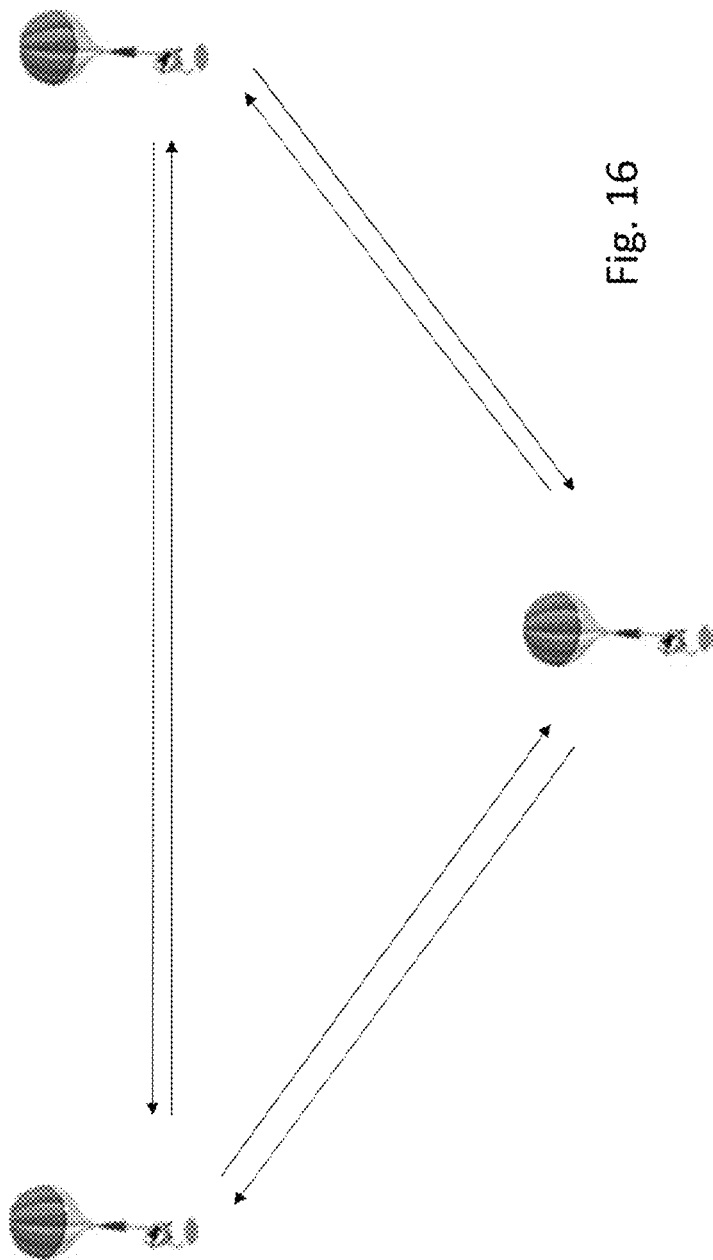
FIG. 16 is an illustration of an example of another air-based implementation similar to the embodiment of FIG. 14, but the electromagnetic signal communication devices and/or reflective structures are mounted on airborne vessels without jet engines or propellers, shown, by way of example, as hot air balloons, helium balloons or blimps, according to an aspect of the present disclosure.
Figure 17:
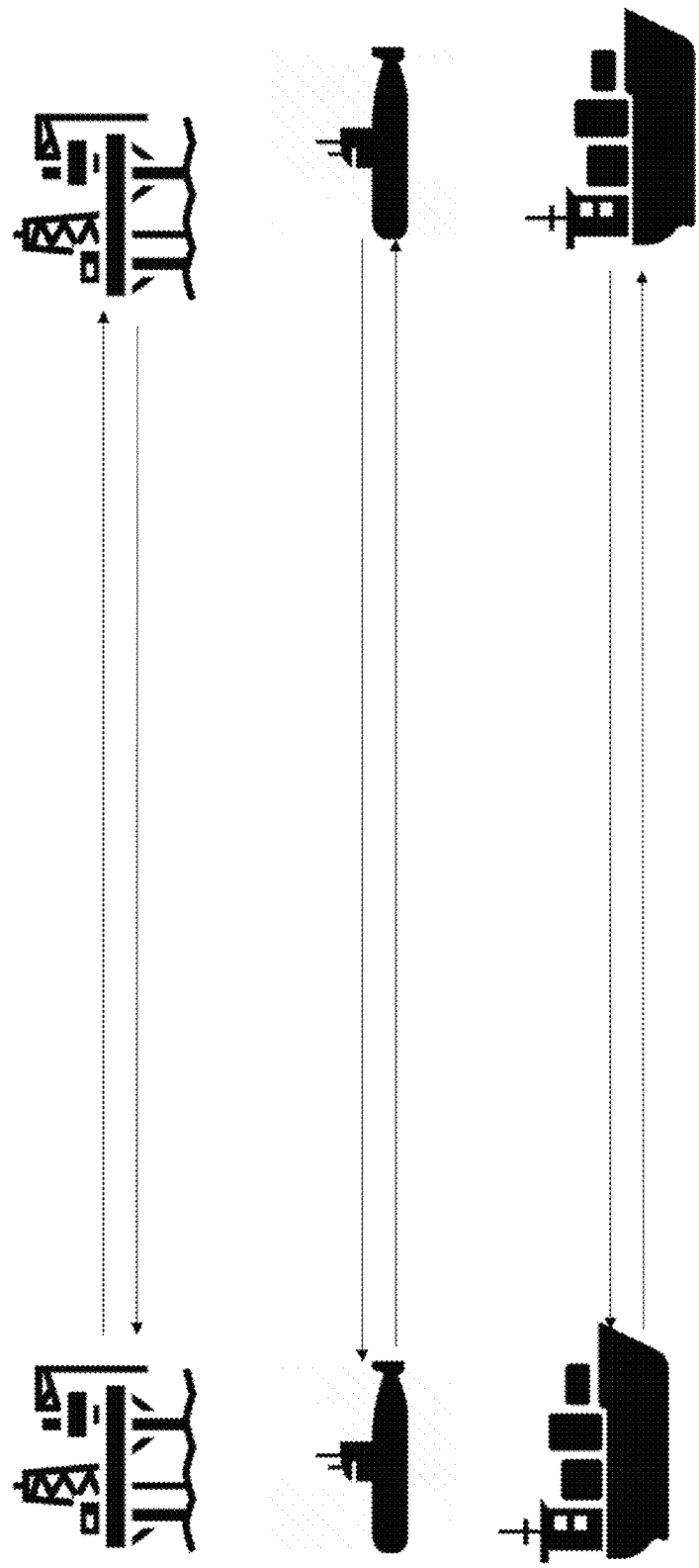
FIG. 17 is an illustration of an example of a sea-based implementation of aspects of the invention in which a first electromagnetic signal communication device is mounted on a sea-based vessel or vehicle, shown by way of illustrative example as a submarine, transmitting the electromagnetic signal to a second electromagnetic signal communication device, which may be attached to or housed in a vessel, shown by way of illustrative example as a ships and submarines, which then may reflect back the electromagnetic signal to the first electromagnetic signal communication device or may regenerate the signal and re-transmit the electromagnetic signal to the first electromagnetic communication device, according to an aspect of the present disclosure.

While sometimes described herein with reference to a satellite-based embodiment, such an electromagnetic signal storage system may also be deployed at sea, under water, in the air, on land, underground, utilizing, for example, existing fiber optic networks, new fiber optic networks, data racks, lighting up dark fibers, terrestrial or in outer space, and on structures using a combination of the foregoing. For example, sea-based ships, vessels, or other mobile platforms or stationary structures, may transmit such electromagnetic signaling back and forth, as illustrated, for example in FIG. 17. As another example, land-based vehicles or stationary structures, fiber network(s), dark fibers, airborne electromagnetic signal system of network may transmit the electromagnetic signals. Examples of aircraft-based implementations are shown in FIGS. 14-16. Additional configurations of communications using airborne vessels, such as aircraft, blimps, hot air balloons, communication towers, drones or a combination of the foregoing, which may also be transmitters, receivers and reflectors for the electromagnetic signals, are illustrated in FIGS. 14-16. Or, a combination of the foregoing vessels, vehicles and structures may be used.

Figure 29:
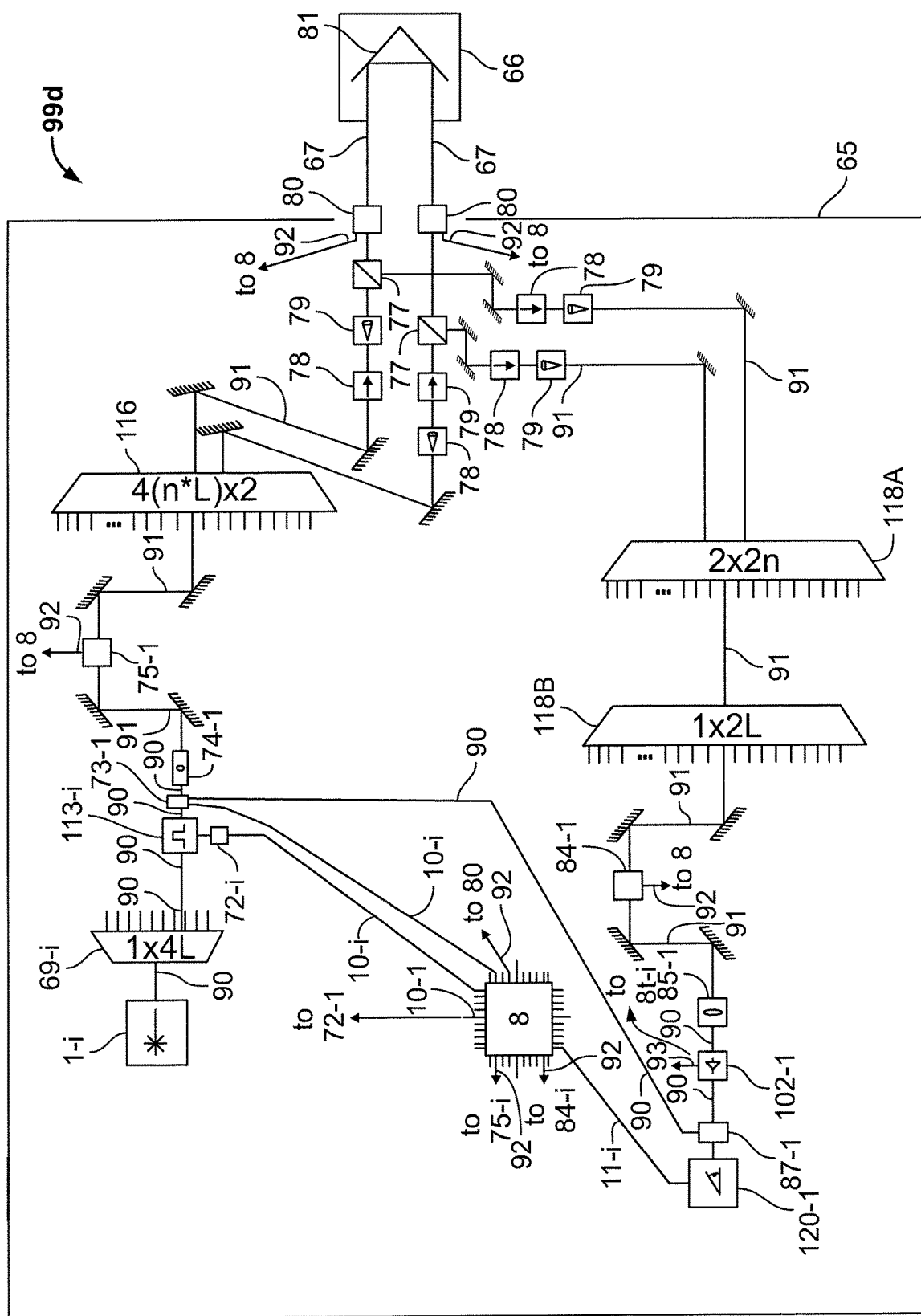
FIG. 29 is a schematic illustration of an example of a system utilizing wavelength division multiplexing, and/or space division multiplexing, and direction division multiplexing in a free space implementation of a recirculating loop, according to an aspect of the present disclosure.

FIG. 29 is an example of a storage system 99*d* using a free space loop using wave division multiplexing (WDM), space division multiplexing (SDM), polarization division multiplexing (PDM), and direction division multiplexing (DDM). A first vessel, such as a satellite 65, is positioned in communication range with a second vessel 66. An optical beam 67, or some other type of electromagnetic radiation, may propagate through free space containing L×n×4 channels, each channel having a unique combination of spatial mode, polarization, propagation direction, and wavelength. Although discussed as propagating in free space, the electromagnetic signal may be passed in whole or in part through an atmosphere, such as earth's atmosphere or the atmosphere of another planet or through vacuum, or through space and/or through other media, such as water. The signal 67 is then returned from second vessel 66 to the first vessel 65. Other components of the system that have been described in the previous embodiments may also be included, such as light source 1-*i* for producing light of wavelength $\lambda_i$ for a range of wavelengths, the beam splitter 69-*i*, which splits each of the n signal sources into L*4 separate channels (for each spatial mode, polarization, and direction combination). For example, a fiber optic splitter or several fused fiber couplers may be used. Modulator 113-*i*, for example illustrated in FIG. 23, may be provided, and a radio frequency driver 72-*i* may interface between control system 8 and components of the modulator 113-*i* using electrical connections 10. Input selector 73-*i* may recirculate the data in the channel or insert new data in the channel using, for example, an optical switch or some other such element, and may thus serve as an eraser 103.

Input selector 73-*i* may be implemented as an electro-optic switch driven by control logic may be used, however all-optical switching may be possible instead of all or some such switching. Input selector 73-*i* works in concert with splitter 87-*i* to serve as an input/output coupler, similar to coupler 101 in FIG. 21. Collimator 74-*i* collimates light emanating from optical fiber 90, which may be implemented using an aspheric lens on a translation stage. Converter 75-*i* coverts light between spatial modes. In this way, each of the L beams emerging from each of the n light sources may be given a different spatial mode or a spatial mode and a polarization combination. This may be implemented using two linear polarizers and a spatial light modulator (SLM), that add spatially varying phase to covert the light beam into a different spatial mode.

Multiplexers 116 may provide free space multiplexing to coalign the axes of propagation of each of the 4Ln space beams, each beam having a unique combination of wavelength, spatial order, direction of propagation, and polarization. This may be implanted, for example by $\log_2$ (L×n×4) polarizing beam splitters and then, $\log_2 (\sqrt{L \times n \times 4})$ half-wave plates and $\log_2$ (L×n×4)$^2$ steering mirrors. Also, an input/output separator 77 may be a beam splitter or a lower loss implementation device. Optical isolators 78 separate the input and output channel in each propagation direction, and a Galilean telescope 79 may be provided to control beam size by expanding it and collimating the beam and/or refocusing the beam. Beam steering 80 may be provided to point the beam at the second vessel, and in particular, at the reflecting device or surface 81 on the second vessel. This may be accomplished by, e.g., two steering mirrors, which may be optimized using piezoelectrically elements using control system 8 or a corner cube may be provided. The reflector 81 may return the optical beam to first vessel 65. A trihedral corner cube may be used, but a parabolic mirror and/or by a pointer that points the beam at the first vessel 65 may be used instead.

Free-space demultiplexer 118A may be positioned to demultiplexed each beam into n beams, each beam of one distinct wavelength. This may be implemented using a blazed grating or some other type of similar device. Further free-space demultiplexer 118B may be positioned to demultiplex each of these 2*n beams in into 2*L beams with ½L times the original power. This may be implemented as $\log_2$ 2 L polarizing beam splitters, $\log_2 \sqrt{2L}$ half-wave plates, and $\log_2$ 2 L$^2$ steering mirrors. Converter 84-*i* may be positioned to convert a spatial mode selectively chosen and polarization combination to the fundamental spatial mode (i.e. Gaussian beam). This may be implemented using a half-wave plate and an SLM, whose spatial pattern includes both the azimuthal variation exactly opposite the mode to be demodulated and a Fresnel lens to condense the power of the correct spatial mode. Spatial modes in addition to the mode in which azimuthal variation is exactly opposite the pattern on this SLM may be difficult to focus down tightly by the Fresnel lens because of the destructive interference at their centers.

Coupler 85-*i* may be provided to couple a free space beam into optical fiber 90. This may be accomplished using an aspherical lens on a translation stage. In this way, the fiber may be used as a spatial filter by efficiently coupling the spatial mode for this channel, whose azimuthal pattern is exactly opposite to the pattern on the spatial mode converter 84-*i*. The 1R regenerator 102-*i* is illustrated, by way of example in FIG. 26, however, in this free space implementation any amplifier or combination of amplifiers that is compatible with the used wavelengths, spatial mode, direction, and polarization multiplexing may be used. Splitter 87-*i* splits the guided wave into substantially identical signals. The output of this splitter 87-*i* may be transmitted to receiver or demodulation system 88-*i*, such as a photodiode or coherent optical receiver, and the input selector 73-*i* in order to recirculate the signal. Photodiodes or some other such devices may be used for each wavelength selected appropriately. Control system 8 provides control of elements of the system may be implemented, for example, as digital logic, software, an FPGA, or a combination of the foregoing. Any other suitable implementations of the control system 8 may be used as well.

According to another aspect of the present disclosure, a demultiplexer, SLMs, signal couplers, fiber amplifiers, and the multiplexer may be provided on vessel 2 to perform two stage amplification. In another embodiment, a complete digital system with control logic, receivers and transmitters may be provided on vessel 2 in order to perform complete 3R regeneration on both vessels.

Additional variations may include deploying more than two vessels and/or passing the signal between three or more of vessels, and four or any number of vessels may form the recirculating loop; using pointing methods instead of just one corner cube or reflecting surface; and/or or using different telescopes for transmission receiving, including using one or both SLMs as lenses of variable focal length in addition to other functions. Although described as the first vessel and the second vessel, and although described sometimes with reference to satellites, aircraft, hot air balloons, drones, ships, stationary sea structures, such as oil rigs and buoys and the like, the second vessel may in fact be a natural object, such as a planet or a moon or an atmosphere of a planet or a naturally occurring medium therein, or may be a surface of an existing manmade structure, such as an existing satellite or the like. Also, while described as two vessels a vessel may be a node in a terrestrial data center or the like and the free space, or using a waveguide implementation may be provided in a data center, such as on or at or in conjunction with a rack-mounted system comprising computers and other electrical components.

In another embodiment, storage may be in a rack. In this case, the transmitting and receiving equipment is placed in a rack, or in any other machine, media and/or suitable structure, and an optical fiber, or any other suitable transmission medium will be connected to said transmitting and receiving equipment, for example an optical waveguide. Amplifiers, a data management system, encryption system and/or compression system may be included. In a preferred embodiment, a loop of optical fiber may be provided with the opposite ends of the optical fiber connected to each other, for example, via an optical coupler. In this case, a laser, maser, or other optical signal, carrying data may be transmitted into the recirculating loop and thereafter make roundtrips through the loop such that the data is stored while in motion in the form of a laser beam, maser beam, or other optical signal within the loop.

Figure 20:
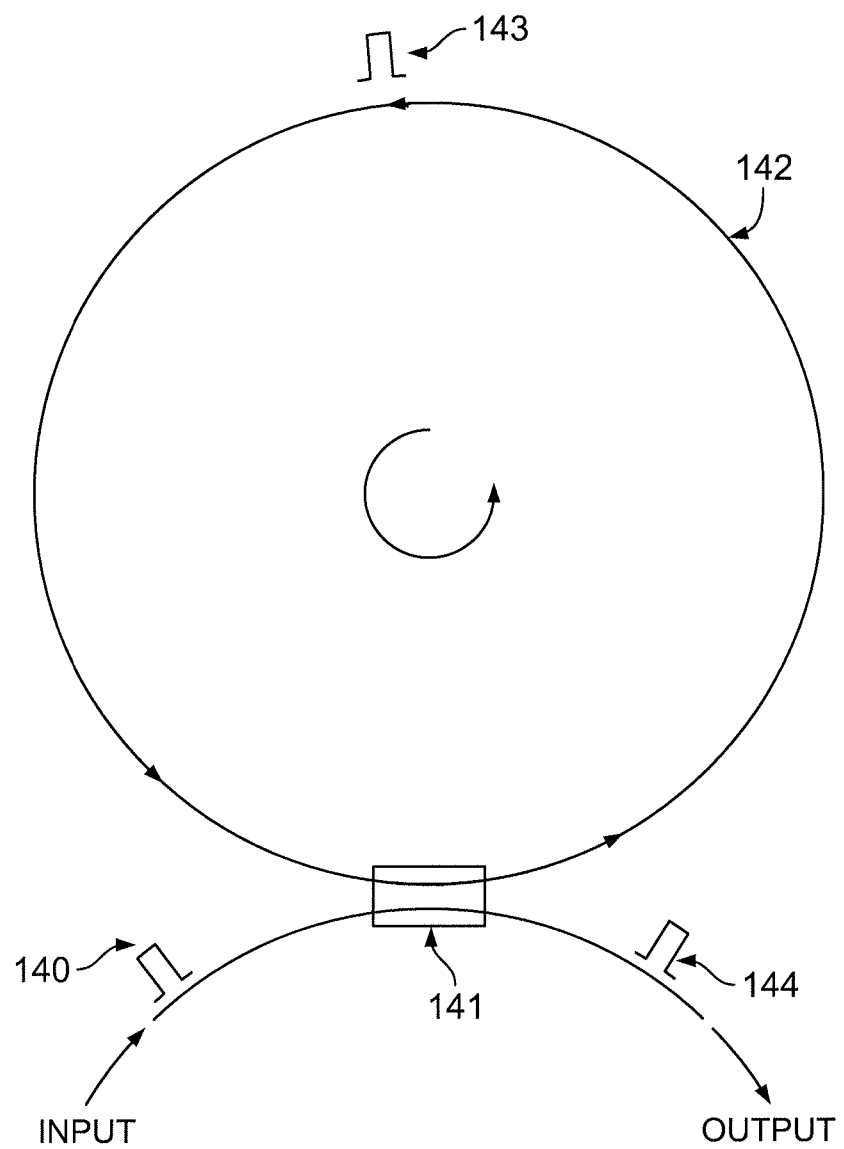
FIG. 20 is a schematic illustration of an example of a signal moving through a loop, such as through a waveguide.

FIG. 20 illustrates an example of a basic concept of a signal, such as an laser, maser, optical beam or other optical signal (including UV and IR signals), encoded with data via modulation, and travelling through an optical loop 100. Coupler 101 couples at least a portion of the signal into the recirculating loop 100, which may be formed by a waveguide, such as an optical fiber, in the looped configuration discussed above. The signal may be recirculated indefinitely in the loop by incorporating into the loop such equipment as is needed to balance amplification and loss of the signal contained within, and occasional regeneration to compensate for other errors, or dispersion, inherent in the optical fiber or any other optical transmission medium. Part of the signal is then coupled out of the loop by coupler 101 on each round trip. Coupler 101 that provides signal for the optical loop 100 may include a number of components. For example, an input coupler that provides signal for the optical loop 100 may be a different component than the output coupler that receives signal from the optical loop 100, and such components may be integrated, or may be positioned adjacent or remote from each other, and may be positioned at different parts of the optical loop 100. The signal may circulate in a counterclockwise direction (as illustrated), or in a clockwise direction, or in both directions as will be discussed below.

As illustrated in 24B, a spool of optical fiber may be used as a waveguide that connects the transmitting and receiving hardware, such that the transmitting and receiving hardware may positioned in the same facility or remote from each other. A second such optical fiber-based configuration may be positioned in the same facility as the first configuration to provide redundant safety and backup for the data stored in the first configuration. The second such optical fiber-based configuration may store data additional to the first configuration, or may be linked with the first configuration to form a signal recirculating loop. The second such optical fiber-based configuration may be positioned remote from the first configuration or as part of the same facility. One or both of such configurations may be provided on or at a computer rack or may be provided on their own. Also, one or both of such configurations may be incorporated as integral parts of a unit that stores data.

Figure 21:
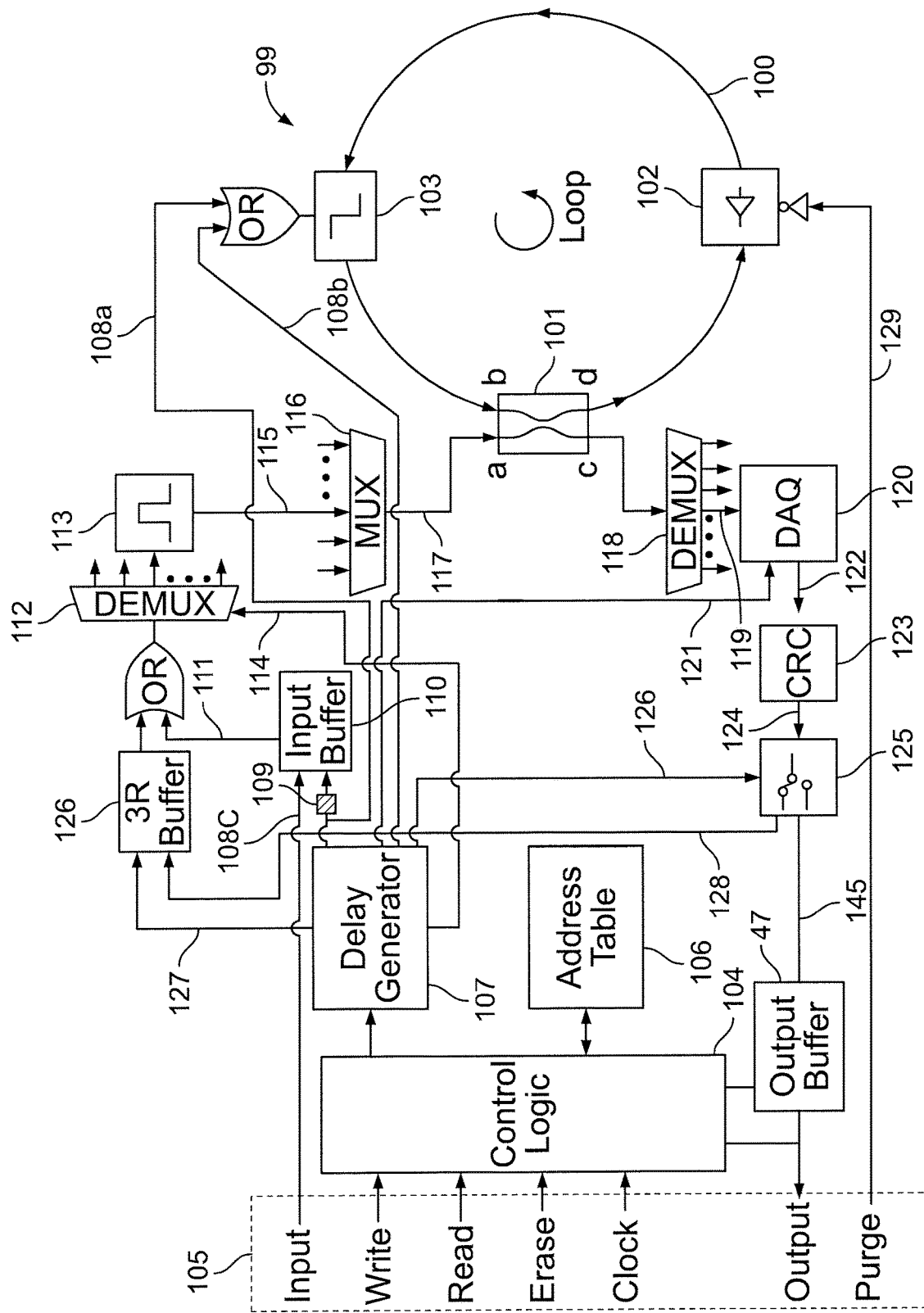
FIG. 21 is a schematic illustration of an example of an electronic control system to enable management of the data recirculating in a loop-based storage in motion system using a waveguide, according to an aspect of the present disclosure.

FIG. 21 illustrates an exemplary embodiment of an electronic control system to enable management of the data recirculating in a continuous loop-based storage in motion system 99 to store data in a recirculating laser, maser or other optical signal in accordance with an embodiment of the present disclosure. Various requests for updating the data stored in the system 99, such as instructions for writing, reading, and erasing data may be received by control logic 104.

A signal coupler 101 may have inputs A and B and outputs C and D. Input B receives the optical signal and data from the recirculating loop 100 while input A receives data from the remaining portion of the system 99. Similarly, output C of signal coupler 101 may be connected to insert the optical signal and data into the continuous loop 100 while output D may be provided to multiplexer 118 which separates the signals into a number of separate channels 119 which are sent to data acquisition component 120 to retrieve data from the loop 100. Part of the optical signal, which may be electromagnetic radiation including a laser signal, or the like, will be coupled from input A of signal coupler 101 to output D of signal coupler 101, so that the signal and data may be injected into the loop 100. Similarly a portion of the signal entering input B may continue onto output D, recirculating within the loop, while the remaining portion of the circulating signal, may be output through output C of the signal coupler 101 as described above. The coupling ratio of this coupler nay be chosen to ensure that the output signal has sufficient strength to allow detection and the recirculation signal continues to circulate in the loop without degradation that would lead to data loss.

Signal reamplifier 102 (1R regeneration station) may control the peak intensity of the signal as the signal recirculates through the recirculating loop 100. The signal is maintained within an acceptable power level by gain, chosen to balance roundtrip losses, by the signal reamplifier 102. More than one such signal reamplifier may be required to achieve gain stability, prevent undesired nonlinear interactions, or to prevent damage to components resulting from high intensities immediately after the reamplifier. If the signal is comprised of a number of different light wavelengths, fiber modes, or other separable beams then separate signal amplifiers 102 may be provided for each wavelength, wavelength range, mode, or beam in combination with a system of demultiplexing & multiplexing to guide each beam, wavelength, wavelength range, or mode to the appropriate amplifier.

Also illustrated in FIG. 21 is a loss modulator 103 that destroys a portion of the signal passing through in order to erase the portion of the signal corresponding to a particular data block. According to an aspect of the disclosure, a specific portion or pulse of the signal corresponding to the particular memory block and the data carried therein may be erased by modulating the loss of the recirculating loop by the use of a loss modulator ("eraser") 103, such that the signal passing through the loop 100 at a given moment, as dictated by delay generator 107, may be erased. In this way, a portion of the signal, and the data carried therein can be eliminated without purging of the signal in its entirety. In the case of a multiplexed signal, a buffer, such as 3R buffer 126, may be used to restore signal channels that were erased, together with the target signal channel that was intended to be erased, at the moment that they passed through eraser 103. That is, based on data provided by 3R buffer 126, all the data erased at the timing provided by delay generator 107 may be restored, except the signal channel carrying the data block to be erased. Alternatively, the eraser may comprise a demultiplexer, multiple loss modulators, and a multiplexer configured such that a signal beam may be erased without erasing all the other beams that share a time slot with that beam, thus avoiding the need for rewriting using the 3R buffer. While the loss modulator 103 is provided to erase data, any other suitable erasing element may be used as desired.

Control logic 104 may receive instructions from outside the system 99, such as write, update, read, and/or erase, as well as a clock signal, such as a signal from a computer clock, for example, embodied for example as a chip, or from another type of clock, such as an atomic clock. Control logic 104 then may look up, using address table 106, a timing of the pulse in the desired recirculating signal, or portion of the recirculating signal, corresponding to the data block to be erased, read, or written. In particular, control logic 104 may signal the delay generator 107 to generate a timing signal, such as delayed pulses, to eraser 103, or via electrical connection 127 to control output of a desired block of data. Electrical connection 145 outputs the target data to outside the system responsive to the request. Thus, a function of the control logic 104 may be to control the electronics to maintain a table 106, such as an address or name table. The information stored therein may be given to delay generator 107 to produce appropriately timed signals to carry out operations such as "write," that is, to put data into the recirculating loop 100 for example at the next available slot or at a specific address, depending on the request received. According to an aspect of the disclosure, the write instruction may entail reading all blocks of data that share a timeslot with the target address into the 3R buffer 126, erasing all blocks of memory sharing the same timeslot in the loop 100, and writing input bits into the newly empty slot. Then, using the 3R buffer 126, the data block may be rewritten because channels of the block of data had been erased during the writing process, although an alternative implementation of the eraser may avoid this last step as described above.

This process of timing via addressing relies on the ability of the delay generator to track the circulation of the pulse through the loop very precisely, in order to reckon when delayed pulses or equivalent timing methods should be sent to various devices. This may be accomplished by dead reckoning. Another tracking approach is use of a Kalman filter, which combines dead reckoning based on characterization of the system with periodic checking of the position of the data in the system. Such checking, or resynchronization, may be accomplished by a specific resynchronization block stored in the system, or else by periodically polling stored data blocks. Another such operation is the "read" operation, which may, for example, entail reading a specified data block that corresponds to an address retrieved from address table 106 according to timing of a portion of the signal. Also, all information stored in the loop 100 may be permanently deleted by shutting off the 1R regeneration station 102 or by modulation the loop loss, for instance by means of the eraser 103, in response to a purge instruction illustrated in FIG. 21 as being received via electrical connection 129.

Address table 106 may also store information to associate the addressing of blocks of data with physical values of the pulses passing through the recirculating loop 100. The signal may be multiplexed and thus the control logic 104 may have to account for more than one channel of information passing through the loop at any given time. For example, address table 106 may be configured as a random access memory or other type of memory. Delay generator 107 may be a portion of control logic 104, but may be a separate component that generates delayed control signals to components that interact with loop 100 so as to delay appropriately the control signal to access the correct pulse or portion of the signal passing through the loop 100. Alternatively, this component could be omitted by using a bit timing scheme that aligns with the provided clock. In this method all operations could be carried out using normal clock cycles instead of generating delays.

A fixed delay 109 in the delayed write instruction may be calculated so that it takes into account the difference in propagation delay through the loop path to and through the signal modulator 113.

Signal modulator 113 may receive as input a series of delayed electric pulses via electrical connection 111 from the delay generator 107 and produces a signal, for instance by modulating a provided optical beam from a source not shown in FIG. 21 that carries a signal encoding data in its modulation 115 delayed with the same timing as the pulses in the input signal 111. For a multiplexed signal, signal modulator 113 may comprise a series of similar devices, each configured to encode data into a different channel, or it may be one or more device(s) that is independently configurable to control which signal channel it produces depending on the control signal 114.

Input buffer 110 may read and store input bits (new data to be added to the loop 100) while waiting for them to be encoded and then input into the loop 100. When triggered by a pulse 108 from the delay generator 107, the input buffer 110 may send a signal via electrical connection 111 containing the bits to be encoded to the modulator 113 via the input demultiplexer 112, with the appropriate delay. Input buffer 110 may be a conventional electronic memory, such as RAM. Such an electric signal contains the bits to be carried from the input buffer 110 to signal modulator 113 via the input demultiplexer 112, delayed by an appropriate amount of time to align with the intended block of data in the loop 100.

The input demultiplexer 112 may be provided to control which channel (i.e. wavelength, spatial mode, direction, etc.) the delayed INPUT signal 111 gets written into by the signal modulator 113, based upon the control signal 114 from the control logic 104. Input demultiplexer 112 may be incorporated into the signal modulator 113 in some embodiments or may be completely absent, in which case the delay generator 107 generates different delayed pulse signals 108 for different input channels (that is, for different wavelengths, spatial modes, directions, etc.).

Input multiplexer 116 couples signal 115 from one or more different channels (i.e. wavelengths, spatial modes, directions, etc.) into one beam 117 that travels to the signal coupler 101. In the example illustrated in FIG. 21 only one signal may be multiplexed at a time, but according to an aspect of the present disclosure, many input signals may be multiplexed simultaneously and/or asynchronously to the signal coupler 101. Signal coupler 101 then injects a portion of the signal carrying information encoded in its modulation into the loop 100. According to an aspect of the disclosure, multiple independent channels carrying signals in different ways, including but not limited to different wavelengths, spatial modes, directions, etc., may be injected into loop 100 at the same time to increase the amount of data that may be stored in the loop 100.

Output demultiplexer 118 receives signal output from output C of the signal coupler 101, and divides each channel, as separated by different physical attributes including but not limited to wavelength, spatial mode, and direction, into separate signals.

Data acquisition (DAQ) 120 may receive signal through fiber 119 from output demultiplexer 118 and may demodulate the information encoded in the modulation of light into digital information encoded in electrical signals. DAQ 120 may include a physical photodetector, such as a photodiode, and a sampling analog-to-digital converter (ADC) whose timing may be determined by a series of delayed pulses 121 generated by the delay generator 107. Using DAQ 120 one or more specific blocks of memory may be read out of the loop 100 in a digital information format. Any suitable device or element may be used to demodulate data as desired.

DAQ 120 may be provided as a series of different DAQ systems to decode each channel of the demultiplexed signals 119, in which case the delayed pulse signal 121 received from delay generator 107 may be received via a corresponding number of different data lines, or may be a signal system combining a signal DAQ system with a configurable output demultiplexer 118 controlled by a control signal from the control logic 104 or the delay generator 107. In particular, delayed electric pulses received via electrical connection 121 trigger the reading of data in a particular memory block. These pulses correspond to the points in time when the DAQ 120 should sample the signal to capture the desired data. Depending on the implementation of the DAQ 120, electrode 121 may be a bus connecting to each of the DAQs or a single line (for example, if the channel selection is being performed by the output demultiplexer 119).

In this way, line 122 feeds data, encoded in digital electrical signals to logic and/or software that performs a cyclic redundancy check (CRC), or equivalent error correcting code or forward error correction method, 123, which checks data integrity on the data received in order to correct errors.

Asynchronous regeneration management may be provided such that complete regeneration (3R) of the signal may not be performed at the same time for the entire signal. Instead, according to asynchronous regeneration management, the process may be staggered using delay generator 107 of control logic 104 illustrated in FIG. 21. This may be necessary, as discussed, because 3R regeneration may take longer than the time it takes for the entire signal to pass through the optical fiber.

For example, an algorithm for asynchronous regeneration may use a signal scheduling thread that schedules regeneration operations based on the availability of the necessary subcomponents and a separate operation thread that signals the delay generator 107 when scheduled regenerations tasks are to be performed. The scheduling thread may schedule the regeneration of the data block that has been regenerated the least recently at the next available opportunity, then proceed to schedule regeneration for the next least recently regenerated data block, and so on. If all the components are available, for instance, because currently no regeneration, write, or erase operation is scheduled, the next such opportunity could be to perform the reception step the next time the data block in question passes the coupler 101, followed by erasing the data block the next time that data block passes the eraser 103 and then retransmitting the data stored in the 3R buffer 126 to arrive when the newly empty time slot next passes. This final step may be broken up into multiple steps aligned for each pass, for instance, because the signal modulator 113 comprises fewer modulators than the number of multiplexed channels stored by the system, or because the modulator that writes to a particular channel is already scheduled for another operation. Therefore, the scheduler would schedule these steps with the operation thread that would signal the delay generator 107 appropriately.

The next data block that the scheduling thread schedules for regeneration ("least recent data block") may be scheduled to be performed before the regeneration of the previous data block scheduled, simultaneous with the regeneration of the previous data block, or with the steps of the regenerations of both data blocks performed interleaved instead of strictly following the previous data block's successful regeneration. Thus, regeneration management may be performed in such an asynchronous manner. Other algorithms for scheduling regenerations are also contemplated. A more dense use of the various resources may be obtained by prioritizing operations that can be performed more immediately instead of scheduling operations in the aforementioned sequential scheduling order. One example of such an algorithm might use a nonlinear fitting algorithm, for instance the Levenberg-Marquart method, to maximize resource usage to minimize the time required to regenerate all the data blocks. Similarly, other thread structures might be used, including parallel scheduling, and single-threaded combined scheduling and operations. An algorithm for writing data into the system may similarly select data blocks to which to write the new data on the basis of optimizing resource usage or on the basis of minimizing regeneration time.

CRC 123 may perform cyclic redundancy check to ensure data integrity only for the data block on which 3R is being performed or which is being read. The system thus has sufficient time to do the integrity check as well as to generate the portion of the signal corresponding to the data block. CRC may perform this each time 3R is performed on the data block. While discussed as electrical connections or lines, it will be understood that line 122 and other lines may be provided as buses or may be communicated via radio frequency or other frequency electromagnetic radiation, optical signals or the like.

According to an aspect of the disclosure, each data block may be tagged with a "header" or other forms of tagging that identifies the block and the header may be encoded with the data block as part of the signal path through recirculating loop 100. In this embodiment Address table 106 preferably maintains an association between the tag, such as an identification number written in the header of the data block and a user for an electronic communication associated with the user. In this way, the data block with the correct header would be read out of the recirculating loop 100 and provided to the output for further processing. Alternatively the data block could be stored temporarily in an output buffer 47, for instance to coordinate output with the provided clock. Such data management, including an address table 106, may be provided outside the system and the control logic 104 may receive only the header information, so that control logic 104 may return the data block corresponding to the header requested. For clarification, "header" can mean any other form of tagging.

Switch 125 may control, based on a control signal received via electrical connection 126, whether the data 124 is output via output pin 145, 146 to outside the data storage system 99, for example, in answer to a request for data received from a user, or fed to the 3R buffer 126 via connection 128 for 3R regeneration, based on the control signal 126. Instead of outputting the data directly, the data may be stored in an output buffer 47 until requested.

The 3R buffer 126 may hold data while awaiting delayed pulses 127 from the delay generator 107 to properly time the process of 3R regeneration (i.e. "Reamplification, Retiming, and Reshaping"). In this embodiment, 3R regeneration may be accomplished by receiving the signal, erasing it, and retransmitting it as a new signal. However, alternate 3R methods are contemplated, such as all-optical regeneration. For every family of data blocks that share a time slot (signal channels that share a time slot), the whole family may be fed into 3R buffer 126. Then the signal for that time slot may be erased using the erase delayed pulse line 128. Delayed pulses sent via electrical connection 127 may trigger the retransmission at appropriate times. 3R buffer 126 may also serve a similar purpose during the WRITE process, by holding the data that must be regenerated as a result of erasing the time slot to clear a slot for writing if such an eraser implementation is used. In this case, no erase delayed pulse may need to be transmitted via 128, but instead reading out of 3R buffer 126 follows complete transmission of the input bits. Another variation includes using an addressing scheme in the 3R buffer 126 such that data in the 3R buffer 126 may be output in any selected order, enabling faster asynchronous implementation of rewriting multiple data blocks at once.

As discussed, delayed pulses may be transmitted via electrical connection 127 from delay generator 107 to trigger transmission of data in the 3R buffer 126, generated in the same way as the delayed pulses transmitted via line 108 to trigger the writing from the input buffer 110. These may be preceded by a delayed pulse on the erase delayed pulse line 108b in order to erase the appropriate time slot, except in the case of finishing a WRITE operation, in which case the time slot is already cleared and pulses will be generated to retransmit the data immediately after completing the transmission of the desired input bits.

Delayed pulses, as discussed, may also be transmitted from delay generator 107 via electrical connection 108b to trigger erasing desired time slots using the eraser 103 either as part of 3R regeneration, or an ERASE operation to erase data securely and permanently. Data may be erased after it is no longer in use, or it will eventually interfere with other signals due to dispersion-induced broadening, although this may be most easily accomplished by simply not performing 3R regeneration on it the next time its time slot is being regenerated.

PURGE data line 129 may control the power of the 1R regeneration process through an inverter. If this line is set to "1", the 1R regeneration will shut off, such that amplification of the signal in the loop will stop and the data carried therein will be destroyed rapidly, securely, and irreversibly.

Figure 22:
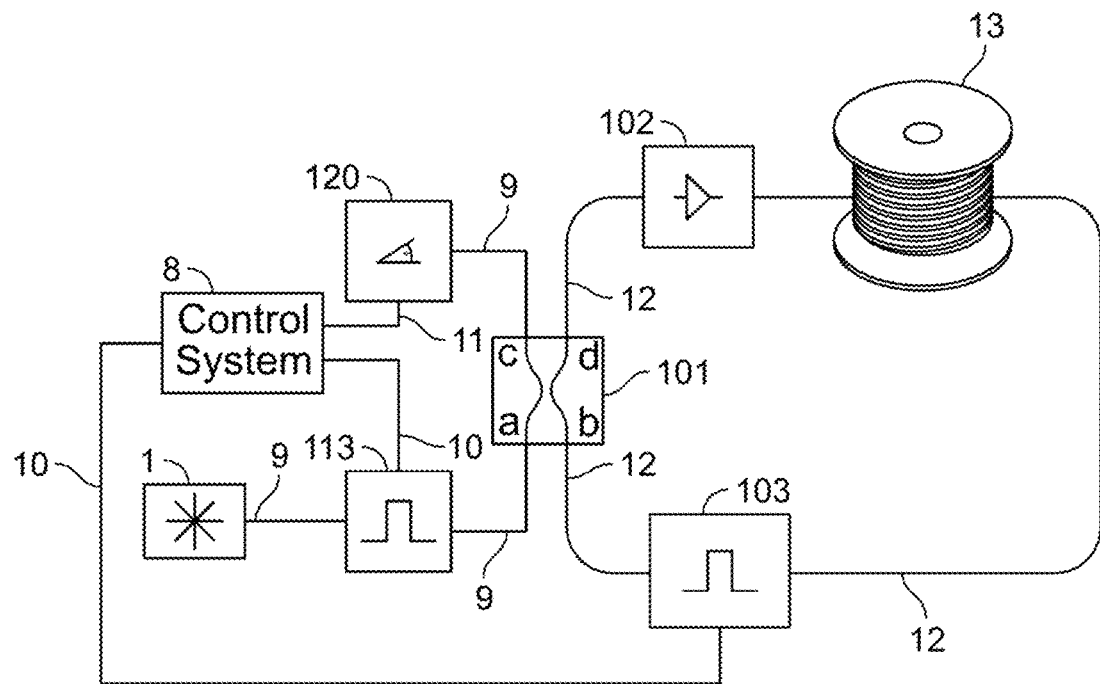
FIG. 22 is a schematic illustration of an example of a loop for data storage in motion using a fiber optic spool, according to an aspect of the present disclosure.

FIG. 22 is an example of a continuous recirculating loop for data storage, for instance as the loop 100 in FIG. 21, in which a spool of optical fiber 13 is used as the waveguide. An unmodulated optical signal may be provided to signal modulator 113 by light source 1, which may be a fiber laser. Alternately, the light source 1 may be directly modulated, replacing the signal modulator 113. For instance, if the light source is a semiconductor cavity laser the signal may be modulated by modulating the pump current.

Figure 23:
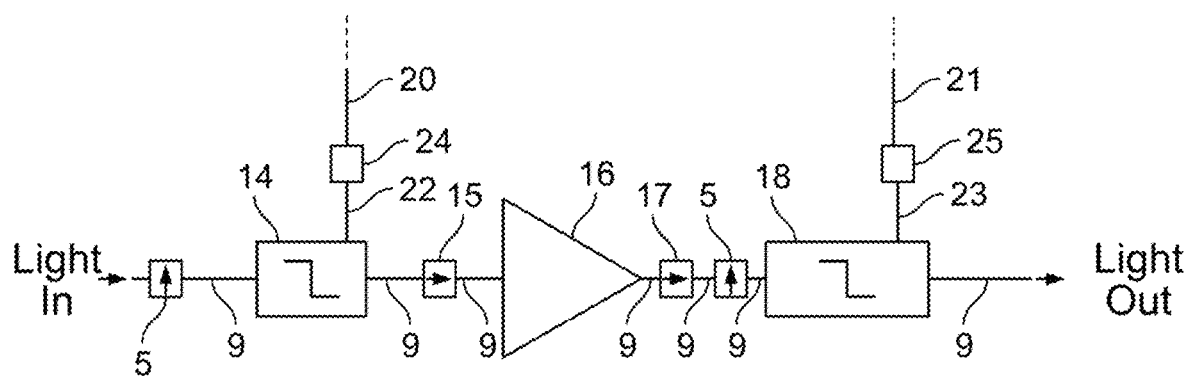
FIG. 23 is a schematic illustration of an example of a system for modulating a signal, according to an aspect of the present disclosure.
Figure 24C:
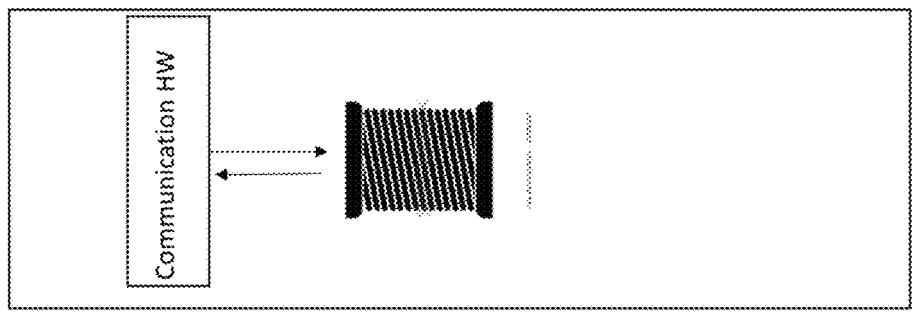
FIG. 24C illustrates a spool of optical fiber used as a waveguide with first and second ends connected to the same electronic system for storing information.
Figure 24B:
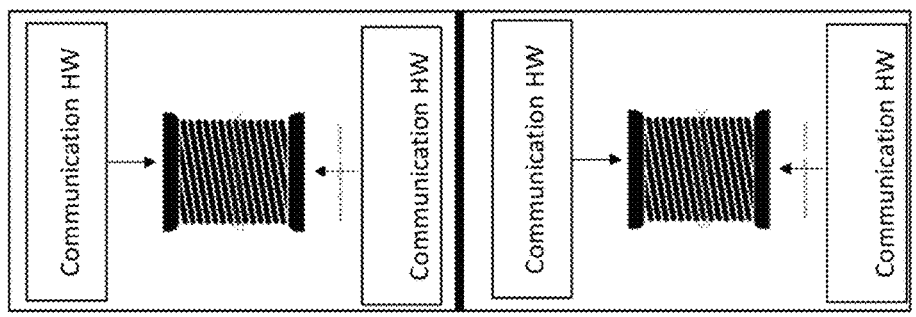
FIG. 24B illustrates a spool of optical fiber used as a waveguide with connecting transmitting and receiving hardware, which may be positioned in the same facility, container or remote from each other, and a further such configuration, which may be positioned in the same facility as the first configuration or may be positioned remote from the first configuration.
Figure 24A:
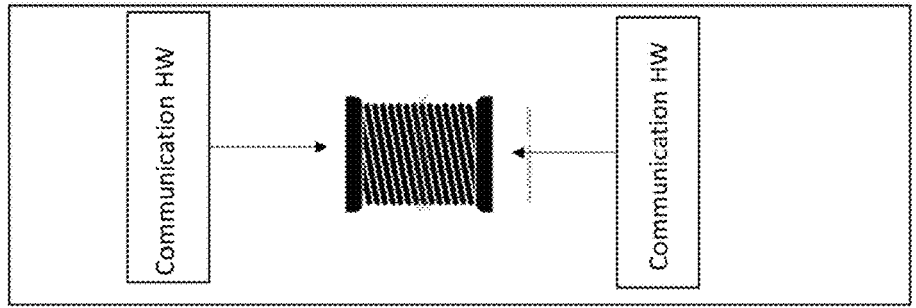
FIG. 24A illustrates a spool of optical fiber used as a waveguide with connecting transmitting and receiving hardware, which may be positioned in the same facility, container or remote from each other.

1R regeneration station 102 may be a fiber laser amplifier or may be replaced using a distributed gain system along the length of optical fiber 12. For example, distributed Raman amplification or optical parametric amplification may be used. Optical fiber spool 13 may be a nanostructure optical fiber waveguide. "Nanostructured optical fibers" may have a radial index profile designed so that the modes are confined to a relatively small area while using a relatively large outer radius so that the fiber is not single-moded. Contemplated as nanostructured optical fibers are families of technologies including, for example, a "ring fiber" having a first region, a second region, and a third region, where the first region is a cylinder, the second region is a cylinder with radius greater than the radius of the first region and enclosing the first region, and the third region is a cylinder with radius greater than that of the second region and enclosing both the first and second regions, such that the second region has an optical refractive index greater than both the first and second regions. The first region may be air or fiber. A "vortex fiber" has a first region, a second region, and a third region, and a fourth region, where the first region is a cylinder, the second region is a cylinder with radius greater than that of the first region and enclosing the first region, the third region is a cylinder with radius greater than that of the second region and enclosing both the first and second regions, and the fourth region is a cylinder with radius greater than that of the first region and that of the second region and enclosing the first, second, and third regions, and where the first region and the third region both have an optical refractive index greater than both the second and fourth regions. A "Multi-core Fiber" (also called Supermode Fiber or Photonic Lantern Fiber) has at least two disjoint core regions and a cladding region where the core regions are all cylindrical and the cladding region is a cylinder with radius greater than the radius of any of the core regions and the cladding region encloses all the core regions and where the core regions each have an optical refractive index greater than the cladding region. "Optical Wire" having a first region which is a cylinder with refractive index greater than that of air (where the air acts as the cladding). And "Photonic Crystal Fiber" which is made of a great number of open cylinders or other open shapes, such as polygons or stars, often of varying radii filled with air or lower refractive index glass, often with the center region filled with high-index glass. The optical fiber 12 or the spool of optical fiber 13, for example, may be Corning SMF 28 or some equivalent thereof, however, PM fiber may also be used, for example, to increase the extinction ratio of the modulator. The control system 8 may be similar to the system illustrated in FIG. 21. Eraser 103 and/or the signal modulator 113 may include Mach-Zehnder (MZ) intensity modulator(s) 14 and polarization controller(s) 5, as illustrated in FIG. 23, with or without an amplifier, controlled by the control system 8 via electrical connection 10. Control system 8 may include control logic 104, address table 106, delay generator 107 and other such components.

FIG. 23 illustrates an example of signal modulation, for instance as the signal modulator 113 and/or the eraser 103. First, the polarization (i.e. the waveguide or fiber mode) of the incoming optical signal may be controlled by a polarization controller 5. In the preferred embodiment, this is accomplished by an inline fiber Polarization Controller. This element may not be necessary if the fiber or waveguide 9 is a PM fiber. Similarly, polarization controller 5 may be unnecessary if the system were modified for space-division multiplexing (SDM) or if a modulator 14 which does not depend on polarization is used.

Optical intensity modulator 14 may be a Mach-Zehnder (MZ) intensity modulator that receives an electronic control voltage from RF driver 24 via electrical connection 22 which is driven by a signal from the control system 8 via connection 20, which may be an element of electrical connection 10 in FIG. 22. This could be replaced by a different electro-optical modulator (EOM), an acousto-optic modulator (AOM), or other modulator, such as an electro-absorption modulator (EAM). For other keying schemes, for example, (PSK), a phase modulator may be used instead.

An optical amplifier may provide gain to control the power of the signal. Optical isolators 15 and 17 may be used to prevent back-reflections that may cause amplifier instability. A second optical modulator 18, with associated RF driver 25 and electrical connection 21 may provide a greater extinction ratio in the modulated signal than one modulator alone, for example to provide better differentiation of "1" s and "0" s.

Figure 25:
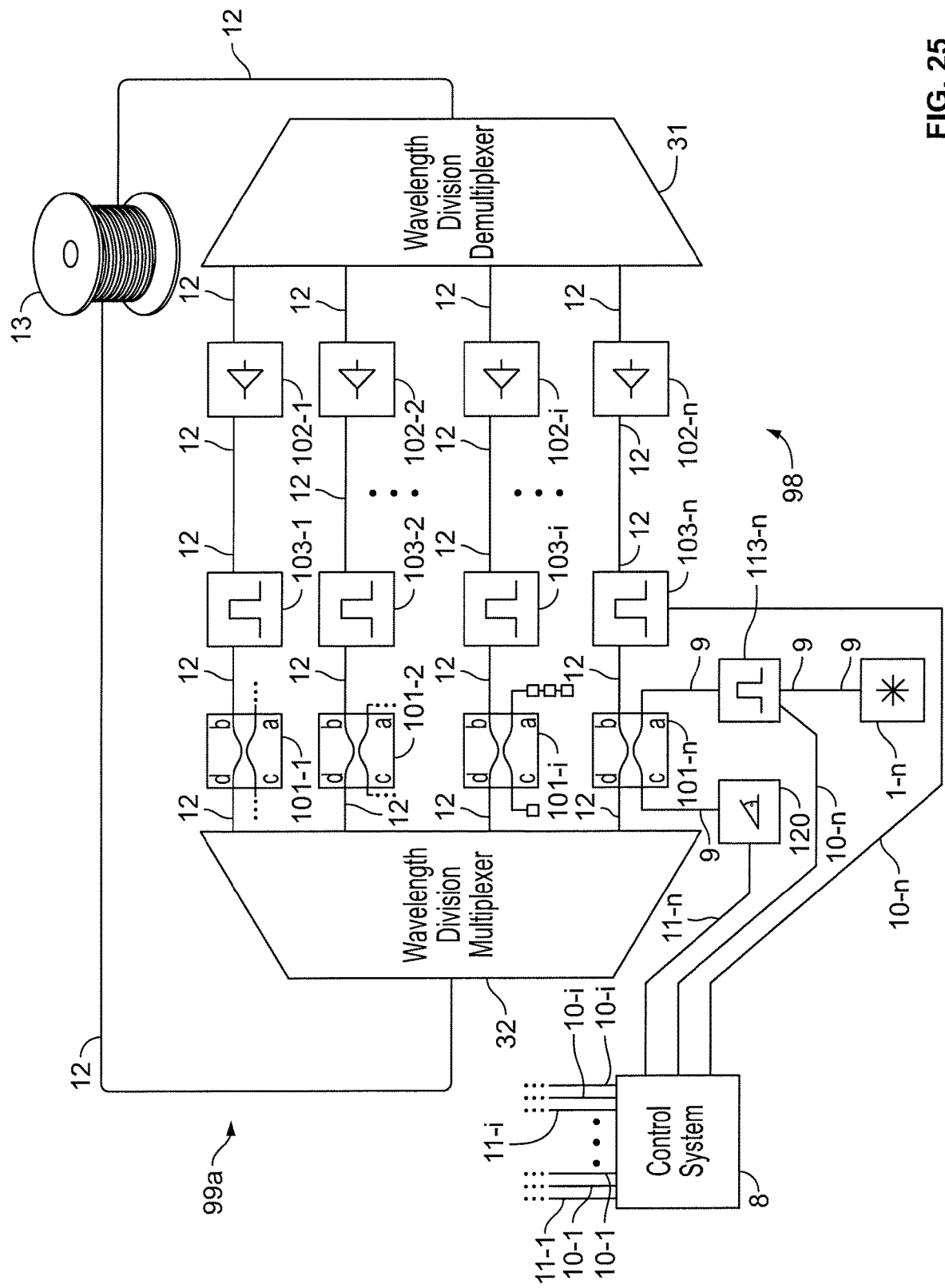
FIG. 25 is a schematic illustration of an example of a system for storage in motion utilizing wavelength-division multiplexing/demultiplexing of the signal within the recirculating loop, according to an aspect of the present disclosure.

FIG. 25 illustrates an example of the recirculating continuous loop for data storage in motion using wavelength-division multiplexing (WDM) for system 99a and illustrating a scheme where individual channels may be erased without erasing channels in the same time slot. Wavelength division demultiplexer 31 demultiplexes the signal passed from optical fiber 12 (or other waveguide). The signal includes n-distinct wavelengths, $\lambda_n$ representing n-distinct fiber channels, each channel carrying only one wavelength, $\lambda_i$. This may be realized by an arrayed waveguide grating (AWG) or by n-different fused-fiber couplers that are wavelength-specific and cascaded serially along length of optical fiber 12. While shown schematically in FIG. 25 as being positioned as part of the recirculating loop 100, it will be understood that the WDM circuit 98a may be positioned outside the recirculating loop such that the WDM circuit 98a multiplexed signal may be injected into the recirculating loop 100 by one or more signal couplers.

Wavelength division multiplexer 32 combines or multiplexes n-distinct fiber channels, each channel for one wavelength, $\lambda_i$, into one fiber or waveguide. The multiplexed signal may thus store information in n-distinct wavelengths $\lambda_n$. This may be implemented, e.g., as n-different fused-fiber couplers 101-1, 101-2, . . . 101-n, that are wavelength-specific and are cascaded serially along the length of optical fiber 12, or as an integrated device similar to an AWG, or equivalent technique.

FIG. 25 illustrates elements that describe the n wavelength channels indexed as element number-channel number. Thus, the $33^{rd}$ element in the fourth channel would be referred to as 33-4. 102-i is a 1R regeneration station for the signal of wavelength $\lambda_i$ in channel i. Some details of this are visible in FIG. 26. According to the example provided in FIG. 25, inter-wavelength equalization may be provided where each channel is normalized to a predetermined power, independent of the power provided to other channels. Such channel-normalized gain may be either active or passive. A signal control system may provide active equalization of all the channels using further electrical connections.

Round trip loss modulator 103-i may be a multiplexed implementation of eraser 103 illustrated in FIG. 21 and may be implemented following FIG. 23. The round trip loss modulator 103-i erases data of wavelength $\lambda_i$ in channel i of the signal.

Signal coupler 101-i may be a component of signal coupler 101 illustrated in FIG. 21 and may inject the signal carrying the data portion of wavelength $\lambda_i$ into channel i and out of channel i using two inputs a and b into outputs c and d. This may be accomplished using fused fiber couplers utilizing evanescent coupling of guided waves, for example, with a coupling wavelength of j. Light source 1-i may provide a modulated or unmodulated optical signal at wavelength i.

Signal modulation of each channel may be performed by a modulator of wavelength $\lambda_i$, details are shown in FIG. 23. DAQ 120-i demodulates the signal in channel i into electrical signals, for instance using a photodiode. Alternatively, another means of demodulation could be used.

Figure 26:
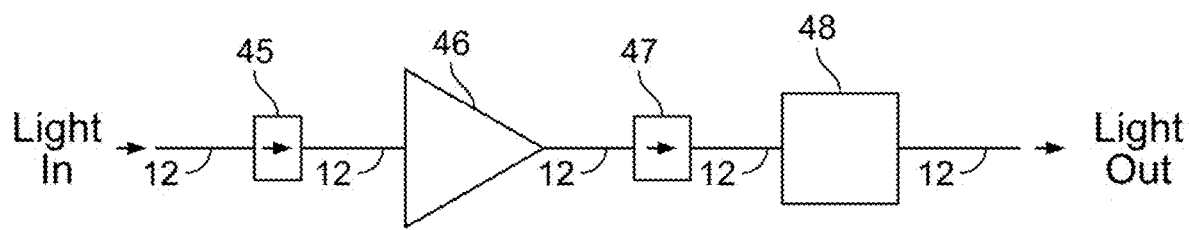
FIG. 26 is a schematic illustration of an example of amplification conditioning of the signal, according to an aspect of the present disclosure.

FIG. 26 is a detailed schematic illustration of an example of a 1R regeneration unit, for instance 102 in FIG. 21 or 22 or 102-i in FIG. 25. An optical amplifier 46, for instance a doped fiber amplifier, amplifies the signal in the relevant channel. The gain of this amplifier should be selected to fully compensate for round-trip losses and may need to be provided in multiple separate stages. Optical isolators may be used to prevent back reflections which may cause amplifier instability.

Figure 30:
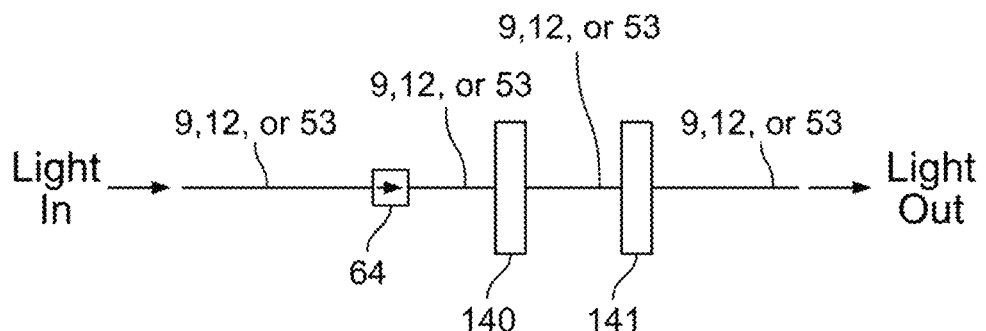
FIG. 30 is a schematic illustration of an example of a passive nonlinear filter for a loop providing stability to control signal gain and noise reduction, according to an aspect of the present disclosure.

Nonlinear intensity filter 48, or an equivalent active and/or passive means of control and/or stability may be used. The nonlinear intensity filter 48 provide higher loss for signals of very low or very high intensity. This provides active and/or passive control of signal intensity to stabilize the 1R regeneration process for uniform, controlled, indefinite maintenance of the peak intensity of signals in the fiber loop, as illustrated in FIGS. 30 and 31. Alternatively, an example of an active implementation of the filter 48 may include a 99%/1% fused fiber coupler, a power meter connected to the 1% channel of said coupler, and a variable optical attenuator, such as an EAM, driven by a control system. For instance, a discrete proportional-integral-derivative (PID) controller taking as input the present and past power of a given data block may be used to control either the gain of the amplifier 46, for instance by modulating the pump current of the amplifier 46, or the loss, for instance using an electro-absorption modulator (EAM).

Figure 27:
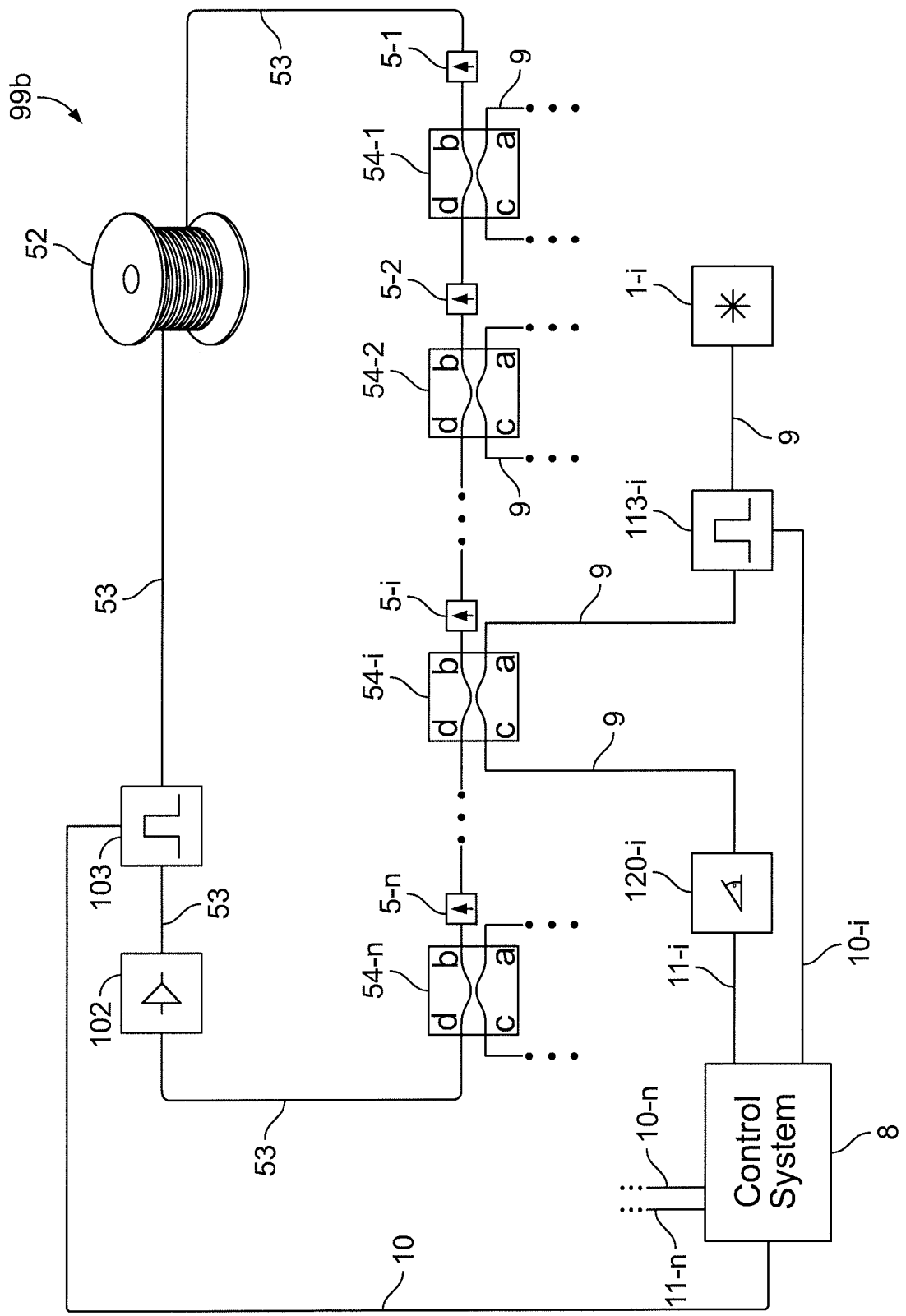
FIG. 27 is a schematic illustration of an example of a system for storage in motion utilizing space division multiplexing system in an optical waveguide loop, according to an aspect of the present disclosure.

FIG. 27 is a schematic illustration of an example of a storage system utilizing SDM (or Mode Division Multiplexing, MDM) 99b. A spool of multimode optical fiber (MMF) 52 propagates signals in different spatial modes, such as orbital angular momentum (OAM) carrying modes, in a manner that enables effectively distinguishing between channels with sufficiently low crosstalk to make the system practical. This may be realized by a custom nanostructured fiber designed to minimize both distributed and perturbation mode coupling between different modes (i.e. channels). For instance, multimode optical fiber 53 and spool of multimode optical fiber 52 may be vortex fiber, multicore fiber (including supermode fiber and photonic lanterns), optical wire, photonic crystal fiber, and/or any other form of fiber or waveguide with the desired properties. Digital multiple-input multiple-output (MIMO) techniques may be used to digitally demultiplex spatial modes that have mixed by coupling during propagation. Such an approach could entail conversion to a digital signal each round trip. Alternately, the mode-selective coupler 54-i may be designed to be wavelength insensitive and/or may use another coupling method other than fused fiber couplers. The polarization controller 5-i before each coupler 54-i may or may not be necessary depending on the design of the coupler 54-i and the multimode fiber 53. For instance, if the multimode fiber enables distinguishing of modes by preventing intermodal mixing during propagation than the polarization controller 5-i would not be necessary. However, if the multimode fiber enables distinguishing of modes by a MIMO technique, the polarization controller 5-i may be necessary, and indeed the polarization controller 5-i may itself be used as a means of distinguishing modes in some multimode fibers in place of both nanostructured fiber and MIMO techniques. Similarly, some designs of the coupler 54-i may require a polarization controller inserted in the single mode fiber 9 before the coupler input a. If multimode optical fiber 53 or the spool of multimode optical fiber 52 are polarization maintaining or nanostructured fibers designed to prevent mode coupling then they must be of the same type of fiber.

Fused fiber coupler 54-i includes two inputs (a & b) and two outputs (c & d) to couple one specific spatial mode guided by the MMF 53 at a specific frequency into a single mode optical fiber (SMF) 9 such as Corning SMF28 (or other type of waveguide) with some reasonable coupling ratio. Optical intensity modulator 103 may be used to erase target signals or portions of signals. A Mach-Zehnder interferometer may be used. Control of this component is performed via the control system 8 and the electrical connection 10.

The reamplifier 102 may be substantially similar to the reamplifier used in other embodiments, as illustrated in FIG. 26. Different components must be chosen, for instance multimode fiber 12 matching the fiber spool 53 instead of single mode fiber. Fiber amplifiers 46 based on this same custom nanostructured MMF 53 doped with a gain medium, for instance erbium, have been demonstrated and may be used to provide gain to all the modes simultaneously with low differential mode gain (DMG). However, other amplifiers could be used including, but not limited to, SMF EDFAs in concert with multiplexers and demultiplexers. The nonlinear filter 48 (or equivalent active or passive means of control equalization) may be likewise substantially similar, but may require different component choices and/or may need to further provide differential mode loss (DML) via either active or passive means to compensate for DMG in the amplifier 46.

Figure 28:
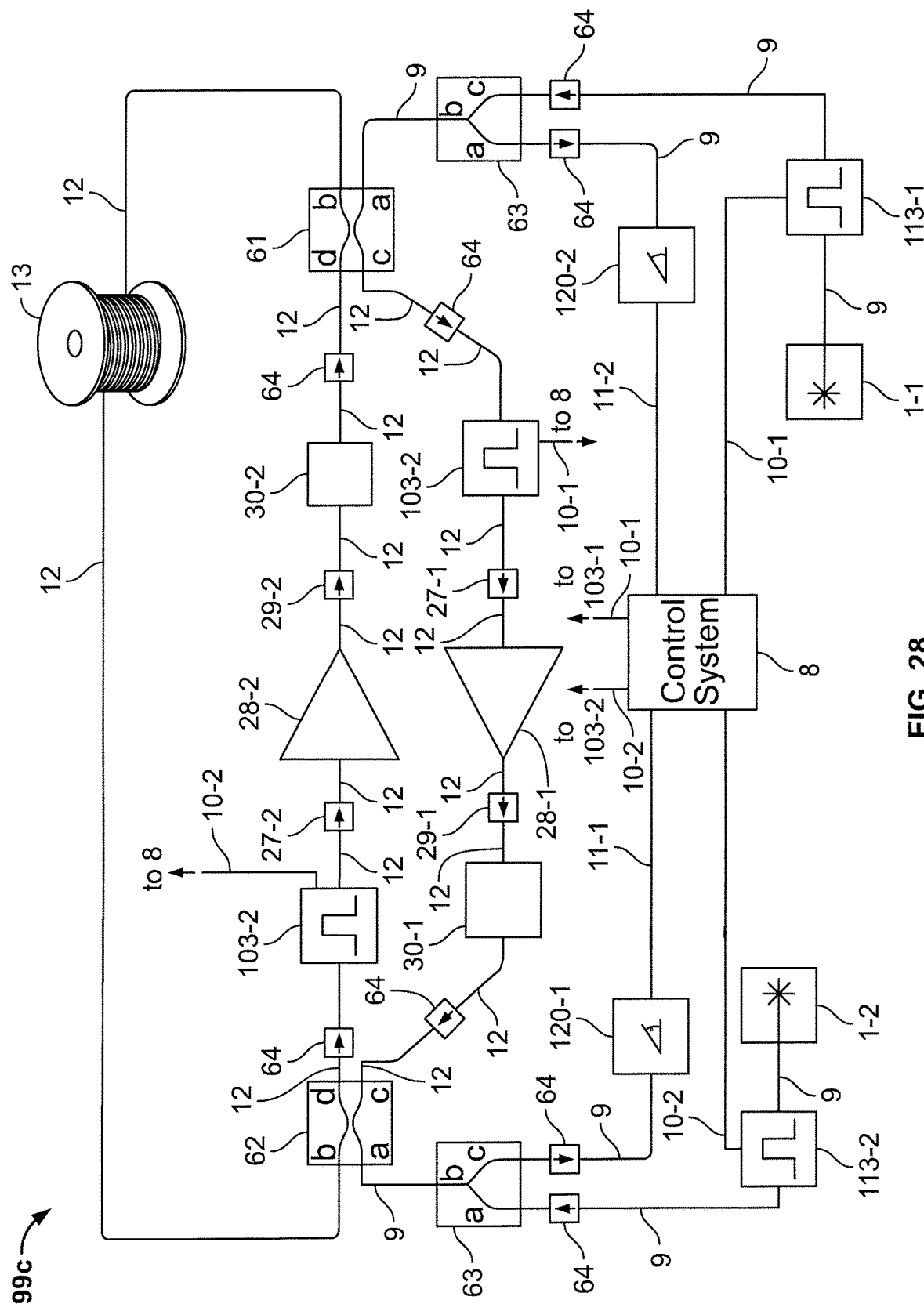
FIG. 28 is a schematic illustration of an example of a system for storage in motion utilizing propagation-direction division multiplexing (DDM) for the waveguide loop, according to an aspect of the present disclosure.

FIG. 28 illustrates an example of propagation-direction division multiplexing (DDM)-based storage system 99c, according to an aspect of the disclosure. Higher capacity for the storage in motion system 99c may be provided, leveraging the lack of a distinct beginning and ending of the recirculating continuous loop.

In particular, the signal to be injected may be broken up into a first part to be propagated clockwise and a second part of the signal propagating counterclockwise. Thus, the components are duplicated into two counter-propagating channels with corresponding indices, that is clockwise channel 1 and counterclockwise channel 2. The DDM may be provided in addition to one or more additional multiplexing schemes.

As illustrated in FIG. 28, a first coupler 61 injects signal propagating clockwise into the waveguide loop 12 via connection a of the first coupler 61 and removes the signal propagating counterclockwise therefrom via connection b of the coupler 61. A fused fiber coupler using evanescent coupling of the guided waves may be preferred. Similarly, a second coupler 62 injects the signal propagating counterclockwise into the waveguide loop 12 via connector a of the second coupler and removes the signal propagating clockwise from the waveguide loop 12. The couplers 61 and 62 on work in concert to multiplex simultaneously the DDM signals and to collectively serve as the lone signal coupler 101 of FIG. 21.

Further, couplers 63, having an input C, an output B, and a bidirectional connection A, may be provided to separate input and output components. Optical isolators 64 may be provided to prevent signal channel crosstalk.

To build one embodiment, the techniques of WDM, SDM, and DDM illustrated in FIGS. 25, 27, and 28 may be combined into one system using all three schemes, as well as other possible schemes, simultaneously. To do this, the signal coupler 101-$i$ in each wavelength channel illustrated in FIG. 25 may be replaced, according to an aspect of the disclosure, with an array of fused fiber couplers, as illustrated, for example, in FIG. 27, including replacing each component 1-$i$ through 11-$i$ with an array of such components for each mode. In addition, additional multiplexing schemas may be added using the direction division multiplexing (DDM) technique together with other modulation methods to allow additional storage by providing multiples bits in each signal. For example, quadrature modulation (QAM) or quadrature phase-shift keying (QPSK). In a free-space embodiment, a combination of polarization multiplexing and SDM may be necessary to achieve capacity equivalent to SDM fiber mode multiplexing since spatial modes in free space lack inherent polarization like waveguide modes, such as optical fiber modes, have.

FIG. 30 illustrates an example of a nonlinear filter that provides stability in a passive way in order to control round trip gain of the signal in the loop and reduce noise that may otherwise accumulate in the loop. Noise reduction may be accomplished by a saturable absorber 140. Low-finesse etalon 141 made of a material with a high optical Kerr effect (for example, SbSI, Zn, Se, or GaAs) may be used to provide gain stabilization. The etalon may be tuned such that at low intensities it has 100% transmissivity, that is, the wavelength or set of wavelengths are resonant wavelengths of the material. However, as the intensity of the pulse rises, the refractive index of the material may change thus changing the transmissivity of the etalon. The reflected power may then be absorbed by optical isolator 14.

Figure 31A:
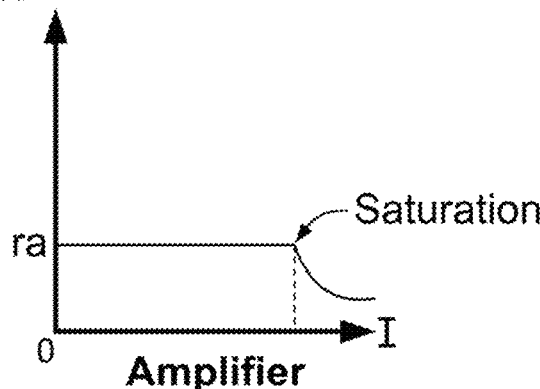
FIG. 31A-F illustrate an example of how the nonlinear filter illustrated in FIG. 31 may provide gain stability and noise reduction for the signal recirculating loop, according to an aspect of the present disclosure.
Figure 31B:
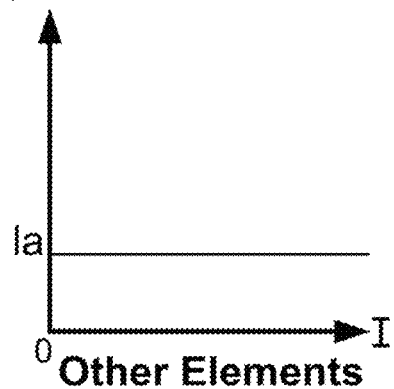
Figure 31C:
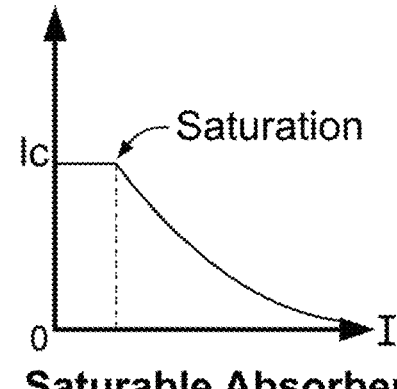

FIGS. 31A-F illustrates an example of how a nonlinear filter, illustrated by way of example in FIG. 30, provides stability for round trip gain control and how it may be tuned. In FIG. 31A, signal gain is illustrated for a typical laser amplifier. FIG. 31B illustrates the various passive elements in the system, including the signal coupler or signal couplers, end facets, and modulators that provide linear loss. FIG. 31C illustrates that a saturable absorber provides loss in the same way that the signal amplifier provides gain, however for practical reasons as discussed below, the saturable absorber may be chosen with a higher loss than the signal amplifier's gain and with a much lower saturation point.

Figure 31D:
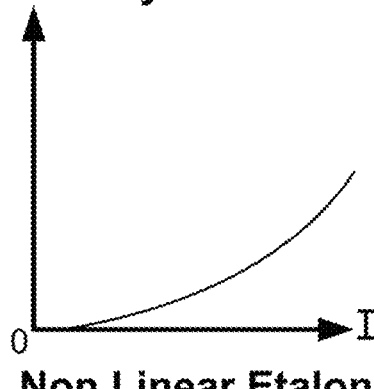

FIG. 31D illustrates a nonlinear etalon that provides reflectivity according to the formula $$R = 1 - \frac{1}{1 + \mathcal{F}\sin^2(2\pi k l I)}$$

where $\mathcal{F}$ is the etalon finesse, k is the wavenumber of the light, l is the length of the etalon cavity, and I is the intensity of the signal.

Figure 31E:
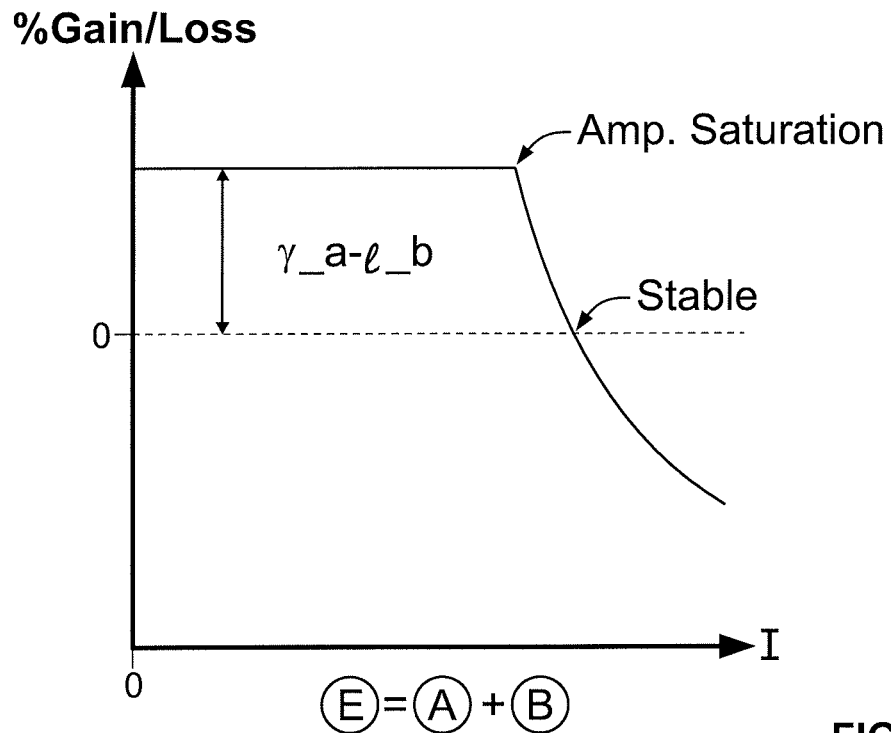

FIG. 31E illustrates that without the filter, all noise is amplified and stability may be achieved only in the amplifier saturation region. An attempt to control gain at a lower level by tuning $\gamma_a - l_b = 0$ may be inherently unstable because even if slightly positive it may lead into the amplifier saturation region, and if it is even slightly negative, the signal pulse may die to zero.

Figure 31F:
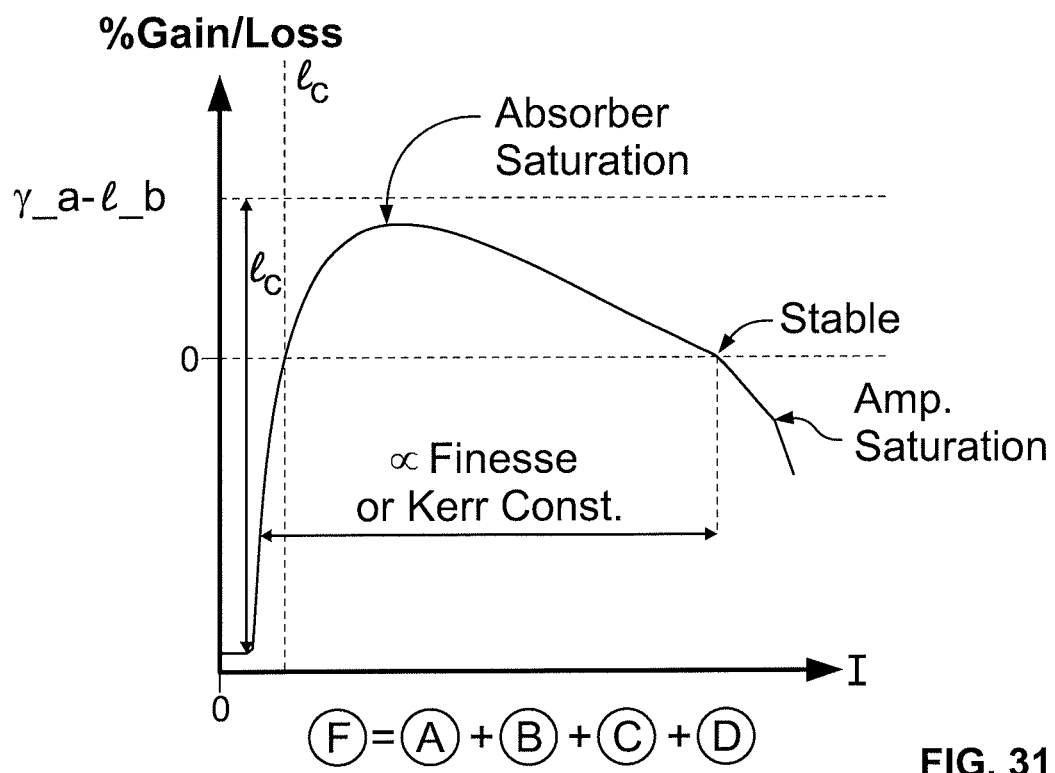

FIG. 31F illustrates the stability control and noise reduction with a nonlinear filter added. With the filter added, first, low-level noise that is less than the saturation of the saturable absorber, $I_c$, suffers round trip losses. Second, a stable point may be reached at a point in intensity before the amplifier saturation region, and this may be adjusted by adjusting this filter. Accordingly, the filter may be tuned in the following way:

Noise-cutting may be tuned to remove noise more efficiently by raising the saturable absorber loss, which should exceed $\gamma_a - l_b$. However, it may be tuned down to reduce systematic round trip losses that may limit system performance, or may be tuned up if noise is being generated faster than it is dying out.

The point of stability may be tuned by adjusting the etalon finesse or the Kerr constant of the etalon.

If multiple equally-spaced wavelengths are in use, the length of the etalon may be tuned so that each wavelength is a resonant wavelength of the etalon.

In this way, a stable, wavelength-insensitive amplification (at specific discrete wavelengths) may be achieved in a tunable fashion well below the saturation region of the laser amplifier, or at the same time, signal noise may be reduced.

Similar filtering may be done for phase shift keying, or similar phase-sensitive keying schemes such as QAM, using phase-sensitive filters or phase-sensitive amplification. According to one embodiment, optical parametric amplification (OPA) with a phase-matched pump and idler may be used to provide amplification selectively to signals that fulfill the phase matching condition set by the signal and idler while providing loss to signals that are shifted from the phase matching condition by greater than $\pi/2$ radians. In this configuration, one pump may serve for multiple signals, although effects of intermodal differences in effective refractive index may be considered to ensure that each signal has a properly phase matched idler. Also, for signals of different wavelengths, an idler at the correct wavelength and phase for each signal must be provided which may correspond to the usual relationship $\omega_s + \omega_i = 2\omega_p$. Similarly, schemes with multiple pumps may be used to provide different wavelength and/or phase matching conditions. Alternatively, two pumps of different wavelengths with the relationship $\omega_{p1} + \omega_{p2} = 2\omega_s$ may be used. In such a case, no idler may be needed because in effect each signal serves as its own idler. In order to keep the pump and idler phase matching relationship constant, the pump and idler may need to be periodically rephrased and/or replaced. This may be accomplished, for instance, by removing them from the loop each round trip using a wavelength filter which blocks the idler(s) and pump(s) but not the signal(s) so that the pump(s) and idler(s) may be constantly provided by, for example, a constant wave (CW) laser source. Therefore, such an idler would provide amplification to signals of any phase instead of providing phase-selective amplification as desired. Similarly, the idler could have sufficient power to avoid depletion (after considering the gain that it experiences from the amplification of the signal). Other phase-sensitive or phase-selective elements may provide the same or similar functionality, such as an injection-locked fiber amplifier.

Figure 32A:
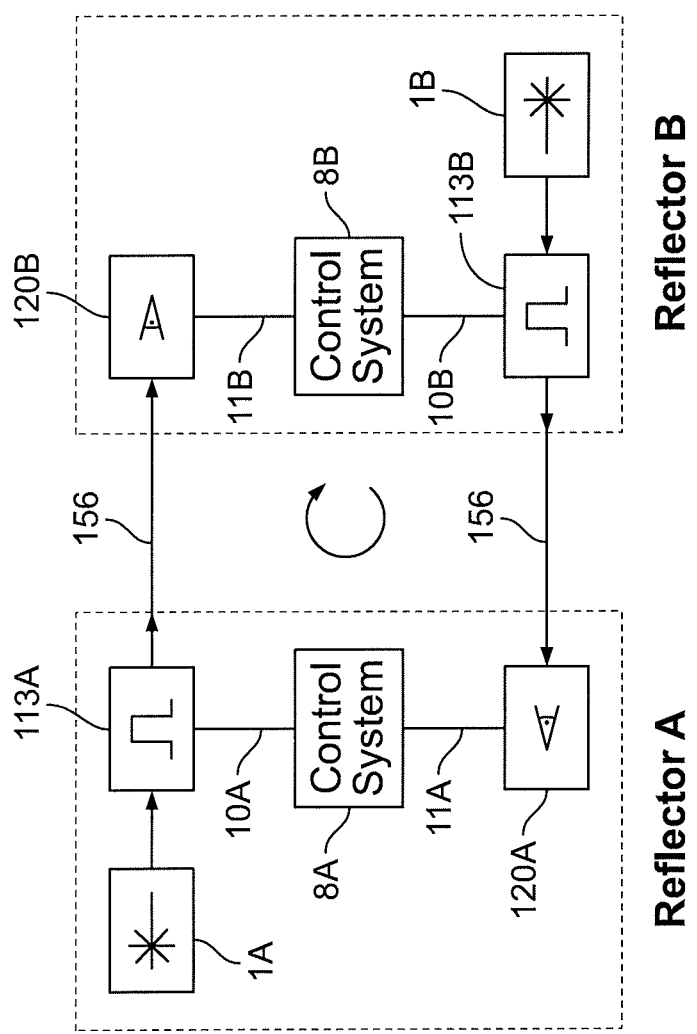
FIGS. 32A-C illustrate examples of recirculating loops, each recirculating loop formed by an optical cavity, according to an aspect of the present disclosure.

In another embodiment, the recirculating loop may comprise an optical cavity which stores the data. FIG. 32A illustrates an example where this cavity may be formed by two or more receiver-transmitter pairs "Reflector A" and "Reflector B" which may each act as a reflector to keep the data stored in beams of light 156 between them. Using similar components to the systems described above, an optical signal may be generated by the light sources 1A and 1B, which may then be modulated by signal modulators 113A and 113B and transmitted to the signal receiver 120B or 120A, which may demodulate the signal and convert it into electrical data. The control systems 8A and 8B may selectively control the receiving and retransmitting of the data, so there may be no need for the eraser 103. Similarly, the signal may be fully regenerated each time it is received and retransmitted, so there may be no need for the signal conditioner 102. Coupling data out as an electrical signal and/or performing data operations, such as read, write, or erase, may be performed at either or both Reflectors using similar methods to those described above. Similarly, error correction may be applied at both reflectors, one reflector, or intermittently. Multiplexing may be added using an array of receivers and transmitters or by adding additional multiplexing and demultiplexing elements as illustrated in FIG. 29.

Figure 32C:
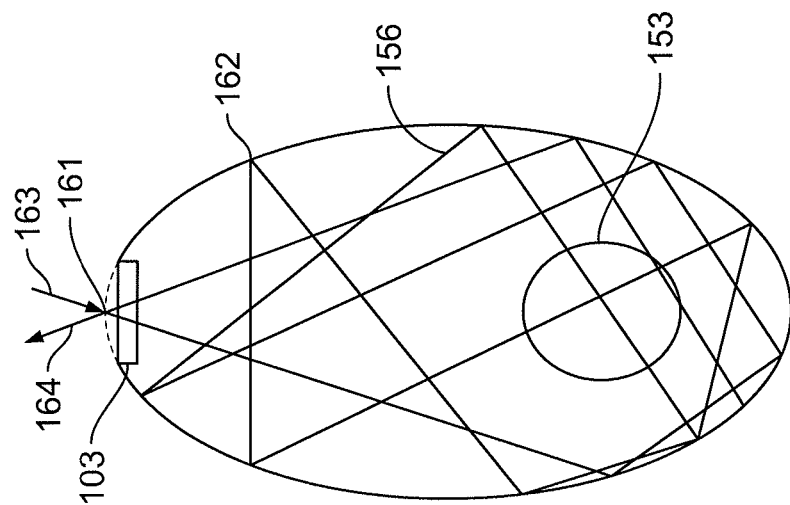
Figure 32B:
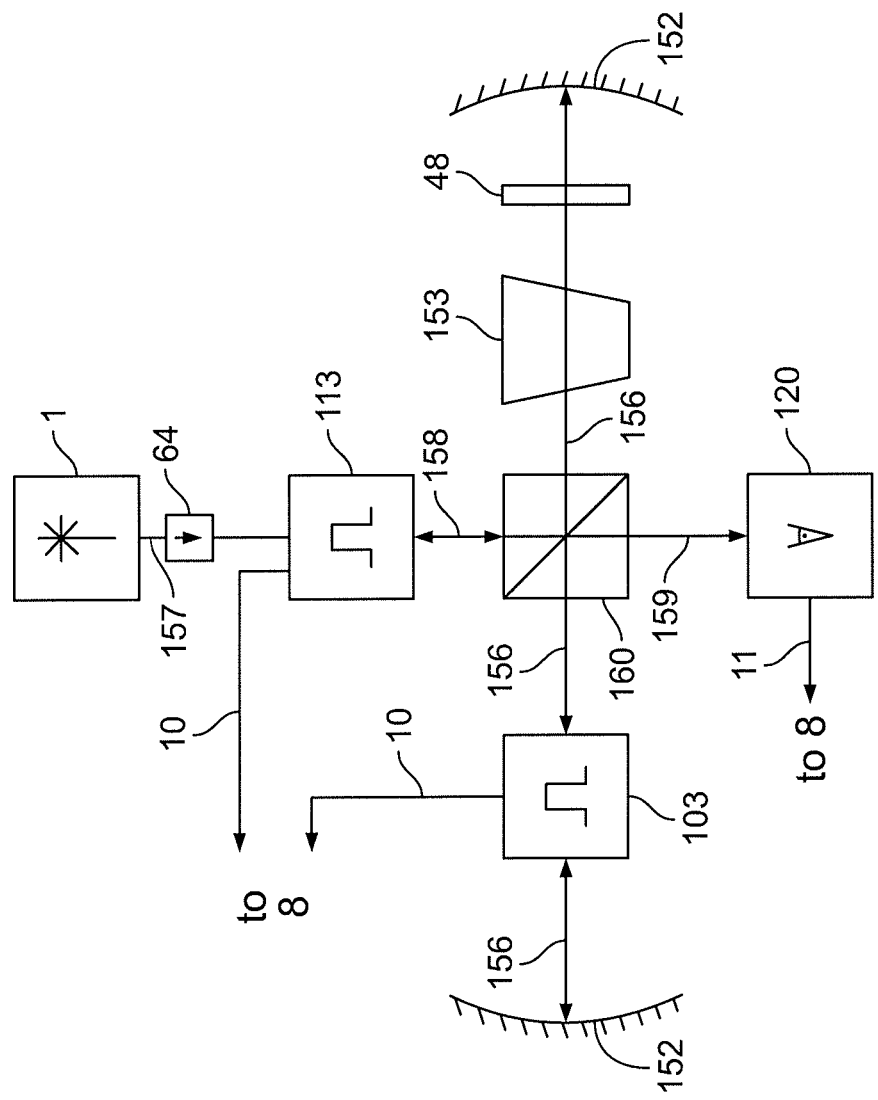

Alternatively, turnaround of the signal may be accomplished by mirrors, as illustrated in FIG. 32B. In this embodiment, the signal beam 156 may be travelling in both directions and in other embodiment may travel in multiple directions or in one direction, the signal beam 156 may be stored in a reflective cavity using two mirrors 152 to keep the beam in the cavity. The mirrors 152 may be designed to keep the beam in the cavity in a stable manner, many methods of which are well known. Similar to the fiber embodiment, an eraser 103 to erase signals and a signal conditioner 102 comprising a gain medium 153 and a nonlinear filter 48 may be provided inside the cavity. The nonlinear filter 48 may be active or passive, as described above, and may provide round trip stability of gain and loss and/or noise reduction.

The input signal 158 may be coupled into the system and the output signal 159 may be coupled out of the system using, for instance, a beam splitter 160, which may perform the same function as the coupler 101 in FIGS. 21, 22, 25, and 27. Alternately, one or more of the mirrors 152 may be partially transmissive so that an appropriate fraction of the signal 156 stored in the cavity is coupled out through said partially-transmissive mirror each round trip. Signal generation and signal detection may be accomplished in a manner similar to FIG. 22, using a laser source 1 and a signal modulator 113 to write data into the system and a signal demodulator 120 to demodulate the output signal 159. An optical isolator 64 may be provided to prevent back-reflected beams from entering the signal generator 1.

Many other cavity designs and sizes are contemplated. For example, a cavity may include many flat mirrors and/or lenses with a parabolic mirror at each end, which may provide steering stability to the beam. In another example, the cavity may be formed using one or more non-flat reflective surfaces which reflect the signal beam 156 several times each round trip. An example is illustrated in FIG. 32C, where the cavity may be one ellipsoidal curved reflective surface 162. In this embodiment, the input/output coupler may be a partially transmissive portion 161 of the reflective surface 162 which allows an input beam 163 into the cavity and couples an appropriate fraction of the power in the cavity out each round trip as the output beam 164, similar to coupler 101 in FIG. 21. The input beam 163 and output beam 164 may be generated and received using the same method described above. To provide erasing and signal conditioning, elements may be inserted within the cavity in the path of the signal beam, for instance an eraser 103 and a gain medium 153. A nonlinear filter 48 or multiplexing elements may be provided, as described above.

The present system, method, and devices, may be implemented using components implemented as hardware, software, firmware or a combination of the foregoing, and may be implemented in one or more computer systems or other processing systems, such that no human operation may be necessary. A computer or computer systems that implement the components of Earth station 20 *a,b*, and that implement the controllers of the satellites, of the transceivers on Earth station 20 *a,b*, and on the satellites, of the electromagnetic signal generators and regenerators, and the like, may each include or be provided as one or more processors in one or more units for performing the method according to the present disclosure. One or more or all of these computers or processors may be accessed via the internet or other communication networks and/or means. Two or more of these units, or components of these units, may be executed on, or be performed by, processes running on a single device or on a series of such devices, for example as one or more rack-mounted devices. The communication interface with Earth station 20 *a,b* herein described may include wired or wireless interface communication, and may communicate via a wire, cable, fire optics, a telephone line, a cellular link, satellite connection a radio frequency link, such as WI-FI, or other such communication channels and networks including wireless or wired communication, or via a combination of the foregoing.

Although the present invention has been described in relation to particular embodiments thereof, many other variations and modifications and other uses will become apparent to those skilled in the art. Also, components or other structures or systems, features or steps, described with respect to one implementation, for example, a satellite or vessel free space implementation, a rack free space implementation, or a waveguide implementation, may also be deployed or used with respect to another implementation. Components noted as being part of the same structure may be packaged as separate components or structures, and components described as packaged separately may be integrated or provided together. Also, components may be provided remote from the structures with which they are logically associated or with which they directly communicate.

Steps outlined in sequence need not necessarily be performed in sequence, not all steps need necessarily be executed and other intervening steps may be inserted. Therefore, that the present invention be limited not by the specific disclosure herein.

What is claimed is:

1. A data storage system comprising:
   a data management system configured to manage digital data in the data storage system;
   a terrestrial transmitter configured to transmit a radio frequency signal carrying the digital data to a communication satellite;
   the communication satellite configured to transmit the data to a first laser satellite;
   the first laser satellite comprising a laser signal generator configured to generate a laser signal carrying the digital data, and the laser signal generator configured to transmit the digital data to a second laser satellite;
   the second laser satellite configured to return to the first laser satellite the digital data transmitted from the first satellite; and
   the first laser satellite configured to return to the second laser satellite the digital data transmitted from the second laser satellite, such that the digital data is transmitted in a recirculating loop of storage in motion,
   wherein at least one of the first laser satellite and the second laser satellite is configured to retrieve a block of data of the digital data identified by the data management system.

2. The system of claim 1, wherein the data management system identifies the block of data as being responsive to a request for the block of data received, the block of data being less than an entirety of the digital data.

3. The data storage system of claim 1, wherein the first laser satellite is operable to return to the second laser satellite the digital data transmitted from the second laser satellite by transmitting the digital data through one or more intermediary laser satellites.

4. The data storage system of claim 3, wherein the communication satellite is further operable to transmit a second radio frequency signal carrying the retrieved block of data of the digital data to the terrestrial transmitter.

5. A data storage system comprising:
   a recirculating loop configured to store data in motion and comprising a first vessel and a second vessel positioned remote from the first vessel;
   the first vessel comprising at least one selected from the group consisting of a signal generator and a signal transmitter configured to transmit the data to the second vessel;
   the second vessel configured to return to the first vessel the data transmitted from the first vessel; and
   the first vessel configured to return to the second vessel the data transmitted from the second vessel.

6. The system of claim 5, wherein for each round trip of the signal through the recirculating loop the signal is kept in motion.

7. The system of claim 5, wherein at least one of the first vessel and the second vessel is a satellite.

8. The system of claim 5, wherein at least one of the first vessel and the second vessel comprises one selected from the group consisting of a ship, an aircraft, a balloon, and a submarine, and an oil rig, tower, buoy, or other stationary structure.

9. The system of claim 5, wherein at least one of the first vessel and the second vessel comprises one selected from the group consisting of a ship, an aircraft, a balloon, a submarine, and an oil rig, tower, buoy, or other stationary structure.

10. The system of claim 5, wherein the recirculating loop comprises a third vessel configured to transmit the data to the first vessel, and the second vessel is configured to return the data to the first vessel via the third vessel by transmitting the data to the third vessel.

11. The system of claim 5, wherein the recirculating loop is configured to recirculate the data between vessels recurring in consecutive sequence.

12. The system of claim 5, wherein at least one of the first vessel and the second vessel comprises a reflecting surface positioned and configured to return the signal, respectively, to the second vessel or the first vessel.

13. The system of claim 5, wherein the at least one of the signal generator and the signal transmitter generates a laser signal carrying the data and transmitted to the second vessel.

14. The system of claim 6, wherein the system further comprises an error checker configured to check to ensure data integrity.

15. A data storage system, comprising:
   a recirculating loop configured to store data in motion and comprising a first vessel and a second vessel positioned remote from the first vessel;
   the first vessel comprising at least one selected from the group consisting of a signal generator and a signal transmitter configured to transmit the data to the second vessel;
   the second vessel configured to return to the first vessel the data transmitted from the first vessel;
   the first vessel configured to return to the second vessel the data transmitted from the second vessel; and
   a data management system configured to manage the data in the data storage system,
   wherein at least one of the first vessel and the second vessel is configured to retrieve a block of data of the data identified by the data management system as being responsive to a data retrieval request for the block of data received from outside the data storage system, the block of data being less than an entirety of the data.

16. A data storage system, comprising:
   a recirculating loop configured to store data in motion and comprising a first vessel and a second vessel positioned remote from the first vessel;

the first vessel comprising at least one selected from the group consisting of a signal generator and a signal transmitter configured to transmit the data to the second vessel;

the second vessel configured to return to the first vessel the data transmitted from the first vessel;

the first vessel configured to return to the second vessel the data transmitted from the second vessel; and wherein the at least one selected from the group consisting of the signal generator and the signal transmitter is configured to transmit to the second vessel a signal carrying the data as a signal multiplexed by a propagation-direction multiplexer, and the transmitting comprises transmitting a first portion of the signal through the recirculating loop as a first beam and transmitting a second portion of the signal through the recirculating loop as a second beam with a propagation path physically separated from the first beam.

17. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
wherein at least one of the signal generator and the signal transmitter is configured to generate a multiplexed electromagnetic signal carrying the data and comprising a first set of multiplexed signals, each signal of the first set of multiplexed electromagnetic signals comprising a second set of multiplexed electromagnetic signals generated using a multiplexing scheme different from the first set of multiplexed signals.

18. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
a controller configured to receive, at a first time, a first request from outside the data storage system to perform a first operation, the first operation comprising one of area operation, a write operation, and a delete operation for a first block of data of the data, and to receive, at a second time after the first time, a second request from outside the data storage system to perform a second operation, the second operation comprising one of the read operation, the write operation, and the delete operation for a second block of data of the data,
wherein the system performs the first operation after performing the second operation.

19. A data storage system comprising:
a recirculating loop configured to store data in motion and comprising a first vessel and a second vessel positioned remote from the first vessel;

the first vessel comprising at least one selected from the group consisting of a signal generator and a signal transmitter configured to transmit the data to the second vessel;

the second vessel configured to return to the first vessel the data transmitted from the first vessel;

the first vessel configured to return to the second vessel the data transmitted from the second vessel; and wherein the at least one of the signal generator and the signal transmitter is configured to generate a code division multiplexed signal carrying the data, the code division multiplexed signal comprising a first set of multiplexed signals such that a first multiplexed signal of the first set carries data other than a second multiplexed signal of the first set.

20. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
wherein the at least one of the signal generator and the signal transmitter is configured to generate an orbital angular momentum division multiplexed signal carrying the data, the orbital angular momentum division multiplexed signal comprising a first set of multiplexed signals such that a first multiplexed signal of the first set carries data other than a second multiplexed signal of the first set.

21. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
wherein the at least one of the signal generator and the signal transmitter is configured to generate a space division multiplexed signal carrying the data, the space division multiplexed signal comprising a first set of multiplexed signals such that a first multiplexed signal of the first set carries data other than a second multiplexed signal of the first set.

22. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel;

wherein the at least one of the signal generator and the signal transmitter is configured to generate a polarization division multiplexed signal carrying the data, the polarization division multiplexed signal comprising a first set of multiplexed signals such that a first multiplexed signal of the first set carries data other than a second multiplexed signal of the first set.

23. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
wherein the at least one of the signal generator and the signal transmitter is configured to generate a wavelength division multiplexed signal carrying the data, the wavelength division multiplexed signal comprising a first set of multiplexed signals such that a first multiplexed signal of the first set carries data other than a second multiplexed signal of the first set.

24. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel, and
a data management system configured to associate a data block carried by a portion of signal with at least one of a physical property and a location of the portion of the signal; and
a controller configured to generate a control signal controlling an operation on the data block, the control signal generated based on a clock signal with reference to the at least one of the physical property and the location of the portion of the signal.

25. A data storage system comprising:
a recirculating loop configured to store data in motion and comprising a first vessel and a second vessel positioned remote from the first vessel;
the first vessel comprising at least one selected from the group consisting of a signal generator and a signal transmitter configured to transmit the data to the second vessel;
the second vessel configured to return to the first vessel the data transmitted from the first vessel;
the first vessel configured to return to the second vessel the data transmitted from the second vessel; and
a data management system configured to manage data in the data storage system and configured to receive a request from outside the data storage system to at least one of delete, write and update a block of data in the data,
wherein the recirculating loop comprises an eraser configured to erase, based on information received from the data management system, a first portion of the signal carrying the data, the first portion carrying the data block, the data block being less than an entirely of the data.

26. A data storage method comprising:
transmitting, by at least one selected from the group consisting of a signal generator and a signal transmitter positioned at a first vessel, data carried by a signal to a second vessel,
wherein the second vessel is positioned remote from the first vessel, and a recirculating loop configured to store the data in motion comprises the first vessel and the second vessel;
returning, by the second vessel, to the first vessel the data transmitted from the first vessel;
returning, by the first vessel, to the second vessel the data transmitted from the second vessel;
managing the data in the data storage system by a data management system; and
retrieving, by at least one of the first vessel and the second vessel, a block of data of the data identified by the data management system as being responsive to a data retrieval request for the block of data received from outside the data storage system, the block of data being less then an entirety of the data.

27. A data storage system, comprising:
a plurality of communications nodes operable to recirculate signals carrying data through a recirculating loop comprising the signal communications nodes, and
a data management system configured to manage the data in the data storage system;
wherein:
at least one of the communications nodes comprises a signal receiver operable to receive the signals from another one of the communication nodes through a free space medium,
at least one of the communications nodes comprises a signal transmitter operable to transmit the signals to another one of the communication nodes through the free space medium, and
at least one of the communications nodes is configured to retrieve a block of data of the data identified by the data management system as being responsive to a data retrieval for the block of data received from outside the data storage system, the block of data being less than an entirety of the data.

28. The data storage system of claim 27, wherein the signals comprise optical signals.

29. The data storage system of claim 27, wherein the signals comprise electromagnetic signals.

30. The data storage system of claim 27, wherein the free space medium comprises a planetary atmosphere, a vacuum, space, or water.

* * * * *